US012321764B1

United States Patent
Nychis et al.

(10) Patent No.: US 12,321,764 B1
(45) Date of Patent: Jun. 3, 2025

(54) SYSTEMS AND METHODS FOR AUTOMATED PROCESS DISCOVERY

(71) Applicant: Soroco India Private Limited, Bengaluru (IN)

(72) Inventors: George Peter Nychis, Somerville, MA (US); Abdul Qadir, Bangalore (IN); Aakash Hasija, Delhi (IN); Rohan Narayana Murty, Bangalore (IN); Arjun Narayanaswamy, Bangalore (IN); Kirby Scott Files, Milton, MA (US)

(73) Assignee: Soroco India Private Limited, Bengaluru (IN)

( * ) Notice: Subject to any disclaimer, the term of this patent is extended or adjusted under 35 U.S.C. 154(b) by 0 days.

(21) Appl. No.: 19/080,333

(22) Filed: Mar. 14, 2025

Related U.S. Application Data

(63) Continuation of application No. 18/662,677, filed on May 13, 2024, now Pat. No. 12,288,088, which is a continuation of application No. 17/711,775, filed on Apr. 1, 2022, now Pat. No. 12,020,046.

(60) Provisional application No. 63/170,434, filed on Apr. 2, 2021.

(51) Int. Cl.
G06F 9/451 (2018.01)

(52) U.S. Cl.
CPC .................................. G06F 9/453 (2018.02)

(58) Field of Classification Search
CPC ...................................................... G06F 9/453
See application file for complete search history.

(56) References Cited

U.S. PATENT DOCUMENTS

| | | | |
|---|---|---|---|
| 7,234,126 B2 | 6/2007 | Catthoor et al. |
| 7,346,629 B2 | 3/2008 | Kapur et al. |
| 7,421,654 B2 | 9/2008 | Wugoski |
| 7,756,272 B2 | 7/2010 | Kocher et al. |
| 7,975,239 B2 | 7/2011 | Bellotti et al. |
| 7,996,913 B2 | 8/2011 | Kocher et al. |
| 8,209,702 B1 | 6/2012 | Roytman et al. |
| 8,433,733 B2 | 4/2013 | Sayed et al. |
| 9,047,147 B2 | 6/2015 | Francis |
| 9,053,299 B2 | 6/2015 | Wieder |

(Continued)

OTHER PUBLICATIONS

International Search Report and Written Opinion for International Application No. PCT/US2017/58603 mailed Jan. 5, 2018.

(Continued)

*Primary Examiner* — Tadesse Hailu
(74) *Attorney, Agent, or Firm* — Wolf, Greenfield & Sacks, P.C.

(57) ABSTRACT

A method, comprising: receiving, by a computing device, a user indication to start a teaching mode in which the user can teach an instance of a process; configuring the computing device to start the teaching mode in response to receiving the indication; capturing, when in the teaching mode, first information corresponding to a first stream of events captured by the computing device during performance of a first plurality of actions by the user when interacting with the computing device to perform the process; generating, using the first information, a first visualization of at least some of the first plurality of actions; and displaying the first visualization on a graphical user interface of the computing device.

15 Claims, 44 Drawing Sheets

(56) References Cited

U.S. PATENT DOCUMENTS

| | | | |
|---|---|---|---|
| 9,384,121 B2 | 7/2016 | Jackson et al. | |
| 9,465,679 B2 | 10/2016 | Stanley-Marbell et al. | |
| 9,465,806 B2 | 10/2016 | Baker et al. | |
| 9,471,778 B1 | 10/2016 | Seo et al. | |
| 9,477,333 B2 | 10/2016 | Townsend et al. | |
| 9,542,004 B1 | 1/2017 | Hu | |
| 9,602,495 B2 | 3/2017 | Wyn-Harris | |
| 10,083,159 B1 | 9/2018 | Bekmambetov et al. | |
| 10,120,653 B2 | 11/2018 | Kim et al. | |
| 10,195,531 B2 | 2/2019 | Osman et al. | |
| 10,430,212 B1 | 10/2019 | Bekmambetov et al. | |
| 10,575,231 B2 | 2/2020 | Gay et al. | |
| 10,613,838 B2 | 4/2020 | Kim et al. | |
| 10,642,375 B2 | 5/2020 | Lee | |
| 10,698,661 B2 | 6/2020 | Kim et al. | |
| 10,710,239 B2 | 7/2020 | Safary et al. | |
| 10,831,450 B2 | 11/2020 | Kim et al. | |
| 10,891,112 B2 | 1/2021 | Kim et al. | |
| 11,282,088 B1 * | 3/2022 | Lancaster | G06Q 10/083 |
| 11,816,112 B1 | 11/2023 | Nychis et al. | |
| 12,159,203 B1 * | 12/2024 | Shukla | G06N 20/00 |
| 2002/0006603 A1 | 1/2002 | Peterson et al. | |
| 2003/0126050 A1 | 7/2003 | Theiss et al. | |
| 2003/0158855 A1 | 8/2003 | Farnham et al. | |
| 2004/0104939 A1 | 6/2004 | Locke et al. | |
| 2006/0184410 A1 | 8/2006 | Ramamurthy et al. | |
| 2007/0299631 A1 | 12/2007 | Macbeth et al. | |
| 2009/0106262 A1 | 4/2009 | Fallen et al. | |
| 2009/0172534 A1 | 7/2009 | Budreau et al. | |
| 2009/0172535 A1 | 7/2009 | Cheng et al. | |
| 2011/0179046 A1 | 7/2011 | Paull et al. | |
| 2013/0055268 A1 | 2/2013 | Amershi et al. | |
| 2013/0304906 A1 | 11/2013 | Yavilevich et al. | |
| 2014/0129961 A1 | 5/2014 | Zubarev et al. | |
| 2014/0132571 A1 | 5/2014 | Zeng et al. | |
| 2014/0157288 A1 | 6/2014 | Wong | |
| 2014/0215495 A1 | 7/2014 | Enrich et al. | |
| 2014/0237033 A1 | 8/2014 | Shang | |
| 2015/0135198 A1 | 5/2015 | Pack, III et al. | |
| 2015/0339033 A1 | 11/2015 | Arnold et al. | |
| 2016/0034274 A1 | 2/2016 | Diao et al. | |
| 2016/0055040 A1 | 2/2016 | Treat et al. | |
| 2016/0101522 A1 | 4/2016 | Hiruma et al. | |
| 2016/0132600 A1 | 5/2016 | Woodhead et al. | |
| 2016/0182657 A1 | 6/2016 | Mukherjee et al. | |
| 2016/0229052 A1 | 8/2016 | Touma et al. | |
| 2016/0240094 A1 | 8/2016 | Yan | |
| 2016/0313939 A1 | 10/2016 | Andrews et al. | |
| 2016/0378291 A1 | 12/2016 | Pokrzywka | |
| 2017/0109601 A1 | 4/2017 | Gurwicz et al. | |
| 2017/0124531 A1 | 5/2017 | McCormack | |
| 2017/0190052 A1 | 7/2017 | Jaekel et al. | |
| 2017/0277396 A1 | 9/2017 | Chung et al. | |
| 2017/0300564 A1 | 10/2017 | Feng et al. | |
| 2017/0364576 A1 | 12/2017 | Chesla et al. | |
| 2018/0027006 A1 | 1/2018 | Zimmermann et al. | |
| 2018/0034657 A1 | 2/2018 | Brown et al. | |
| 2018/0101466 A1 | 4/2018 | O'Dowd et al. | |
| 2018/0113780 A1 | 4/2018 | Kim et al. | |
| 2018/0113781 A1 | 4/2018 | Kim et al. | |
| 2018/0181377 A1 | 6/2018 | Kim et al. | |
| 2018/0322004 A1 | 11/2018 | Jain et al. | |
| 2018/0349482 A1 * | 12/2018 | Oliner | G06F 16/38 |
| 2018/0365309 A1 * | 12/2018 | Oliner | G06F 9/542 |
| 2019/0034173 A1 | 1/2019 | Kim et al. | |
| 2019/0179290 A1 | 6/2019 | Yoshida et al. | |
| 2020/0147791 A1 | 5/2020 | Safary et al. | |
| 2020/0183656 A1 | 6/2020 | Kim et al. | |
| 2020/0206920 A1 | 7/2020 | Ma et al. | |
| 2020/0233707 A1 | 7/2020 | Ramamurthy et al. | |
| 2020/0358796 A1 | 11/2020 | Kundu et al. | |
| 2021/0117232 A1 | 4/2021 | Sriharsha et al. | |
| 2021/0149641 A1 | 5/2021 | Kim et al. | |
| 2021/0158268 A1 | 5/2021 | Berg et al. | |
| 2022/0188283 A1 | 6/2022 | Jamieson et al. | |
| 2024/0303100 A1 | 9/2024 | Nychis et al. | |
| 2025/0085929 A1 | 3/2025 | Kim et al. | |

OTHER PUBLICATIONS

Extended European Search Report for European Application No. 17864947.1 dated Jun. 2, 2020.

Communication pursuant to Article 94(3) EPC for European Application No. 17864947.1 dated Oct. 28, 2021.

Clapp et al., Minimizing GUI Event Traces. Stanford University. FSE' 2016:422-34.

LÜ et al., Gesture studio: authoring multi-touch interactions through demonstration and declaration. Proceedings of the SIGCHI Conference on Human Factors in Computing Systems, ACM. Apr. 27, 2013:257-266.

Oh et al., Audio-based feedback techniques for teaching touch-screen gestures. ACM Transactions on Accessible Computing (TACCESS). Nov. 14, 2015;7(3):29 pages.

Zhang et al., Panappticon: Event-based Tracing to Measure Mobile Application and Platform Performance. IEEE. 2013:10 pages.

\* cited by examiner

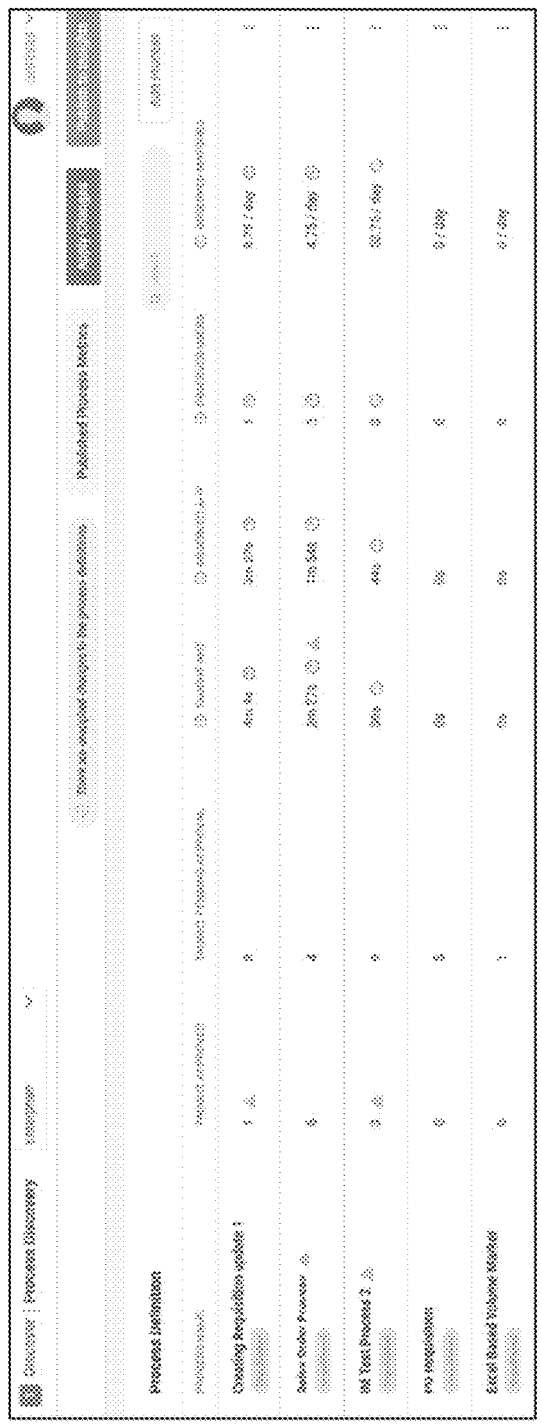
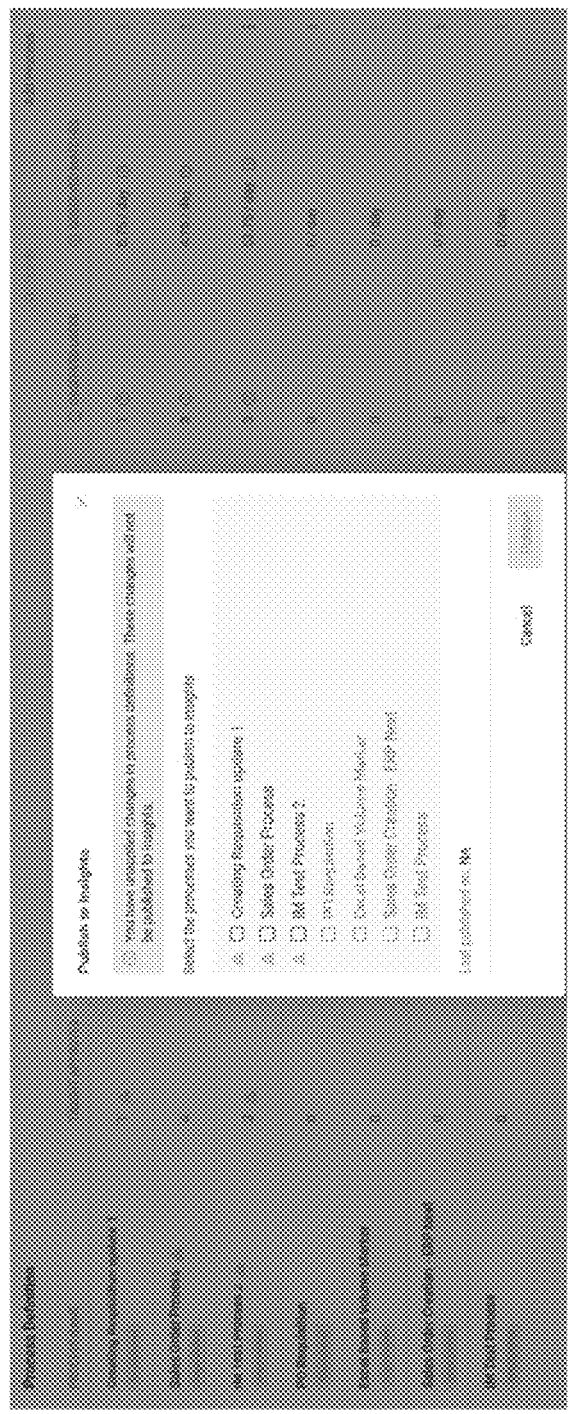
FIG. 16A
FIG. 16B

SYSTEMS AND METHODS FOR AUTOMATED PROCESS DISCOVERY

CROSS-REFERENCE TO RELATED APPLICATIONS

This Application is a continuation of and claims priority under 35 U.S.C. § 120 to U.S. application Ser. No. 18/662,677, filed May 13, 2024, entitled "SYSTEMS AND METHODS FOR AUTOMATED PROCESS DISCOVERY", which is a continuation of and claims priority under 35 U.S.C. § 120 to U.S. application Ser. No. 17/711,775, filed Apr. 1, 2022, entitled "SYSTEMS AND METHODS FOR AUTOMATED PROCESS DISCOVERY", which claims the benefit of priority under 35 U.S.C. § 119(e) to U.S. Provisional Application Ser. No. 63/170,434, titled "SYSTEMS AND METHODS FOR AUTOMATED PROCESS DISCOVERY", filed on Apr. 2, 2021, each of which is incorporated by reference herein in its entirety.

BACKGROUND

Employees at many companies spend much of their time working on computers. An employer may monitor an employee's computer activity by installing a monitoring application program on the employee's work computer to monitor the employee's actions. For example, an employer may install a keystroke logger application on the employee's work computer. The keystroke logger application may be used to capture the employee's keystrokes and store the captured keystrokes in a text file for subsequent analysis.

SUMMARY

Some embodiments provide for a method, comprising: receiving, by a computing device, a user indication to start a teaching mode in which the user can teach an instance of a process; configuring the computing device to start the teaching mode in response to receiving the indication; capturing, when in the teaching mode, first information corresponding to a first stream of events captured by the computing device during performance of a first plurality of actions by the user when interacting with the computing device to perform the process; generating, using the first information, a first visualization of at least some of the first plurality of actions; and displaying the first visualization on a graphical user interface of the computing device.

Some embodiments provide for a system comprising: a computing device; and at least one non-transitory computer-readable storage medium having stored thereon instructions which, when executed, program the computing device to perform a method, comprising: receiving, by the computing device, a user indication to start a teaching mode in which the user can teach an instance of a process; configuring the computing device to start the teaching mode in response to receiving the indication; capturing, when in the teaching mode, first information corresponding to a first stream of events captured by the computing device during performance of a first plurality of actions by the user when interacting with the computing device to perform the process; generating, using the first information, a first visualization of at least some of the first plurality of actions; and displaying the first visualization on a graphical user interface of the computing device.

Some embodiments provide for at least one non-transitory computer-readable storage medium having stored thereon instructions which, when executed, program a computing device to perform a method, comprising: receiving, by the computing device, a user indication to start a teaching mode in which the user can teach an instance of a process; configuring the computing device to start the teaching mode in response to receiving the indication; capturing, when in the teaching mode, first information corresponding to a first stream of events captured by the computing device during performance of a first plurality of actions by the user when interacting with the computing device to perform the process; generating, using the first information, a first visualization of at least some of the first plurality of actions; and displaying the first visualization on a graphical user interface of the computing device.

In some embodiments, the first visualization includes at least one flow diagram indicating a sequence of the at least some of the first plurality of actions.

In some embodiments, the first visualization includes a plurality of images indicating a sequence of the first plurality of actions.

In some embodiments, the method further comprises generating based, at least in part, on a plurality of taught instances of the process, a signature for the process.

In some embodiments, the method further comprises: providing feedback to the user during performance of the process, wherein the feedback is provided via the graphical user interface and is based, at least in part, on the generated signature for the process.

In some embodiments, the signature for the process includes a second plurality of actions, and the method further comprises: determining that at least one action in the second plurality of actions is not included in the first plurality of actions; and prompting the user to perform the at least one action not included in the first plurality of actions.

In some embodiments, the method further comprises: capturing while in the teaching mode, second information corresponding to a second stream of events captured by the computing device during performance of a second plurality of actions by the user when interacting with the computing device to perform the process; and updating the signature based, at least in part, on the second stream of events.

In some embodiments, the method further comprises: using the signature to discover the process in a second stream of events captured when the computing device is not in the teaching mode.

In some embodiments, generating a first visualization of the first plurality of actions comprises: grouping at least some events in the first stream of events into the first plurality of actions.

In some embodiments, the first visualization further includes an amount of time that it took the user to complete performance of the process.

In some embodiments, the first visualization further includes information about a number of times the user performed the process while the computing device was in the teaching mode.

Some embodiments provide for a method of updating a signature of a first process, the signature used to discover the first process in a stream of events captured by a computing device, the method comprising: displaying, on a graphical user interface (GUI), a visualization of the signature, wherein the visualization includes GUI elements corresponding to a plurality of actions performed during performance of the first process by one or more users; associating, based on first input received via the graphical user interface, a first marker with a first action of the plurality of actions included in the visualization; and updating the signature of the first process based, at least in part, on the association of the first marker with the first action.

Some embodiments provide for a system comprising: at least one computing device; and at least one non-transitory computer-readable storage medium having stored thereon instructions which, when executed, program the at least one computing device to perform a method of updating a signature of a first process, the signature used to discover the first process in a stream of events captured by a computing device, the method comprising: displaying, on a graphical user interface (GUI), a visualization of the signature, wherein the visualization includes GUI elements corresponding to a plurality of actions performed during performance of the first process by one or more users; associating, based on first input received via the graphical user interface, a first marker with a first action of the plurality of actions included in the visualization; and updating the signature of the first process based, at least in part, on the association of the first marker with the first action.

Some embodiments provide for at least one non-transitory computer-readable storage medium having stored thereon instructions which, when executed, program at least one computing device to perform a method of updating a signature of a first process, the signature used to discover the first process in a stream of events captured by a computing device, the method comprising: displaying, on a graphical user interface (GUI), a visualization of the signature, wherein the visualization includes GUI elements corresponding to a plurality of actions performed during performance of the first process by one or more users; associating, based on first input received via the graphical user interface, a first marker with a first action of the plurality of actions included in the visualization; and updating the signature of the first process based, at least in part, on the association of the first marker with the first action.

In some embodiments, the first marker when associated with the first action indicates that the first action is required for performance of the first process.

In some embodiments, the first marker when associated with the first action indicates that the first action differentiates the first process from a second process different from the first process.

In some embodiments, the first marker when associated with the first action indicates that the first action should not be included in the first process.

In some embodiments, the first marker when associated with the first action indicates that the first action is too specific for the first process.

In some embodiments, the first action includes information associated with a plurality of events, and the method further comprising: deleting at least a portion of the information prior to updating the signature.

In some embodiments, the method further comprises: using the updated signature to discover the first process in a stream of events captured by at least one computing device.

In some embodiments, the method further comprises: associating, based on second input received via the GUI, a second marker with a second action of the plurality of actions included in the visualization; and updating the signature of the first process further based, at least in part, on the association of the second marker with the second action.

In some embodiments, the first marker and the second marker are different.

In some embodiments, the signature includes a plurality of weights associated with the plurality of actions, and wherein updating the signature comprises updating a weight associated with the first action in response to the association of the first marker with the first action.

In some embodiments, the visualization is a flow diagram, wherein the plurality of actions are represented as nodes in the flow diagram connected to each other by a plurality of edges representing transitions between actions of the plurality of actions.

In some embodiments, the plurality of actions included in the visualization are arranged in time-sequential order based on when each action of the plurality of actions is performed during performance of the first process.

In some embodiments, the method further comprises: prior to visualization of the signature, generating the signature of the first process in a teaching mode from information captured, in the teaching mode, during performance of the first process by one or multiple users.

Some embodiments provide for a method, comprising: using at least one computer hardware processor to perform: generating a first visualization of a first instance of a first process using first information captured during performance of the first process by a first user at a first computing device; generating a second visualization of a second instance of a second process using second information captured during performance of the second process by a second user at a second computing device; generating a graphical user interface (GUI) comprising the first visualization of the first instance of the first process and the second visualization of the second instance of the second process; and displaying the GUI.

Some embodiments provide for a system comprising: at least one computing device; and at least one computer-readable storage medium having stored thereon instructions which, when executed, program the at least one computing device to perform a method, comprising: using at least one computer hardware processor to perform: generating a first visualization of a first instance of a first process using first information captured during performance of the first process by a first user at a first computing device; generating a second visualization of a second instance of a second process using second information captured during performance of the second process by a second user at a second computing device; generating a graphical user interface (GUI) comprising the first visualization of the first instance of the first process and the second visualization of the second instance of the second process; and displaying the GUI.

Some embodiments provide for at least one non-transitory computer-readable storage medium having stored thereon instructions which, when executed, program at least one computing device to perform a method, comprising: using at least one computer hardware processor to perform: generating a first visualization of a first instance of a first process using first information captured during performance of the first process by a first user at a first computing device; generating a second visualization of a second instance of a second process using second information captured during performance of the second process by a second user at a second computing device; generating a graphical user interface (GUI) comprising the first visualization of the first instance of the first process and the second visualization of the second instance of the second process; and displaying the GUI.

In some embodiments, the method further comprises: prompting, via the GUI, a user to provide input indicating whether the first instance and the second instance are instances of a same process.

In some embodiments, the method further comprises: receiving, via the GUI, an indication that the first instance and the second instance are instances of the same process.

In some embodiments, the first process and the second process are the same process.

In some embodiments, the method further comprises: receiving, via the GUI, an indication that the first instance and the second instance are instances of different processes.

In some embodiments, the first process is different from the second process.

In some embodiments, the first information captured during performance of the first process by the first user comprises information corresponding to a first stream of events captured during performance of first actions by the first user.

In some embodiments, generating the first visualization of the first instance of the process comprises: identifying at least some of the first actions performed by the first user in furtherance of the first process; and generating a first flow diagram comprising: nodes corresponding to the at least some of the first actions; and directed edges corresponding to transitions among the at least some of the first actions.

In some embodiments, the first flow diagram consists of directed edges corresponding to a subset of the transitions among the at least some of the first actions.

In some embodiments, the first flow diagram displays the nodes in an ordered sequence, the method further comprising: identifying the subset of the transitions at least in part by removing transitions corresponding to transitions from nodes in the ordered sequence to nodes appearing at least a threshold number of nodes earlier in the ordered sequence.

In some embodiments, the nodes are ordered in the ordered sequence based on a time order in which the at least some of the first actions were performed by the first user.

In some embodiments, the first and second visualizations are shown simultaneously in the GUI.

In some embodiments, the first and second visualizations are shown side-by-side.

In some embodiments, the method further comprises: visually indicating on the first visualization and/or the second visualization at least one difference between the first visualization and the second visualization.

In some embodiments, visually indicating the at least one difference between the first visualization and the second visualization comprises highlighting at least one node of the first visualization representing an action not represented by any node in the second visualization.

In some embodiments, the first user is the second user. In some embodiments, the first computing device is the second computing device. In some embodiments, the first user is different from the second user. In some embodiments, the first computing device is different from the second computing device.

In some embodiments, the first information captured during performance of the first process is captured in a teaching mode for subsequent use in generating a signature of the first process.

In some embodiments, the method further comprises generating the signature of the first process using the first information, and using the generated signature to discover one or more instances of the first process in one or more streams of data captured at a computing device when a user was interacting with the computing device to perform one or more actions.

In some embodiments, generating the graphical user interface (GUI) comprises one or more graphical user elements through which the user can group and/or filter multiple process instances.

It should be appreciated that all combinations of the foregoing concepts and additional concepts described in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various non-limiting embodiments of the technology will be described with reference to the following figures. It should be appreciated that the figures are not necessarily drawn to scale.

FIGS. 2A-2E illustrates portions of a user interface for defining attributes of a process in accordance with some embodiments;

FIGS. 14A-14C illustrate portions of a user interface configured to display results and metrics for discovered instances of a process identified during process discovery in accordance with some embodiments;

FIGS. 16A and 16B illustrate portions of a user interface configured to enable a user to evaluate and publish process discovery results in accordance with some embodiments;

DETAILED DESCRIPTION

Figure 1A:
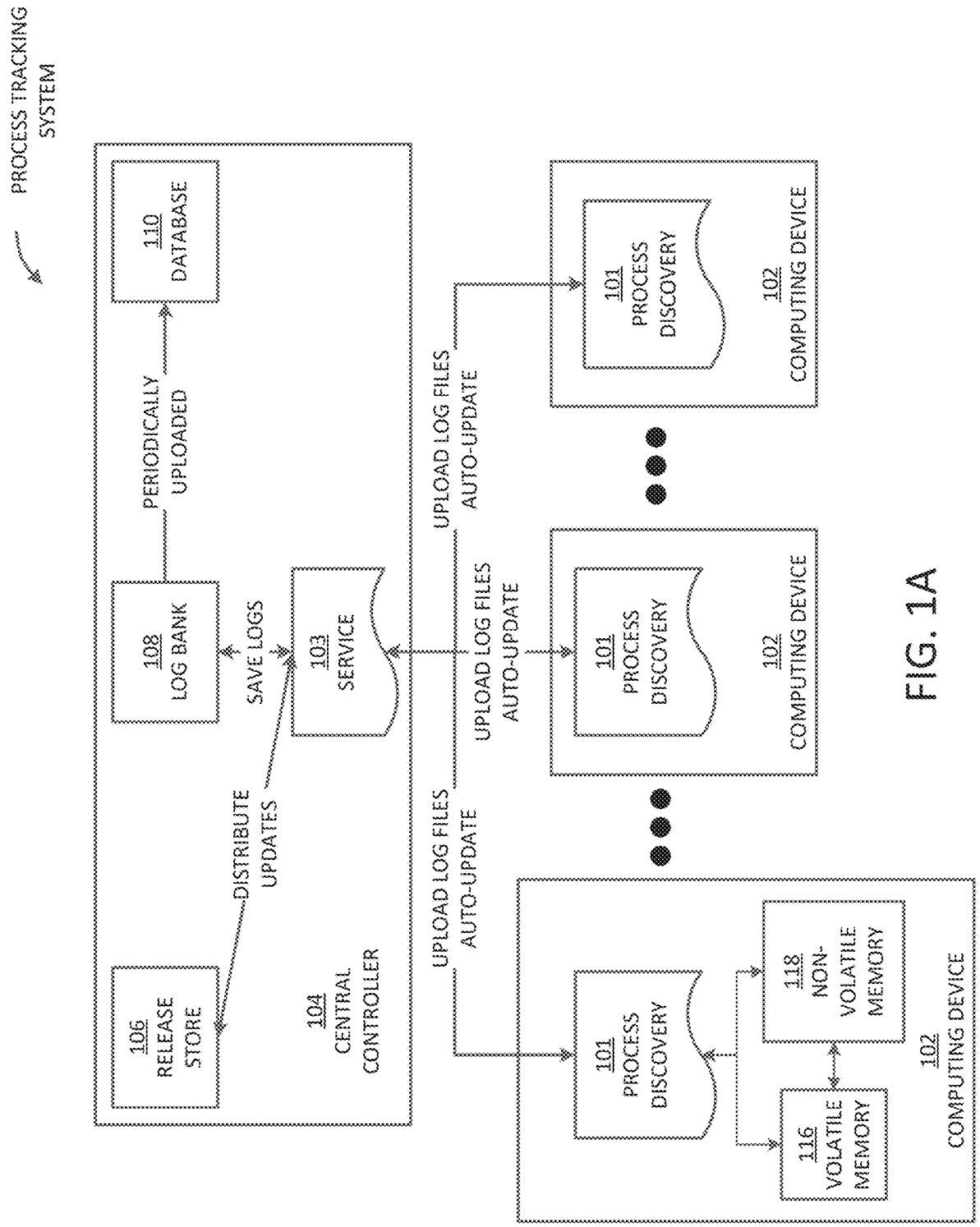
FIG. 1A is a block diagram including components of a process tracking system, according to some embodiments.

Aspects of the technology described herein relate to improvements in robotic process automation technology. Generally, robotic process automation involves two stages: (1) an information gathering stage that involves identifying processes being performed by one or more users; and (2) an automation stage that involves automating these processes through software programs, sometimes referred to as "software robots," which can perform the identified processes more efficiently thereby assisting the users and/or freeing them up to attend to other work.

In the automation stage, in some embodiments, the information collected during the information gathering stage may be employed to create software robot computer programs (hereinafter, "software robots") that are configured to programmatically control one or more other computer programs (e.g., one or more application programs and/or one or more operating systems) to perform one or more tasks at least in part via the graphical user interfaces (GUIs) and/or application programming interfaces (APIs) of the other computer program(s). For example, an automatable task may be identified from the data collected during the information gathering stage and a software developer may create a software robot to perform the automatable task. In another example, all or any portion of a software robot configured to perform the automatable task may be automatically generated by a computer system based on the collected computer usage information. Some aspects of software robots are described in U.S. Pat. No. 10,474,313, titled "SOFTWARE ROBOTS FOR PROGRAMMATICALLY CONTROLLING COMPUTER PROGRAMS TO PERFORM TASKS," granted on Nov. 12, 2019, filed on Mar. 3, 2016, which is incorporated herein by reference in its entirety.

The inventors have recognized that conventional techniques applied during the information gathering stage suffer from numerous drawbacks and can be improved upon. For example, some conventional techniques involve interviewing people to ask them how they perform certain computerized processes and the steps involved. However, this approach is very limited. Such interviews often result in information that is incorrect and unusable for automation. With respect to correctness, organizations rarely know which people are the ones performing certain processes, how long each of them takes to perform the process and, most importantly, interviewing reveals only high-level information (e.g., some of the application programs that may be used in performing the process), but not the low-level information needed to automate the process such as, for example, information indicating what low-level acts (e.g., mouse clicks, keystrokes, button presses) are performed in each application that is used, the screens and interfaces within each application that are used, and the order in which all the various acts (low- and high-level) are performed. Without such detailed information it is difficult, if not outright impossible, to generate a software robot to automate the process and have that software robot perform the desired process accurately. Additionally, interview-based approaches make it impossible to collect data for metrics (e.g., how long processes take to perform on average, how many users are involved, what is the value (e.g., savings and/or efficiency gained) of automating a particular process, etc.)

Other conventional methods have tried to address the above shortcomings of the interviewing approach through automated processing of log files generated by application programs that may be utilized by users when performing processes. However, such log-mining approaches have limited utility because they are supported for only a handful of application programs (e.g., SAP) that generate such logs, and because such logs still do not contain the right level of detail in the data from which processes may be reliably discovered and automated. For example, such logs may indicate which application programs are used, but not what the user did within each application program and in what order. These approaches monitor the overall system but do not collect user-level data and, as a result, do not have access to information such as, for example, how long it takes various users to perform the process, how many times the process performed across a large organization, click-level data, etc.

The inventors have appreciated that to address the above shortcomings of conventional approaches, one approach can be to collect low-level data such as click and keystroke data from multiple users for a period of time and analyze that data to discern or discover, in these data, instances of one or more processes being performed by the monitored users. The inventors recognized that conventional techniques do not involve collection of such data because it is noisy, voluminous requiring substantial computational and storage resources to handle (e.g., such data can include gigabytes of data per user per day and terabytes or petabytes of data across an enterprise per over days and weeks), and such data is difficult to analyze because it is noisy and disorganized. However, the inventors have developed techniques described herein for precisely doing this—the techniques described herein developed by the inventors allow for accurate, intuitive, and computationally efficient ways of processing low-level data (e.g., click and keystroke data across multiple applications) to identify processes being performed by multiple users in an enterprise (e.g., a business having tens, hundreds, thousands or even tens of thousands of users). These techniques constitute an improvement to robotic process automation technology.

There are various aspects of the techniques developed by the inventors that enable such voluminous low-level data to be analyzed efficiently and accurately. One aspect of the techniques developed by the inventors is the notion of a "signature" or fingerprint representing a process. A signature for a particular process can be used to rapidly process large volumes of low-level data gathered during user monitoring to identify instances of that particular process being performed by one or more users. The inventors have developed various types of signatures, examples of which are provided herein, and have also developed techniques that allow a process discovery software system to "learn" the signature of a particular process. This is done through a teaching mechanism in which the process discovery software is placed into a "teaching mode" and one or more users perform one or more instances of the particular process while the process discovery software is capturing low-level data as the user interacts with his/her computing device using multiple different application programs, user interfaces of the application program(s), and the buttons, fields, and other user interface elements therein. In turn, the taught process instances may be used to generate a process signature, in accordance with the techniques described herein. The generated process signature may be then used to discover, efficiently, other instances of the process from data collected by monitoring one or more other users (e.g., other users at an enterprise).

In some embodiments, the process signature may be compact and may contain a small amount of data relative to the data collected for a particular process instance. As a result, using the process signature to search for process instances can be implemented efficiently, reducing the computational burden on the process discovery system. By contrast, recording a single process instance and attempting to correlate that process instance with volumes of data, would be computationally inefficient. In this sense, the process signature techniques described herein provide an improvement not only to robotic process automation technology, but also to the functioning of a computer because they substantially reduce the amount of computational resources required to identify process instances while performing process discovery.

Additionally, the inventors have developed multiple tools for understanding and visualizing aspects of the signature generation and process discovery techniques. As described herein, the inventors have developed techniques for visualizing process signatures generated from taught process instances and for ways in which users can correct and/or update the generated signatures to be more accurate so that, once the updated process signatures are used for process discovery, the results are more accurate. Also, as described herein, the inventors have developed techniques to visualize process instances (including taught process instances and discovered or observed process instances), which enables users to determine whether certain process instances automatically discovered (e.g., by using a process signature) by process discovery software and automatically associated to a particular process are in fact instances of the particular process or whether they are instances of another process. Numerous other techniques for signature generation, process discovery, teaching, visualization, updating of results, and other aspects of process discovery are described herein.

FIG. 1A shows an example process tracking system 100, according to some embodiments. The process tracking system 100 is suitable to track one or more processes being performed by users on a plurality of computing devices 102. Each of the computing devices 102 may comprise a volatile memory 116 and a non-volatile memory 118. At least some of the computing devices may be configured to execute process discovery module 101 (also referred to herein as "Scout™") that tracks user interaction with the respective computing device 102. Process discovery module 101 may be, for example, implemented as a software application and installed on an operating system, such as the WINDOWS* operating system or any other suitable operating system, running on the computing device 102. In another example, process discovery module 101 may be integrated into the operating system running on the computing device 102. As shown in FIG. 1A, process tracking system 100 further includes a central controller 104 that may be a computing device, such as a server, including a release store 106, a log bank 108, and a database 110. The central controller 104 may be configured to execute a service 103 that gathers the computer usage information collected from the process discovery modules 101 executing on the computing devices 102 and store the collected information in the database 110. Service 103 may be implemented in any of a variety of ways including, for example, as a web-application. In some embodiments, service 103 may be a python Web Server Gateway Interface (WSGI) application that is exposed as a web resource to the process discovery modules 101 running on the computing devices 102.

In some embodiments, process discovery module 101 may monitor the particular tasks being performed on the computing device 102 on which it is running. For example, process discovery module 101 may monitor the task being performed by monitoring keystrokes and/or clicks and gathering contextual information associated with each keystroke and/or click. The contextual information may include information indicative of the state of the user interface when the keystroke and/or click occurred. For example, the contextual information may include information regarding a state of the user interface such as the name of the particular application that the user interacted with, the particular button or field that the user interacted with, and/or the uniform resource locator (URL) link in an active web-browser. The contextual information may be leveraged to gain insight regarding the particular task that the user is performing. For example, a software developer may be using the computing device 102 to develop source code and may be continuously switching between an application suitable for developing source code and a web-browser to locate code snippets. Unlike traditional keystroke loggers that would merely gather a string of depressed keys including bits of source code and web URLs, process discovery module 101 may advantageously gather useful contextual information such as the particular active application associated with each keystroke. Thereby, the task of developing source code may be more readily identified in the collected data by analyzing the active applications.

The data collection processes performed by process discovery module 101 may be seamless to a user of the computing device 102. For example, process discovery module 101 may gather the computer usage data without introducing a perceivable lag to the user between when one or more actions of a process are performed and when the user interface is updated. Further, process discovery module 101 may automatically store the collected computer usage data in the volatile memory 116 and periodically (or aperiodically or according to a pre-defined schedule) transfer portions of the collected computer usage data from the volatile memory 116 to the non-volatile memory 118. Thereby, process discovery module 101 may automatically upload captured information in the form of log files from the non-volatile memory 118 to service 103 and/or receive updates from service 103. Accordingly, process discovery module 101 may be completely unobtrusive on the user experience.

In some embodiments, the process discovery module 101 running on each computing device 102 may upload log files to service 103 that include computer usage information such as information indicative of one or more actions performed by a user on the respective computing device 102 and contextual information associated those actions. Service 103 may, in turn, receive these log files and store the log files in the log bank 108. Service 103 may also periodically upload the logs in the log bank 108 to a database 110. It should be appreciated that the database 110 may be any type of database including, for example, a relational database such as PostgreSQL. Further, the events stored in the database 110 and/or the log bank 108 may be stored redundantly to reduce the likelihood of data loss from, for example, equipment failures. The redundancy may be added by, for example, by duplicating the log bank 108 and/or the database 110.

In some embodiments, service 103 may distribute updates (e.g., software updates) to the process discovery modules 101 running on each of the computing devices 102. For example, process discovery module 101 may request information regarding the latest updates that are available. In this example, service 103 may respond to the request by reading information from the release store 106 to identify the latest software updates and provide information indicative of the latest update to the process discovery module 101 that issued the request. If the process discovery module 101 returns with a request to download the latest version, the service 103 may retrieve the latest update from the release store 106 and provide the latest update to the process discovery module 101 that issued the request.

In some embodiments, service 103 may implement various security features to ensure that the data that passes between service 103 and one or more process discovery modules 101 is secure. For example, a Public Key Infrastructure may be employed by which process discovery module 101 must authenticate itself using a client certificate to access any part of the service 103. Further, the transactions between process discovery module 101 and service 103 may be performed over HTTPS and thus encrypted.

In some embodiments, service 103 makes the collected computer usage information in the database 110 and/or information based on the collected computer usage information (e.g., signatures of a process as described in more detail below) available to users. For example, service 103 (or some other component in communication with service 103) may be configured to provide a visual representation of at least some of the information stored in the database 110 and/or information based on the stored information to one or more users (e.g., of computing devices 102). For example, a series of user interface screens that permit a user to interact with the computer usage data in the database 110 and/or information based on the stored computer usage data may be provided as the visual representation. These user interface screens may be accessible over the Internet using, for example, HTTPS. It should be appreciated that service 103 may provide access to the data in the database 110 through still yet other ways. For example, service 103 may accept queries through a command-line interface (CLI), such as psql, or a graphical user interface (GUI), such as pgAdmin.

Some embodiments relate to using user interaction information collected via one or more process discovery modules 101 to generate a signature of a process that can then be used to identify instances of the process from captured data corresponding to further user interaction information collected via the one or more of the process discovery modules.

Various components in process tracker system 100 may be used to perform one or more of signature generation, process discovery, visualization of process instances (taught instances and/or observed instances), providing a graphical user interface to receive user feedback and to facilitate teaching of processes, and analyze process discovery results. For example, in some embodiments, one or more of these techniques such as providing a GUI to receive user feedback and to facilitate teaching or process instances may be performed locally on a computing device 102 by process discovery module 101 executing on the computing device, whereas service 103 may be configured to gather data from taught instances across multiple users and/or computing devices and generate one or more process signatures based on the combined data. Process discovery may also be performed locally on individual computing devices 102 by process discovery modules 101, which may be updated with the most recent process signatures stored centrally by service 103 periodically, aperiodically or in response to a request from the computing device to provide an update. In some embodiments, process discovery may be performed centrally, with data collected by process discovery modules 101 executing on computing devices 102 being forwarded to service 103, and with service 103 performing process discovery on the received data (from computing devices 102) using one or more process signatures. In some embodiments, process discovery results may be analyzed using one or more software tools as described herein, and the software tools may execute locally on one or more computing device(s) 102, centrally as part of service 103, and/or in any suitable combination of local and centralized processing.

Regardless of whether process discovery is performed locally, centrally, or in a combination of local and central processing, in some embodiments, process discovery results may be analyzed by any user.

It should be appreciated that the above-described architecture in which some functions are performed locally on computing devices 102 and other functions are performed centrally (e.g., on a server) is only one such embodiment, and various other architectures in which all functions (e.g., signature generation, process discovery, visualization, teaching, signature updating, analysis of process discovery results) are performed locally, all functions are performed remotely, or a mixture of local and remote resources are used to perform the functions described herein are also contemplated as being part of the technology described herein.

Figure 1B:
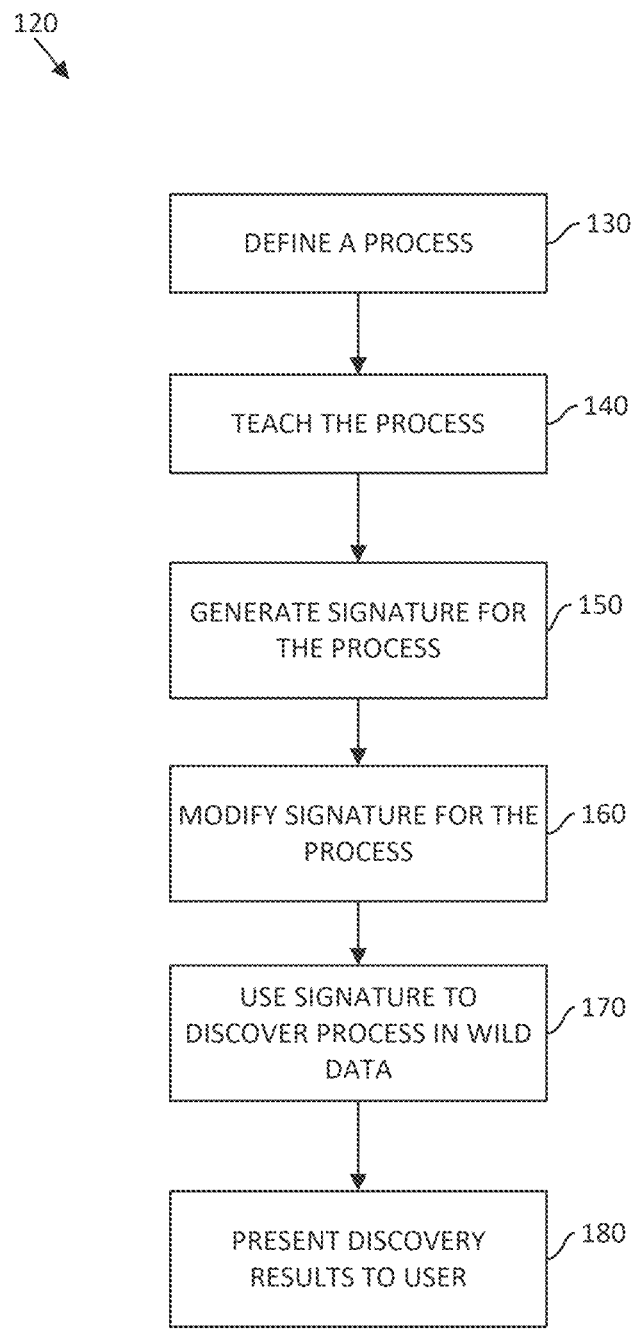
FIG. 1B illustrates a flowchart of acts for signature generation and process discovery in accordance with some embodiments.

FIG. 1B illustrates a flowchart of a method 120 of acts for generating and using a signature of a process to perform discovery of a process in accordance with some embodiments. At least some of the acts of method 120 may be performed by any suitable computing device(s) and, for example, may be performed by one or more of the computing devices 102 shown in process tracking system 100 of FIG. 1A.

Figure 2A:
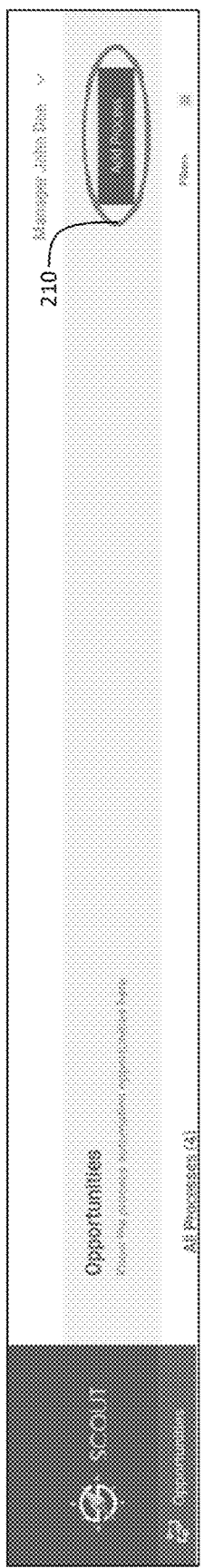
Figure 2B:
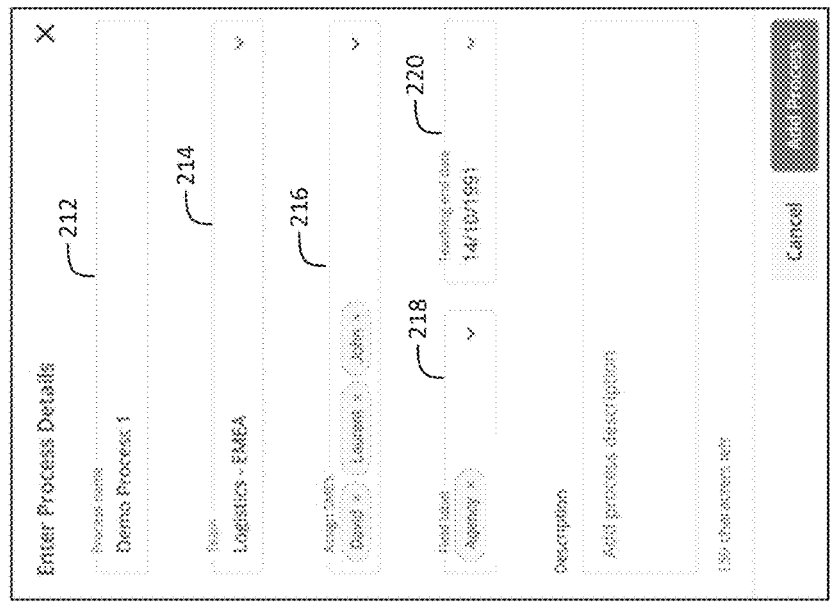

In act 130, a process to which teaching/training can be associated is defined (e.g., by providing a name for the process and other information for the process, as described in more detail below in connection with FIGS. 2A and 2B). A "process" as that term is used herein, refers to a plurality of user actions that are collectively performed to achieve a task. The task may be any suitable task that could be performed by a user (or multiple users) by interacting with one or more computing devices. The task, in some embodiments, may be any suitable task that one or more users perform in a business such as, for example, one or more accounting, finance, IT, human resources, purchasing, and/or any other types of tasks. For example, a process may refer to a plurality of user actions that a user takes to perform the task of receiving a purchase order, reviewing the purchase order, and approving the purchase order. As another example, a process may refer to a plurality of user actions that a user takes to perform the task of opening an IT ticket for an issue (e.g., resetting a user's password), addressing the issue, and closing same (e.g., by resetting the password and notifying the user whose password was reset that this is completed). Some processes may include only a few (e.g., 2 or 3) user actions, whereas other processes may include more (e.g., tens, hundreds, or thousands) user actions.

As described herein, a process is a unit of discovery that is searched for during "process discovery" to identify instances of the process in data other than training data, often referred to herein as "wild data" or "data in the wild." In some embodiments, the "wild data" may be data captured during interaction between users and their computing devices. The data captured may include keystrokes, mouse clicks, and associated metadata. In turn, the captured data may be analyzed using the techniques described herein to identify instances of one or more processes being performed by the users. Examples of the types of data that may be captured are provided herein and in U.S. Pat. No. 10,831,450, titled "SYSTEMS AND METHODS FOR DISCOVERING AUTOMATABLE TASKS," granted on Nov. 10, 2020, which is incorporated by reference herein in its entirety.

After a process is defined, method 120 proceeds to act 140, where one or more users "teach" the process by performing a plurality of actions that collectively form the process while interactions between the user and their computing device are captured (e.g., by using a process discovery module 101 executing on the computing device(s) 102 of the user(s)). Each performance of the process by a user may be called an "instance" of the process, and the data captured during the user's performance of the instance may be stored in association with the instance (e.g., in association with an identifier corresponding to the instance of the process). Specifically, with respect to teaching, an instance performed during teaching may be called a "teaching instance" performed by a user, and a collection of instances taught by one or more users for a particular process may be called the "taught instances" for that process. The information captured during a user's performance of a teaching instance may be called a "stream of events," a "plurality of events" or simply "events." The events in a stream of events may correspond to individual keystrokes, clicks, etc. captured by the process discovery module during performance of the teaching instance.

Method 120 then proceeds to act 150, where a signature for the process is generated based on the taught instances of the process. A "signature" of the process (also referred to herein as a "process signature") is a representation of the plurality of actions used to perform the process. The signature may include all or only a subset of the actions performed during teaching of the process and may be represented and stored in any suitable manner, examples of which are provided below in connection with FIGS. 3-6.

Following generation of a signature for a process, method 120 then proceeds to act 160, where a user may modify one or more aspects of the signature generated for the process. For example, as described in more detail below, some embodiments provide a visualization of a signature of a process that enables a user to identify information about individual taught instances of the process that were used to generate the signature. The user may interact with a user interface on which the visualization is displayed to modify one or more aspects of the signature (e.g., by modifying (increasing or decreasing) an importance of teaching instance used to generate the signature). In response to the modification(s), the signature may be regenerated based on the modified aspects, and the modified signature may be used for process discovery, as described in further detail below. Method 120 then proceeds to act 170, where the generated signature is used to discover the process (referred to herein as "process discovery" or simply "discovery") in wild data (i.e., data on which the process was not taught). Each identification of the process during process discovery may be called a "discovered instance" or "observed instance" of the process. Similar to data captured during performance of a teaching instance, the wild data may also correspond to a stream of events performed by a user, and process discovery may operate by discovering the process in the stream of events.

Following process discovery, method 120 proceeds to act 180, where the process discovery results are provided to the user. As described in more detail below, in some embodiments, one or more visualizations of the process discovery results may be displayed to a user to provide the user insight into whether process discovery for a particular process is operating in a manner that is consistent with the user's expectations. The user may interact with a user interface on which the visualization(s) of the process discovery results are shown to tune how process discovery operates.

It should be appreciated that one or more of the acts of method 120 may be optional. For example, act 160 may be optional and the signature generated in act 150 may be used in act 170 for process discovery without modification. Additionally or alternatively, act 130 may be optional as the user may choose to teach an instance of a process that has been previously defined rather than being defined as part of method 120. As another example, additionally or alternatively, only acts 140 and 150 may be used, with the result being generation of a signature of a process, and discovery may not be performed until the generated signature is approved for use. As another example, acts 140, 150, 160, and 170 (or any subset of these acts) may be used, but results of process discovery may not be presented to a user or the process discovery results may be presented to a user at a later time. The data about discovered processes may be collected and stored for subsequent analysis and/or visualization. Each of the acts in method 120 is described in more detail below.

A process may be defined in act 130 of method 120 in any suitable way. For example, a user may manually define the process by, for example, interacting with a (e.g., graphical) user interface that enables the user to manually define the process. In other embodiments, a user may define a process by selecting a pre-defined process from a list and use the pre-defined process without modification. In yet further embodiments, a user may define a process by selecting a pre-defined process from a list and then modifying the selected pre-defined process in any suitable way. It should be appreciated that in embodiments that use pre-defined processes, the pre-defined processes may have been defined manually, may have been discovered using process discovery, as described herein, or may have been discovered using process discovery and subsequently modified by one or more users.

Since there are many common business processes across global organizations, a process is defined, in some embodiments, by selecting the process from a list of pre-defined processes and associating the selected process with a group of users (e.g., a team of employees at a company). For example, "Submit Purchase Order" is a business process that is typically conducted in organizations across many verticals in a purchasing or finance department of a company. As such, some embodiments include a list of common pre-defined processes, and a process may be defined by selecting the process from the list. The inventors have appreciated that even if a process is pre-defined (e.g., "Submit Purchase Order"), the process may still need to be taught by users in an organization since the pre-defined process may include different actions across applications in different organizations, all of which may not be performed by users of a particular organization for which the process is being taught.

Some processes may not be included in a pre-defined list (e.g., because the process is specific to an organization), but may nonetheless be defined using the techniques described herein. In such instances, some embodiments enable a user to explicitly (e.g., manually) define the process via a user interface, an example of which is shown in FIG. 2A. For instance, the user may explicitly define a process by interacting with a user interface element (e.g., button 210) to add details for the process. In some embodiments, one or more candidate processes may be suggested to a user following process discovery, examples of which are described in more detail below, and the user may define a process by selecting one of the one or more suggested candidate processes and optionally making further modifications to the selected process.

Defining a process may also include associating metadata with the process for the benefit of discovery, training, and management of the defined processes. FIG. 2B illustrates a portion of a user interface for associating process details (e.g., metadata) with a process in accordance with some embodiments. Examples of metadata that may be associated with a process include, but are not limited to, a name 212 for the process (which can be associated with one or more groups of users 214, referred to herein as a "team"), one or more users 216 selected to teach/train the process, and one or more labels 218 associated with the process or data it contains (e.g., in some embodiments, a process may include an important piece of information in every transaction, which the user would like to ensure is tracked and labeled). Labels 218 may also be referred to herein as "markers" that may be associated with one or more actions performed during a process. One or more features related to management of teaching of the process (e.g., a time 220 by which teaching should be complete) can also be associated with the process to facilitate completion of teaching an instance of the process by users.

In some embodiments, defined processes (regardless of whether they have been taught yet or not) are made visible to a user, so the user may understand which processes have been defined and what the system currently knows about the process. FIG. 2C illustrates a portion of a user interface that displays currently defined processes and information about the defined processes. Continuing with the example above, the process "Demo Process 1" defined using the portion of the user interface shown in FIG. 2B, may be displayed in the process list 230 shown in FIG. 2C. The process may be associated with a single team (e.g., "Team A") or may be associated with multiple teams since some processes may span teams. For instance, a "Purchase Order" process may span multiple teams (e.g., one team who submits the order request, a finance team that validates the purchase order, and another team that orders the product associated with the purchase order).

Each defined process may be made visible to a user via a portion of a user interface, an example of which is shown in FIG. 2C. For processes that have not been taught, there may not yet be enough information stored by the system to generate any statistics about the process. For processes on which at least some teaching has occurred, one or more statistics associated with the process may be provided in the user interface to enable a user to learn information about the current teaching state of the process. The information can be used by the user to, for example, modify aspects of the taught process, as described in more detail below.

Some embodiments discover information about processes (e.g., automatability, variations, and average handling time) by learning a signature for each process through a teaching process (e.g., act 140 in method 120 of FIG. 1B). As described in more detail below, in some embodiments, a user teaches an instance of the process by performing the process while a stream of events is collected as the process is performed. If the process is short enough, the user may teach an instance of the process by performing the process as they normally would by starting from the beginning of the process (possibly with manually starting capture of the stream of events—referred to herein as causing the computing device to enter a "training mode"), performing one or more actions included in the process, and concluding with a successful submission of a taught instance. Once the submission is complete, recording of the stream of events may be stopped (either manually by the user or automatically by the computing device of the user). For some longer processes that may be conducted across multiple sittings (e.g., a 3-hour process), the teaching instance of the process may be performed in parts and each part may be associated with an identifier (e.g., a transaction ID). For example, a user may teach a first part of an instance of a process at a first time, and the first part may be labeled with a process identifier and a particular transaction ID (e.g., "PO-12345"). The teaching instance may then be paused and resumed at a later time (e.g., at a second time), and the second part of the instance of the process may be associated with the same process identifier and transaction ID (e.g., "PO-12345"). A similar strategy may be used for processes that are conducted across multiple users and/or teams, where each user teaches a part of the process and each part is labeled with the same process identifier and transaction ID. In some embodiments, using the same transaction ID across multiple parts of the process may not be needed, for example, if the system is taught the various parts of the process a sufficient number of times to generate a reliable signature for the process.

To provide consistent and reliable teaching instances, the inventors have recognized that it may be beneficial to provide guidance to a user who is teaching an instance of a process. For example, a user teaching a process may be instructed to:

Avoid disruption in the process such as unexpectedly stopping midway through an action.

Avoid interleaving a second process during teaching a first process (e.g., during performance of a "Purchase Order Submission" also conducting a Purchase Order Cancellation" process).

Avoid becoming distracted from the process while teaching. For example, avoid answering email or other messages while teaching an instance of a process.

The inventors have recognized that not everyone on a team may need to perform a teaching instance of a process for the system to be able to generate an accurate and/or reliable signature of the process. For example, if there is a team of ten people who all conduct the same process, as few as one person on the team may need to teach the process a single time to generate an accurate signature of the process. In other instances, a few people (two or three team members) may need to teach the process, though it is expected than in most scenarios, only a small number of users (e.g., less than five users) should need to teach a process to generate an accurate signature for the process. As described in more detail below, some embodiments are configured to detect processes in wild data captured as a user performs various processes even when the process to be detected was not taught by that user and was performed differently by the user generating the wild data.

Figure 2D:
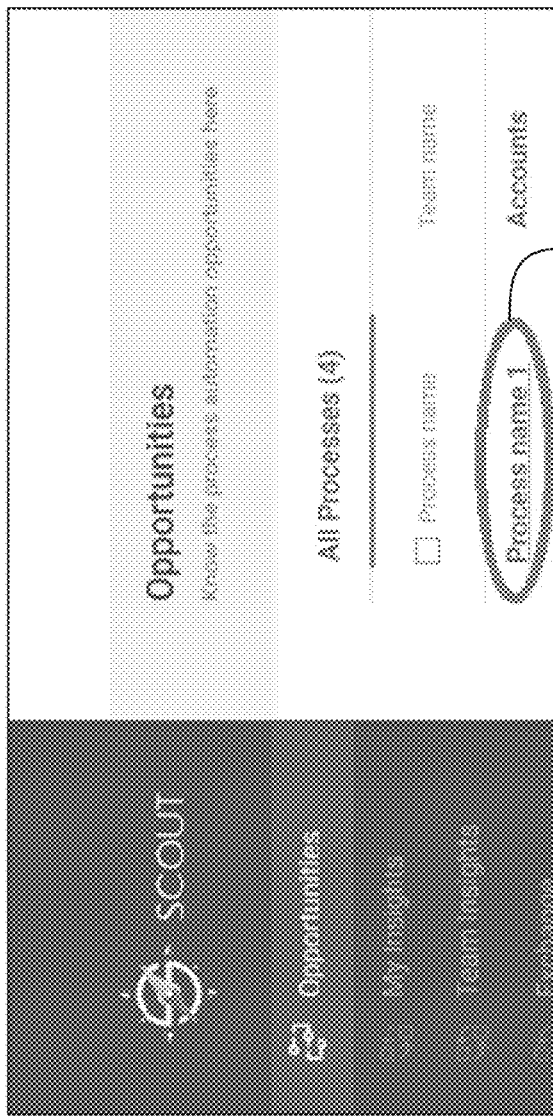
Figure 2E:
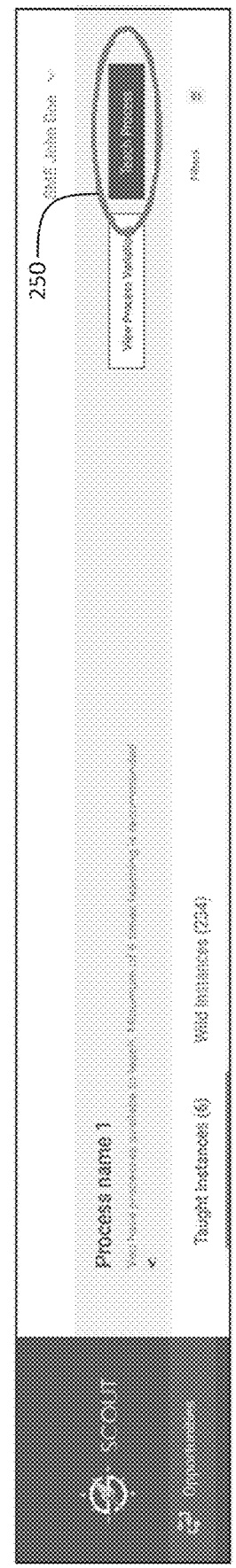

Teaching a process may be initiated in any suitable way. FIGS. 2D and 2E illustrate portions of a user interface with which a user may interact to initiate teaching a defined process in accordance with some embodiments. For instance, a user may interact with a process selection indicator 240 displayed on the user interface shown in FIG. 2D. In response, the user interface may be configured to display a teach process indicator 250 as shown in FIG. 2E, with which the user can interact to begin teaching an instance of the process. In some embodiments, after the teach process indicator 250 is selected, but prior to beginning teaching a process, the user may be provided with instructions on how to teach the process properly, such as how to conduct a transaction, how to pause the teaching instance, how to label the teaching instance with a transaction ID, etc.

Figure 3:
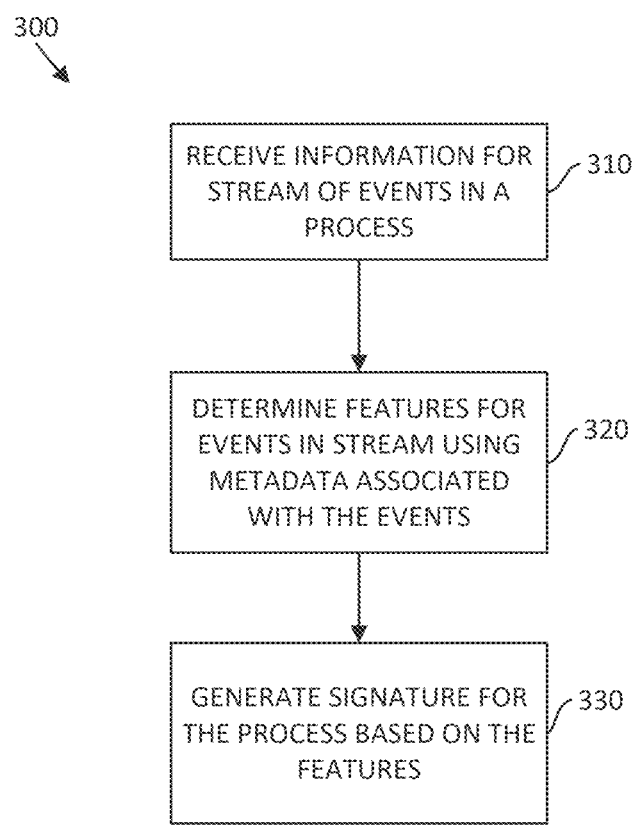
FIG. 3 illustrates a flowchart of acts for generating a signature of a process in accordance with some embodiments.

FIG. 3 illustrates a flowchart of a method 300 for generating a signature of a process in accordance with some embodiments. At least some of the acts of method 300 may be performed by any suitable computing device(s) and, for example, may be performed by one or more of the computing devices 102 shown in process tracking system 100 of FIG. 1A.

In act 310, information for a stream of events is received. Method 300 then proceeds to act 320, where metadata associated with the events in the received stream is used to determine one or more features. The metadata may include metadata having a first type (e.g., metadata associated with an application that the user is interacting with) and metadata having a second type (e.g., metadata associated with a user interface element the user is interacting with). Method 300 then proceeds to act 330, where a signature is generated for a process based on the features determined in act 320. Each of the acts for generating a signature of a process in accordance with some embodiments is described in more detail below.

The information received in act 310 may be collected in an any suitable way. In some embodiments the information may be collected as a user interacts with a computer. For instance, an application (e.g., process discovery module 101 shown in FIG. 1A) may be installed on the user's computer that collects data as the user interacts with the computer to perform a process. In some embodiments, each user interaction such as a mouse click, keyboard key press, or voice command that a user performs may be considered as an "event." For each event, metadata associated with the event may be collected. Aspects of the collecting information as the user interacts with a computer are described herein and in U.S. Pat. No. 10,831,450, titled "SYSTEMS AND METHODS FOR DISCOVERING AUTOMATABLE TASKS," granted on Nov. 10, 2020, which is incorporated by reference herein in its entirety. Examples of metadata that may be collected for each event include, but are not limited to:

Application (e.g., the name of an application, such as an operating system (e.g., Microsoft Windows, Mac OS, Linux), an application executing in the operating system, a web application, or a mobile application)

Screen Title (e.g., the title appearing on the application such as the name of the tab in a web browser, the name of a tile open in an application, etc.)

Element Type (e.g., the type of a user interface element of the application that the user interacted with, such as "button", "input", "dropdown", etc.)

Element Name (e.g., the name of a user interface element of the application that the user interacted with such as a name of a button, label of input, etc.)

The events collected while the user interacts with the computer during performance of a process may be considered a stream of events sorted with respect to the time at which the events occurred during performance of the process.

In some embodiments, the computer may be configured to enter a "teaching mode," for a process which initiates collection of events during performance of a process. To generate training data a user may be instructed to teach a plurality of instances of a process (referred to herein as "teaching instances"). The user may provide an indication to the computer to start the teaching mode (e.g., as described in connection with FIGS. 2D and 2E), and in response the computer may be configured to start the teaching mode to begin capturing events and associated metadata for the process.

Figure 4:
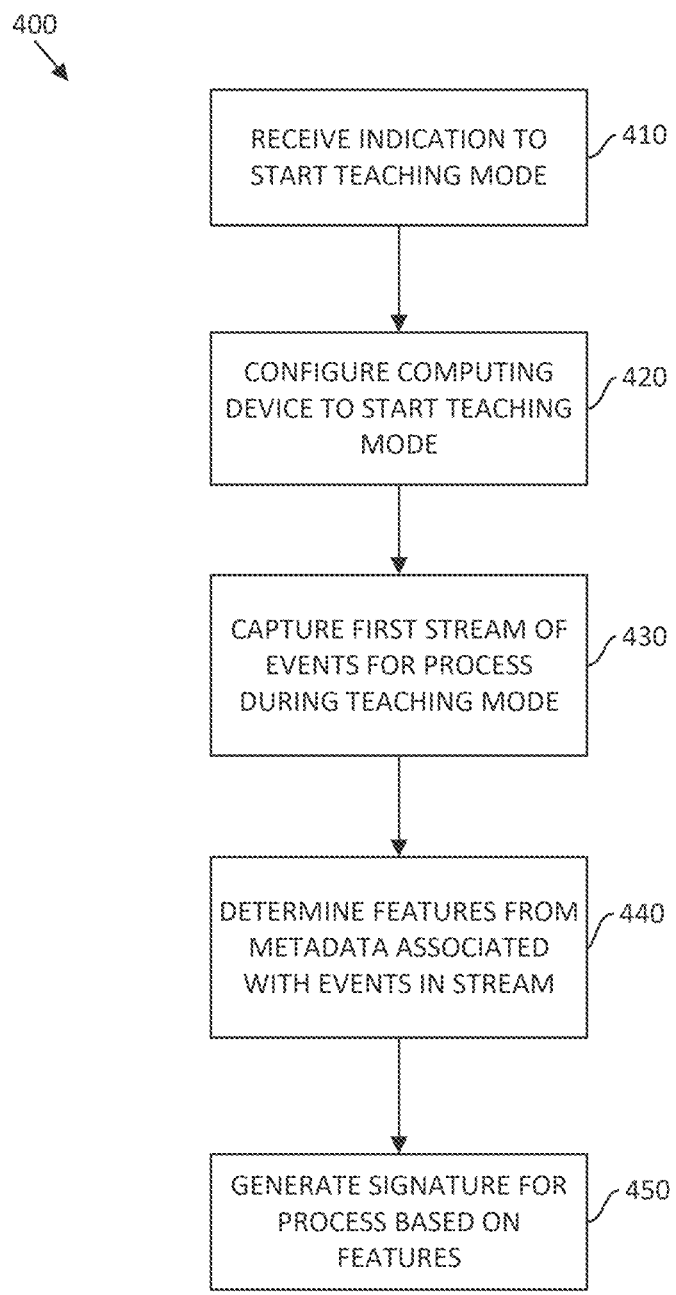
FIG. 4 illustrates a flowchart of acts for generating a signature of a process using features of events in accordance with some embodiments.

FIG. 4 illustrates a flowchart of a method 400 for capturing a stream of events when a computer is configured to implement a teaching mode in accordance with some embodiments. At least some of the acts of method 400 may be performed by any suitable computing device(s) and, for example, may be performed by one or more of the computing devices 102 shown in process tracking system 100 of FIG. 1A.

In act 410, the computer receives an indication to start a teaching mode. For instance, a user may interact with a user interface presented by an application executing on the computer to provide an indication to start the teaching mode. Method 400 then proceeds to act 420, where the computing device is configured to start the teaching mode in response to receiving the indication to do so. In some embodiments, a computing device may be configured to start teaching mode by executing software instructions to prepare to capture a stream of events (e.g., by executing one or more software instructions, loading one or more configuration parameters for controlling how events are captured, identifying and/or setting aside memory for where to store captured data, and/or performing any other suitable configuration steps). Method 400 then proceeds to act 430, where a stream of events for one or more processes is captured while the computer is configured to be in the teaching mode.

As described above in connection with act 320 of method 300, one or more features may be determined for events in a collected stream. After capturing the stream of events in act 430, method 400 proceeds to act 440, where one or more features are determined from metadata associated with events in the stream of events. Method 400 then proceeds to act 450, where a signature for a process is generated based on the features determined in act 440.

Although in some embodiments collecting information for a stream of events during performance of a process may be performed by a specialized application (e.g., process discovery module 101 shown in FIG. 1A) for capturing events executing on a computer as the user performs the process, in other embodiments, the information for a stream of events may be collected by one or more other applications (e.g., the native applications with which the user is interacting to perform the process). For example, the one or more other applications may log events (e.g., in a log file) that occur during user interactions with the application(s) and receiving the information for the stream of events may be accomplished by receiving one or more of such log files that includes the events and their associated metadata.

In some embodiments, at least some events that are captured in a stream of events are tagged with a process name and an instance identifier, which enables the events to be sorted for further processing, as described in further detail below. For instance, all events tagged with a particular process name may be filtered by instance identifier to obtain a window of events belonging to an instance of a process. The windows of events may then be used to generate a signature of a process as described herein.

The inventors have recognized that any particular process may be performed in different ways both by the same user and across different users, resulting in multiple variations of the process. To ensure that inter- and intra-user variations of performing processes is taken into account, each of multiple users may be asked to provide training data for multiple instances of a process (i.e., multiple teaching instances performed by each of multiple users). Any suitable number of taught instances of a process (e.g., three taught instances of a process performed by three different users) may be used, and embodiments are not limited in this respect.

As described above, at least some (e.g., all) of the events in a collected stream of events may be labeled with a process name to which it belongs. Events that do not belong to any process may be associated with an empty label (or no label). Additionally, events may be labeled with a process identifier to facilitate extraction of exact process instances.

Figure 5:
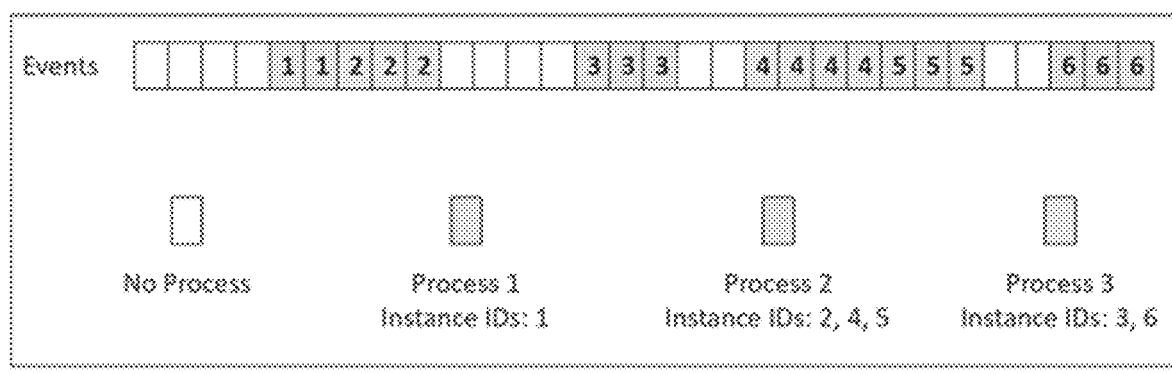
FIG. 5 schematically illustrates an example of a stream of event data that has been labeled with process names and instance identifiers in accordance with some embodiments.

FIG. 5 schematically illustrates an example of a stream of events, in which some of the events have been labeled with a process name and an instance identifier. As shown, process 1 is associated with a single instance identifier (instance ID 1), process 2 is associated with three instance identifiers (instance IDs 2, 4 and 5), and process 3 is associated with two instance identifiers (instance IDs 3 and 6).

Teaching a process in accordance with some embodiments is typically performed on the computing device of the user that is teaching the process, which may be where the applications needed to perform one or more actions associated with performance of the process reside. The applications may be implemented as thick clients on the desktop of the user's computing device, may be implemented as web applications that the user is accessing through a browser, or a combination of thick and thin (e.g., web-based) applications. In some instances, the applications needed to perform one or more actions associated with performance of a process may be virtualized to be interactable from the user's computing device using virtualization techniques known in the art.

As the user is teaching an instance of the process by interacting with different business applications, events and their metadata are collected as described herein including above in connection with FIGS. 3-5. The events and associated metadata may be stored locally on the computing device of the user or sent to a server over one or more networks (e.g., using the system architecture described in connection with FIG. 1A). However, it should be appreciated that the events need not be collected by a remote service in all embodiments and can be used directly on the computing device of the user for discovering processes in wild data, examples of which are described in more detail below.

As described above, events captured during teaching are labeled to a particular process and are associated with metadata. The metadata may include, but is not limited to, a user identifier identifying the user that conducted the teaching, an indication of when the teaching instance was conducted, one or more properties of the computing device on which the teaching was conducted (e.g., machine identifier, system time, CPU usage, memory usage, applications in use), and/or a unique identifier for the particular training session.

Figure 6:
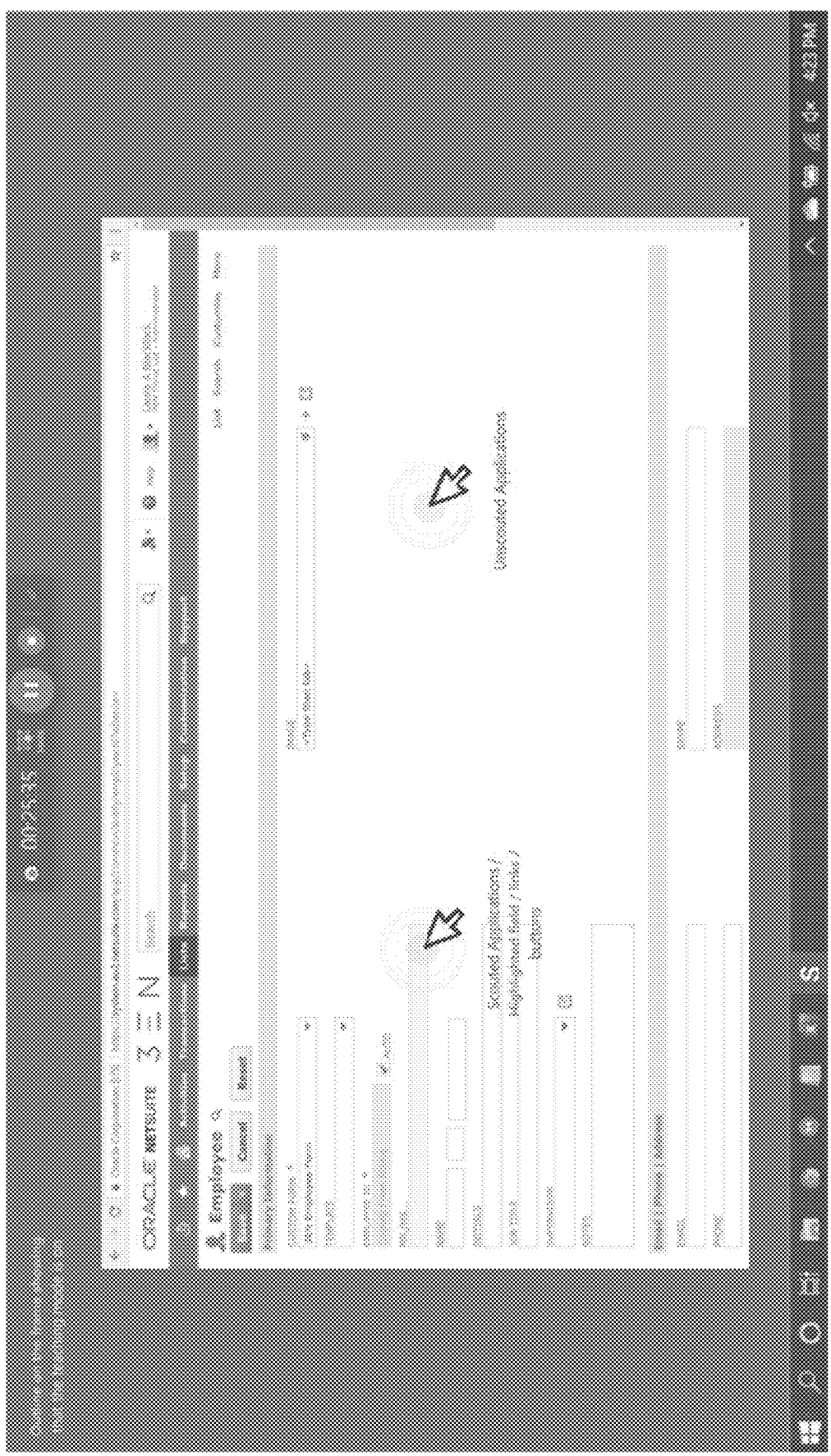
FIGS. 6 and 7 illustrate portions of a user interface displayed on a user's computing device during teaching a process instance in accordance with some embodiments.

FIG. 6 illustrates a portion of an exemplary user interface as it may appear when a user is teaching an instance of a process on their computing device in accordance with some embodiments. As shown, the user may be informed that they are teaching an instance of a process based on one or more visual identifiers shown on the user interface. The user interface may be configured to enable the user to pause the teaching (e.g., to resume it at a later time), stop the teaching to indicate completion of the taught process, and include markers for information the user deems important (e.g., an important field to be completed) to the process. For example, a marker may be shown indicating that an Exception Type exists in a field when the users are conducting the process. The users may click on the marker and label it so the field can later show up in the results and ensure it is collected. Markers are used in some embodiments to group and/or sort results (e.g., for any time a transaction had an Exception Type of "Unsubmitted"), as described in more detail below. The markers and marked fields may contain various fields and values the user wants to track.

Figure 7:
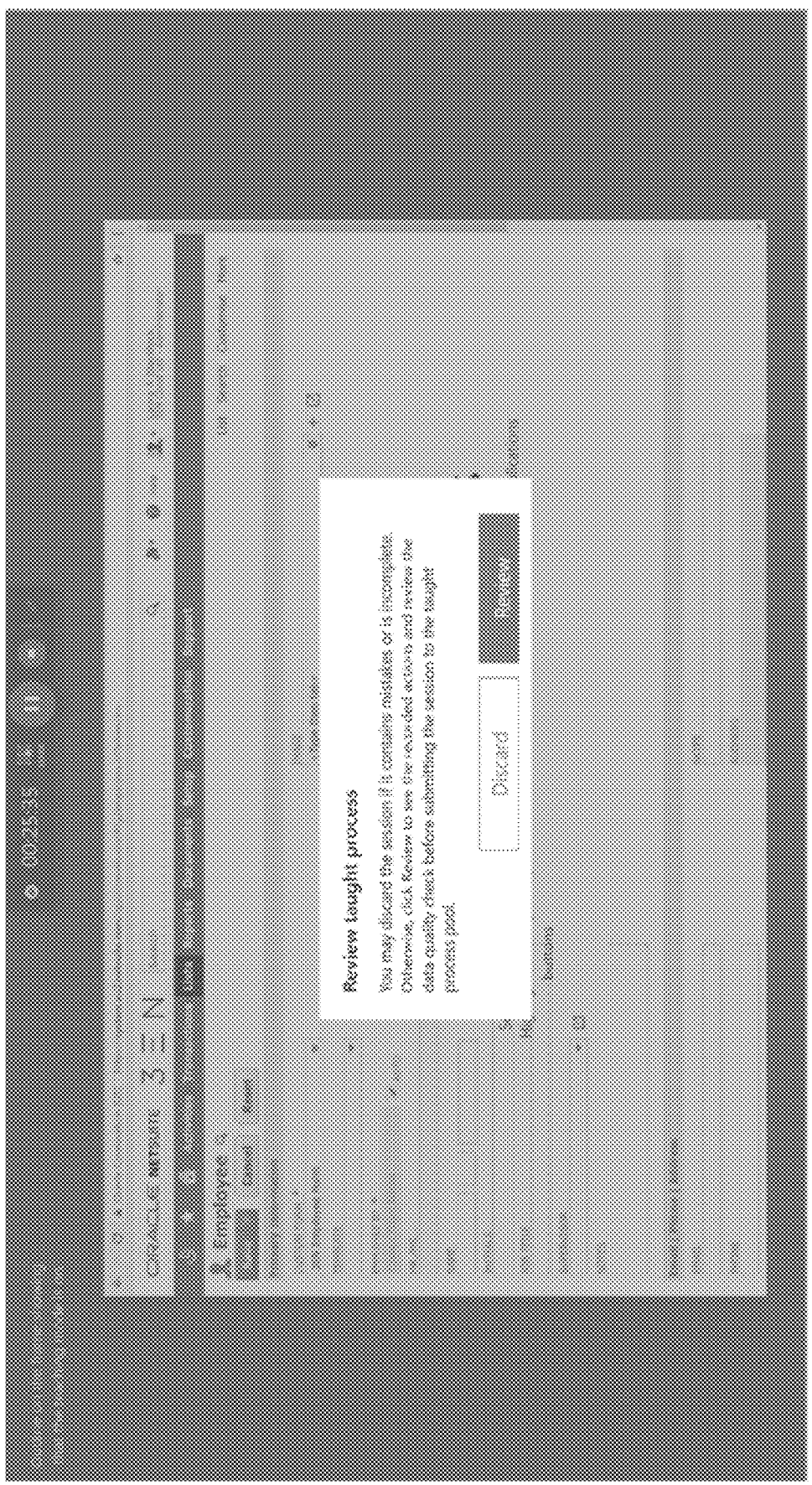

FIG. 7 illustrates the user interface of FIG. 6 after the user has completed the teaching instance (e.g., by interacting with a "stop" user interface element). As shown, the user may then be provided with the option to discard the taught instance or review the taught instance.

Figure 8:
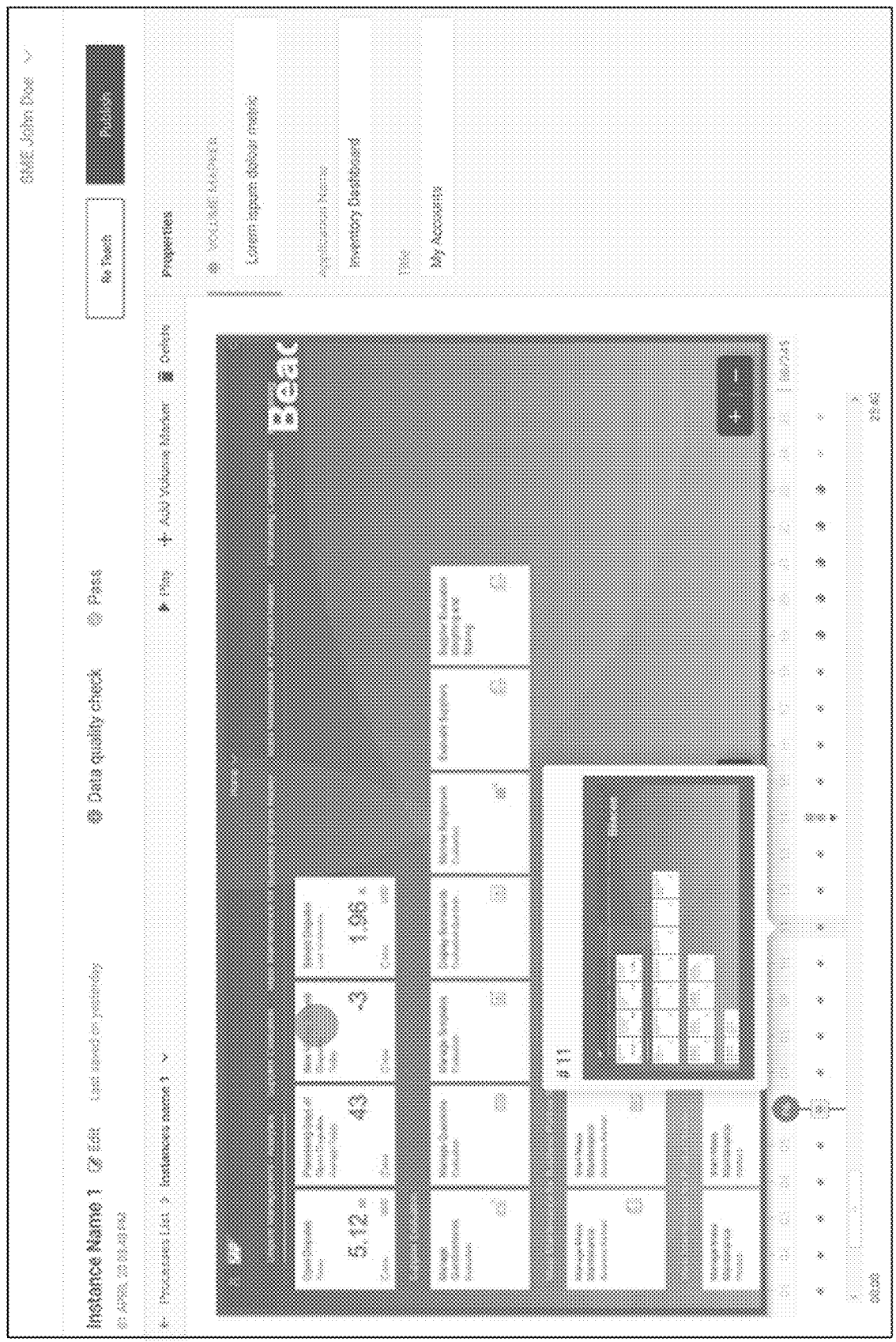
FIGS. 8 and 9 illustrate portions of a user interface displayed to enable a user to review taught instances of a process in accordance with some embodiments.

Upon selecting the option to review the taught instance, the user may be provided with information about the taught instance to facilitate their review. FIG. 8 illustrates a portion of a user interface configured to facilitate review of a taught instance in accordance with some embodiments. As shown, the user interface may include a plurality of screenshots captured during performance of the taught instance that enable the user to identify any mistakes that may have occurred during performance of the taught instance.

Figure 9:
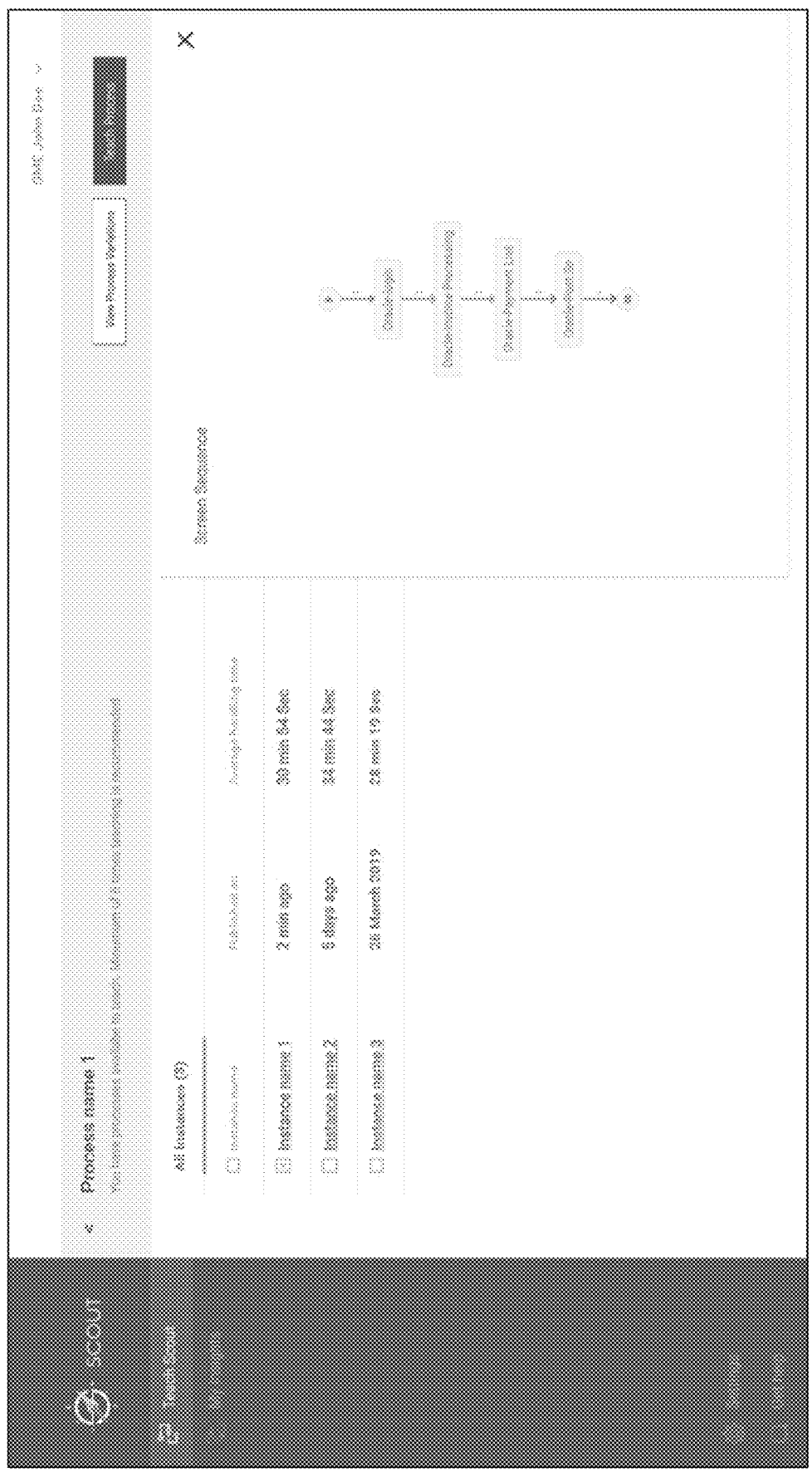

In some embodiments, a sequence-based flow diagram may be provided to the user to facilitate a faster review of the teaching instance of the process without needing to review, for example, all of the screenshots or a rendered video of what was taught. FIG. 9 shows a flow diagram representation of a taught instance of a process that may be used to facilitate review of the taught instance in accordance with some embodiments. Another advantage of the flow diagram representation includes the ability to represent multiple taught instances together to provide a review of more than one (e.g., all) taught instances from the user (or across users).

Figure 10:
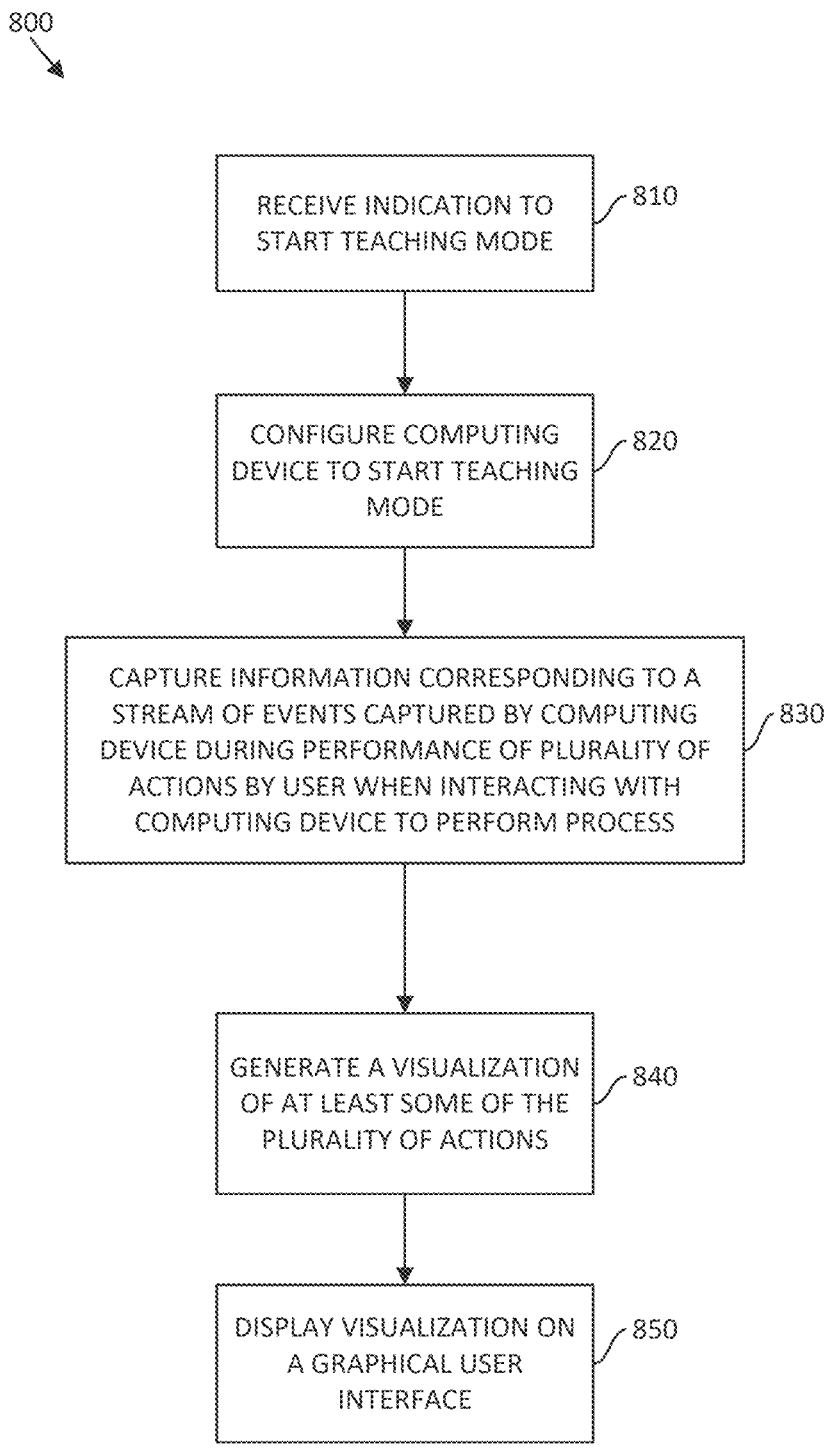
FIG. 10 illustrates a flowchart of acts for generating a visualization of a taught instance of a process in accordance with some embodiments.

FIG. 10 illustrates a method 800 for generating a visualization (e.g., the flow diagram shown in FIG. 9) of one or more actions performed during a taught instance of a process in accordance with some embodiments. At least some of the acts of method 800 may be performed by any suitable computing device(s) and, for example, may be performed by one or more of the computing devices 102 shown in process tracking system 100 of FIG. 1A.

In act 810, a computing device of a user receives an indication to start a teaching mode in which a stream of events will be captured. As an example, the user may interact with a user interface element of a user interface displayed on the user's computing device to indicate to the computing device that the teaching mode is to be started. Method 800 then proceeds to act 820, where the computing device is configured to start the teaching mode. For example, a process discovery module 101 executing on the computing device of the user may be instructed to begin capturing of events and metadata associated with the events, examples of which are described herein. In response to receive the instruction, the process discovery module 101 may configure the computing device on which it is executing to start teaching mode by executing software instructions to prepare to capture a stream of events (e.g., by executing one or more software instructions, loading one or more configuration parameters for controlling how events are captured, identifying and/or setting aside memory for where to store captured data, and/or performing any other suitable configuration steps).

Method 800 then proceeds to act 830, where information corresponding to a stream of events is captured by the computing device (e.g., by process discovery module 101) during a plurality of actions performed by the user when interacting with the computing device to perform the process. Method 800 then proceeds to act 840, where a visualization (e.g., the flow diagram shown in FIG. 9) is generated.

The visualization generated at act 840 may include at least some of the actions performed by the user during performance of the teaching instance. In the example flow diagram of FIG. 9, the plurality of actions is shown as a sequence of nodes representing the actions connected with edges between the nodes representing transitions between the actions. In some embodiments, all actions performed during the teaching process may be included in the visualization. The inventors have recognized that a visualization that includes all of the actions and the transitions between them may include so much information as to be confusing and unhelpful to the user reviewing the taught instance. Accordingly, in some embodiments, the visualization only includes a subset of the plurality of actions performed during the taught instance. A determination of which actions to include in the visualization may be made in any suitable way. For example, some actions and/or captured events may be grouped together to reduce the number of actions displayed in the visualization. Example factors used to determine which actions to include in a visualization (e.g., the flow diagram of FIG. 9) are described in connection with FIG. 14D below.

It should be appreciated that a flow diagram is only one example of a type of visualization that can be used to display details of a taught instance of a process. For example, in some embodiments, the visualization may be a time-sequence of screenshots of a graphical user interface as the user performed the taught instance. The screenshots may be rendered into a video that enables a user to scroll through the frames of the video to learn details about at least some of the actions performed during the taught process. As shown in the example flow diagram of FIG. 9, a visualization of a taught instance of a process may also include other information about the taught process including, but not limited to, the amount of time that it took the user to complete the process and a number of times that the user performed the process while their computing device was in teaching mode (i.e., the number of teaching instances of the process performed by the user).

Some embodiments are also configured to show the user statistics about one or more taught processes such as whether the taught process passes one or more health checks. Examples of health checks include, but are not limited to, the quality of the data collection specific to the process, the quality of data collection across the applications that were in use for the process, whether the process consisted of enough events to be considered healthy/ready for identifying the process in wild data, whether the user likely labeled the process correctly, and whether the user added required markers for the process (e.g., transaction IDs).

Process instances identified and labeled as a particular taught process using process discovery techniques as described herein include variations of the process due to the similarity matching being an approximate match rather than an exact match. In some embodiments, all of the discovered process instances in a stream of event data are then grouped, such that two or more discovered instances belonging to the same variation are grouped together. Variation of a discovered process may be defined in any suitable way. In some embodiments, two discovered process instances that have a similarity above a first predetermined threshold (e.g., 95%) may be considered as the same variation of the same process, two discovered process instances that have a similarity less than a second predetermined threshold (e.g., <70% similar) may be considered as different processes, and two discovered process instances that have a similarity between the first and second thresholds may be considered as variations of the same process. It should be appreciated that the first and second thresholds described herein are merely provided as examples, and any suitable first and second thresholds used for grouping discovered process instances may alternatively be used. By using measures of similarity of signatures in discovering process instances in wild data rather than requiring exact matches, variations of processes can be discovered without having to explicitly teach the variations.

The inventors have recognized that although there are many processes common to companies, every user, and the companies they are associated with can also have different processes. To support discovery of such unique processes, some embodiments include a self-service configuration tool that enables users to customize one or more aspects of process discovery as described herein.

Figure 11A:
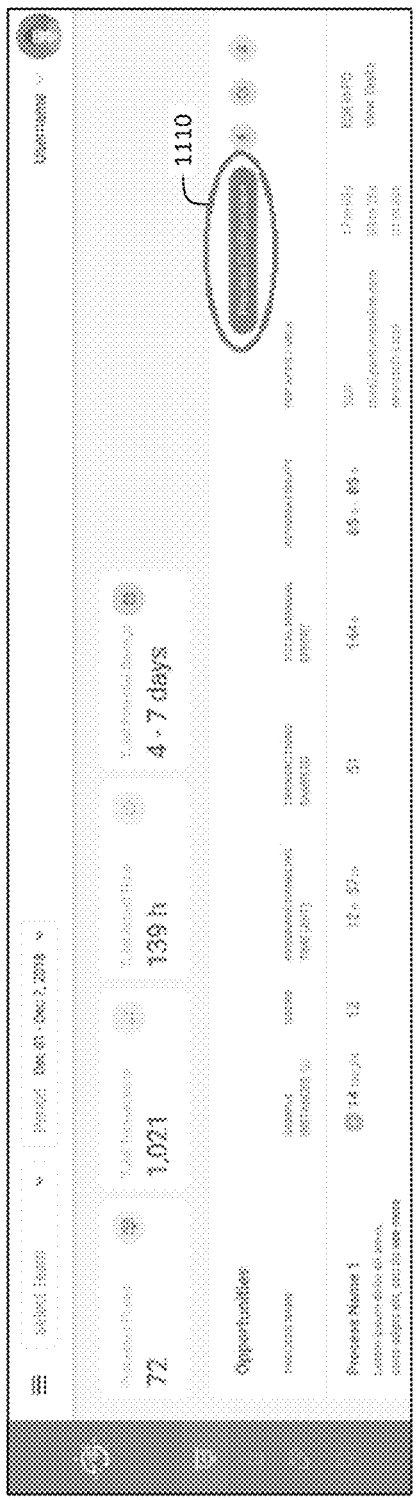
FIGS. 11A-D illustrate portions of a user interface that enable a user to configure a signature generation and/or process discovery technique used by some embodiments.
Figure 11B:
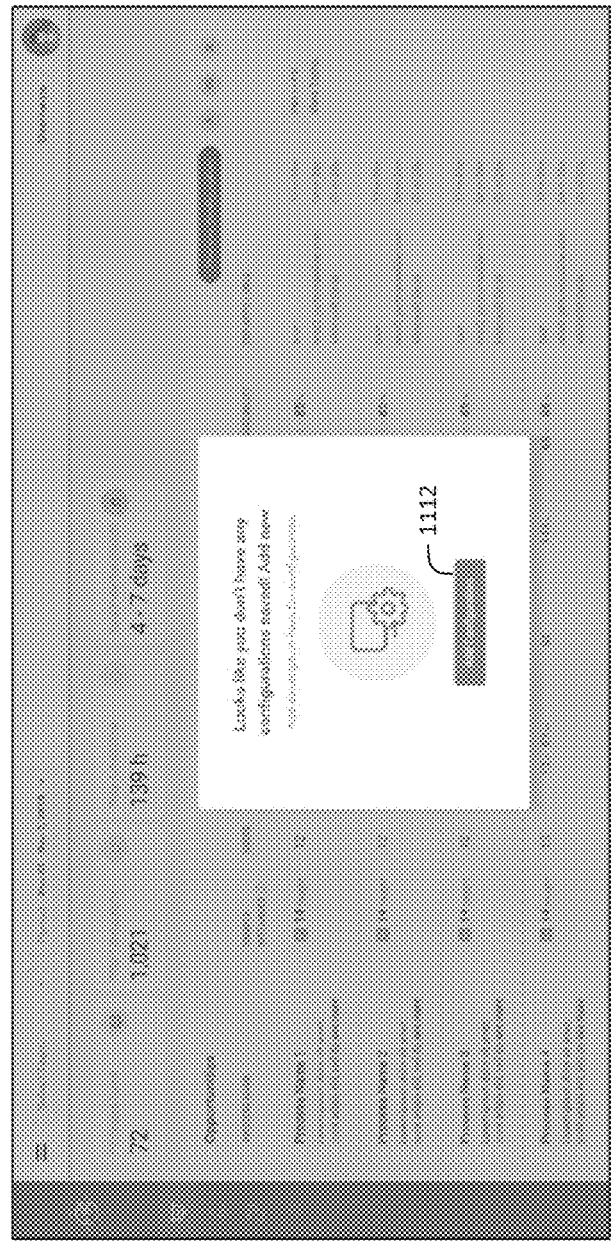
Figure 11C:
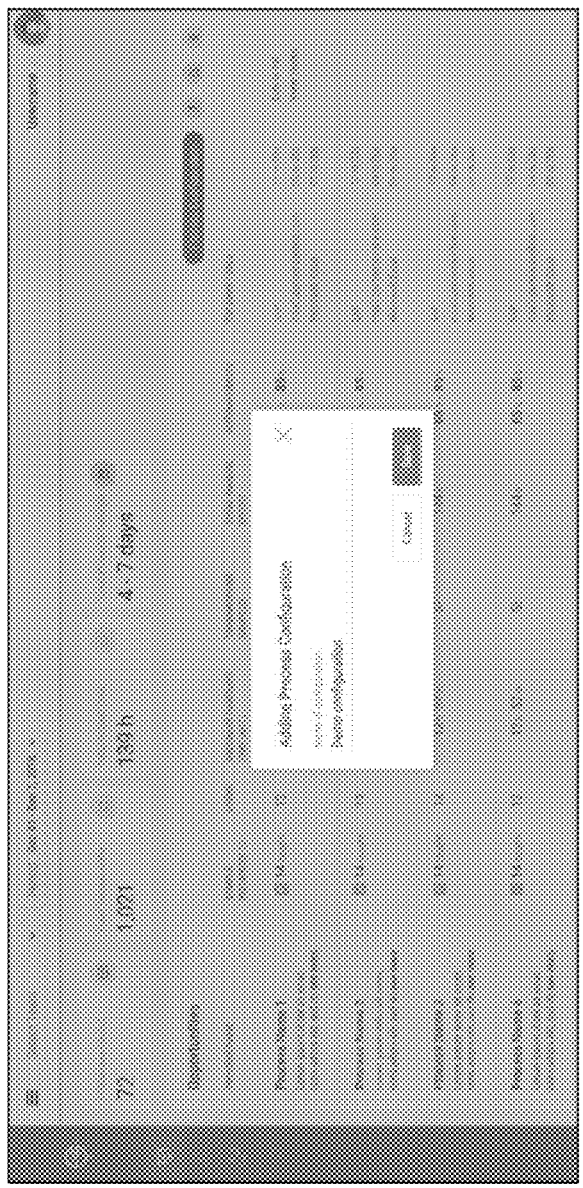

FIG. 11A shows a portion of a user interface that includes a user element 1110 with which a user may interact to configure one or more aspects of process discovery in accordance with some embodiments. Upon selection of user element 1110, the user interface may be configured to enable the user to create a process discovery configuration specific to their requirements, as shown in FIG. 11B. If a user would like to modify one or more aspects of the process signature generation and/or process discovery algorithms, the user may be prompted to add a configuration by interacting with user interface element 1112 as shown in FIG. 11B, and to name the configuration as shown in FIG. 11C, such that the configuration is referable and/or trackable.

Some embodiments include a default configuration for process discovery, which may be sufficient for some users. For a user that would like to create a customized configuration, it is helpful for the system to better understand the expectations and requirements of the user. By better understanding what the user believed the results of process discovery should have been, some embodiments may be configured to provide feedback to the user in a way that enables the user or others to gain a deeper understanding of how and where the system's results differed from the expectations of the user to facilitate tuning of the signature generation and/or process discovery techniques.

Figure 11D:
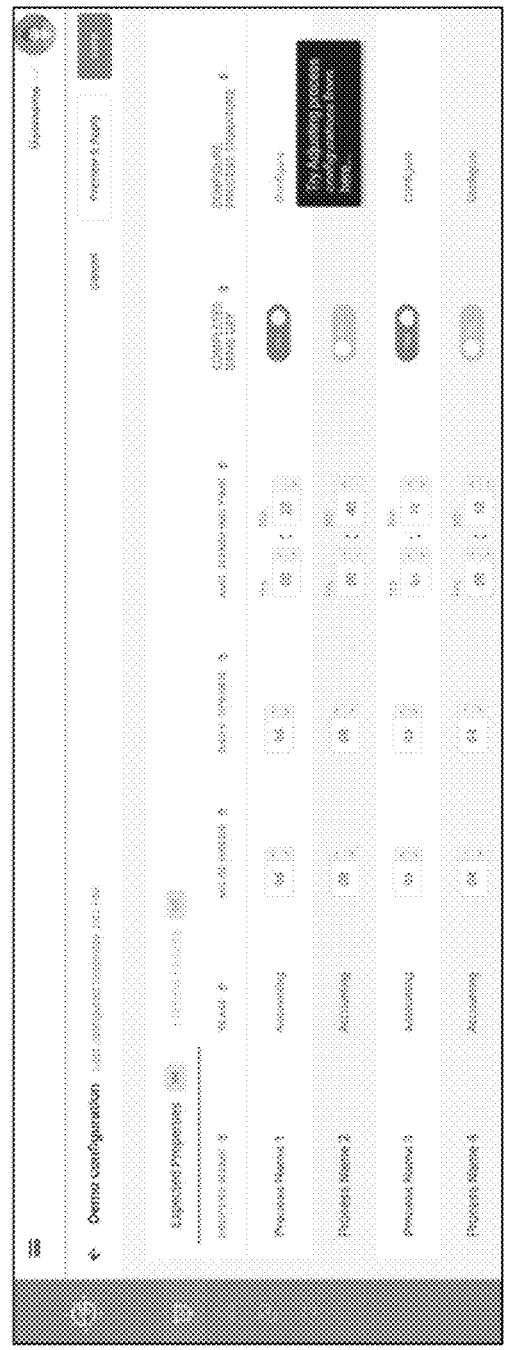

FIG. 11D illustrates a portion of a user interface that enables a user to adjust expected process properties, in accordance with some embodiments. Adjusting one or more of these properties facilitates the production of better (e.g., more expected) results by changing, for example, the "resolution" or sensitivity of process discovery per process. For instance, if the system knows, based on user input, that a process happens infrequently, the system can increase sensitivity to find processes that happen infrequently (e.g., the system may lower thresholds or tune other parameters). As another example, if the system knows that a process is likely conducted by five users (set as an expectation), but the system is only finding one user, it can also use this input to tune one or more process discovery parameters. As yet another example, if the user sets an expectation that a process is conducted five times a day, but the system is detecting the process 100 times a day, the system can also use this feedback to set its sensitivity or parameters in the opposite direction so that the system is tuned to produce less (potential) false positives for identification of the process.

As yet another example, if the user sets an expectation that the process has a certain duration, but one or more identified instances have a duration at least a threshold amount lower or greater than the expected duration, the identified instances may be determined to not be instances of the process.

As yet another example, expected process properties may be used to determine whether a taught process instance is consistent with the expected process properties. For example, a taught process instance may be analyzed to determine a value of a property of the process instance (duration of the process instance) and that value may be compared to the expected value (e.g., expected process duration). If the determined value and the expected value differ by more than a threshold amount, the user may be alerted to the disparity.

As shown in FIG. 11D, in some embodiments, the following example properties are configurable to help improve the accuracy of results in accordance with a user's expectations:

Users: The expected number of users who have automated process discovery installed on their machine, and who are conducting the given process.

Daily Volume: The number of transactions expected to occur daily.

Average Handling Time (AHT): The expected average handling time of a single unit of work.

Completes Same Day: Whether it is expected that a single transaction for the process typically completes in the same day or not.

It should be appreciated that the above example process properties are illustrative. Additionally or alternatively, the process properties may include properties such as: timing statistics (e.g., average, median, variance, standard deviation or any other suitable statistic for measuring the duration of at least a part of the process), expected completion information (e.g., whether the process completes within a prescribed amount of time such as an hour, a threshold number of hours, a day, a threshold number of days, a week, a threshold number of weeks, etc.), expected applications and/or domains, to be used for performing the process (e.g., names or identifiers of one or more application programs and/or domains to be used for performing the process), etc.

By setting the expected process properties shown, for example in the user interface of FIG. 11D, some embodiments are able to learn more about the specifics of processes for a particular user or organization and provide process discovery results that are more in line with user expectations (e.g., by producing less false negatives or false positives).

As described herein, some embodiments relate to generating a signature of a process based on teaching conducted by one or more users. The generated signatures of processes are then used to discover the process and one or more process variations in wild data on which the signature generation process has not been trained.

Depending on the particular signature generation process used, some embodiments enable a user to view components of the signature generation process and to modify one or more of these components, if desired. For instance, some embodiments are configured to use a signature generation technique that involves, at least in part, using a plurality of terms or features to identify processes in the wild data (though it should be appreciated that not all signature generation techniques may have such a human-understandable signature that can be easily modified by a user).

For embodiments that include signature generation techniques in which a plurality of terms or features are included in the signature, a user interface may be provided to enable the user to change or adjust the signature by modifying the terms or features resulting in a signature for the process that better matches the user's expectations.

As should be appreciated from the foregoing description of signature generation for a process, the signature may not contain all aspects of the process or all variations of the process. Rather, the signature may include critical or unique components (e.g., actions) that helps discover the process in wild data and that distinguishes the process from other processes that may be performed. In some embodiments, fields per component that have been learned as part of the teaching process may include, but are not limited to, the following per component: application, screen, element type, element name, element value, action (e.g., click or keystroke).

Some embodiments include one or more visualization tools that facilitate a user's understanding of process signatures and the plurality of actions associated with them. To better understand a particular action in the process signature and how it came to be included in the signature, some embodiments provide a portion of a GUI that displays a visualization of the process signature. A user may interact with the GUI to indicate the relative importance of one or more actions included in the signature, and the signature can be modified based, at least in part, on the feedback provided by a user's interactions with the GUI.

Figure 11E:
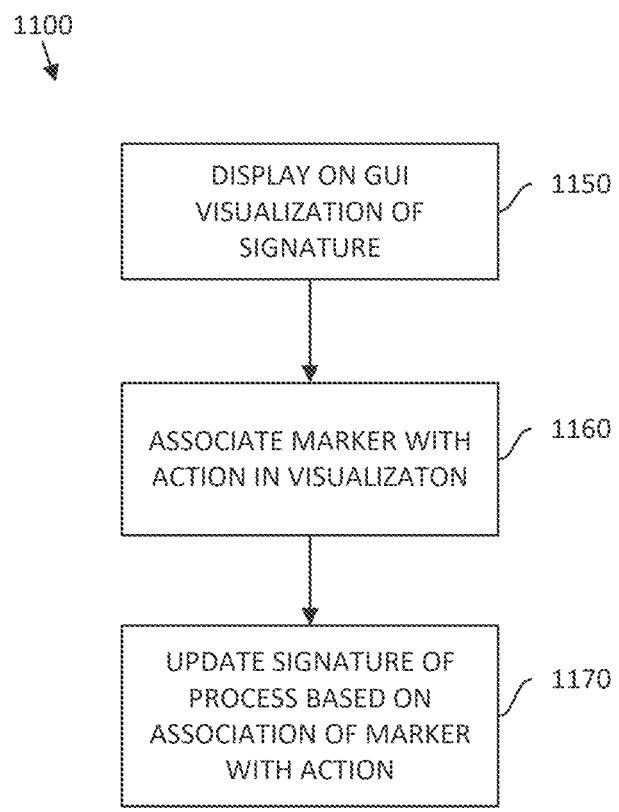
FIG. 11E illustrates a flowchart of acts for modifying a signature of a process based on feedback provided by a user in accordance with some embodiments.

FIG. 11E illustrates a flowchart of a method 1100 for modifying a signature of a process in accordance with some embodiments. At least some of the acts of method 1100 may be performed by any suitable computing device(s) and, for example, may be performed by one or more of the computing devices 102 shown in process tracking system 100 of FIG. 1A.

Figure 11F:
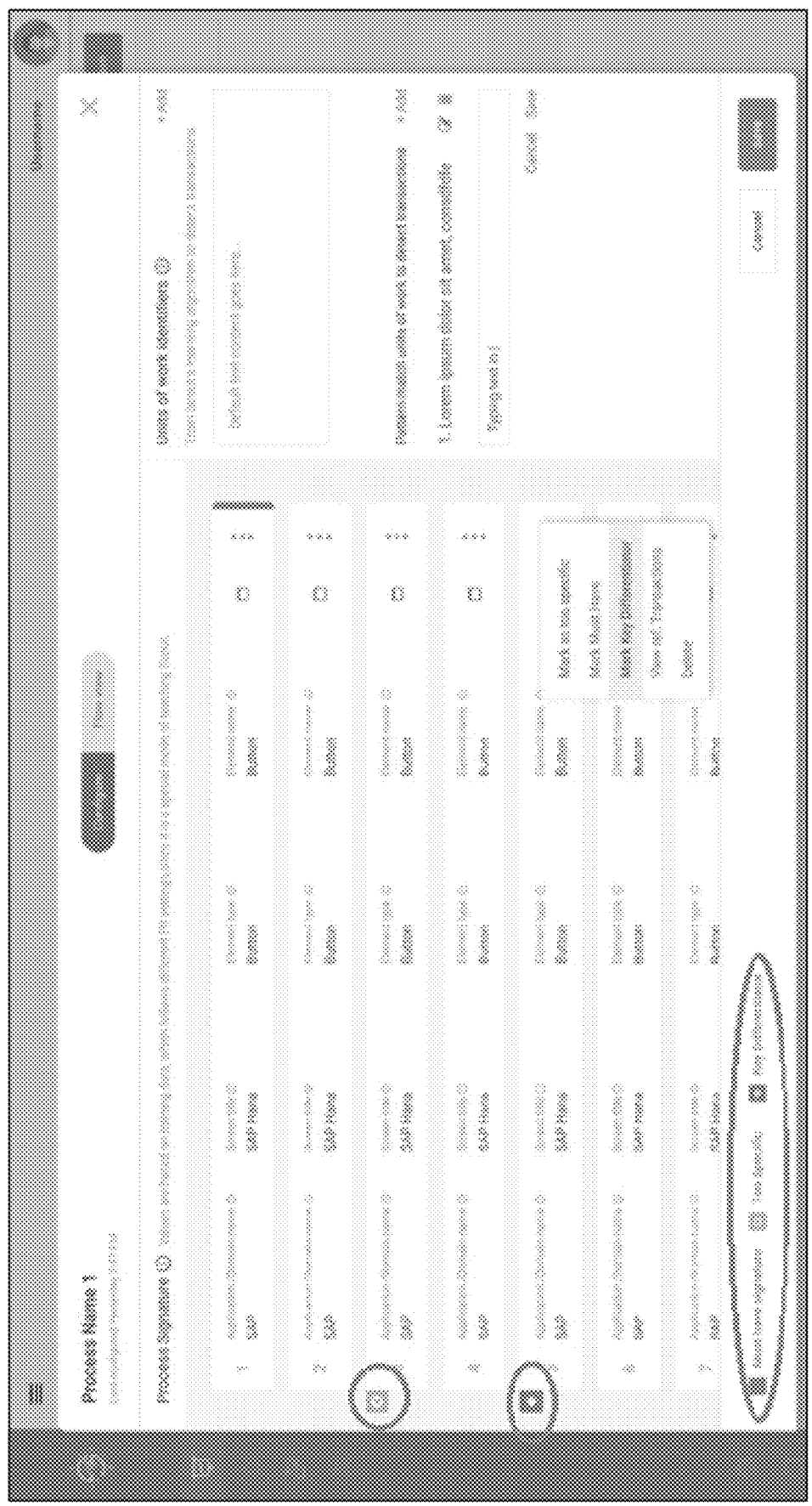
FIGS. 11F-R illustrate portions of a user interface that enable a user to configure a signature generation and/or process discovery technique used by some embodiments.

Method 1100 begins in act 1150, where a visualization of a signature for a process is displayed on a graphical user interface (GUI). In some embodiments, the visualization may include a flow diagram (an example of which is shown in FIG. 11F, described below) having nodes representing actions and directed edges representing transitions between the nodes. As described above, a signature of a process is generated based on one or more of taught instances of the process. In that way, the signature of the process may in some embodiments be considered as a weighted combination of the taught instances of the process and can be visually represented in a flow diagram similarly to a single instance of the process. Non-limiting examples of flow diagrams representing a single process instance and details on how such flow diagrams and the actions they contain may be constructed in accordance with some embodiments are elsewhere in this disclosure. For example, a flow diagram for a signature may be constructed in a manner similar to that described in connection with FIG. 14D for a flowchart of a single process instance.

The visualization of the signature displayed in the GUI may include a plurality of actions associated with the signature of the process. Method 1100 then proceeds to act 1160, where a user interacts with the GUI to associate a marker (also referred to herein as a "label") with one or more of the actions included in the signature of the process as shown in the visualization of the signature. Exemplary markers that may be used in accordance with some embodiments are described in further detail below with respect to FIG. 1 IF. In some embodiments, multiple markers may be associated with multiple actions in a signature and/or a single marker may be associated with multiple actions in a signature, as embodiments of the technology described herein are not limited in this respect.

Method 1100 then proceeds to act 1170, where the signature of the process is updated based, at least in part, on the association of the marker(s) with the action(s) in the signature visualization. For example, as described in more detail below, one or more events and/or actions in a signature may be associated with weights indicating their relative importance to the signature. In some embodiments, a signature may be updated by adjusting one or more of the weights associated with the event(s) and/or action(s) based, at least in part, on feedback from the user specifying its relative importance. A further description of updating a signature in accordance with some embodiments is provided in connection with FIGS. 11F and 11G below.

Figure 11G:
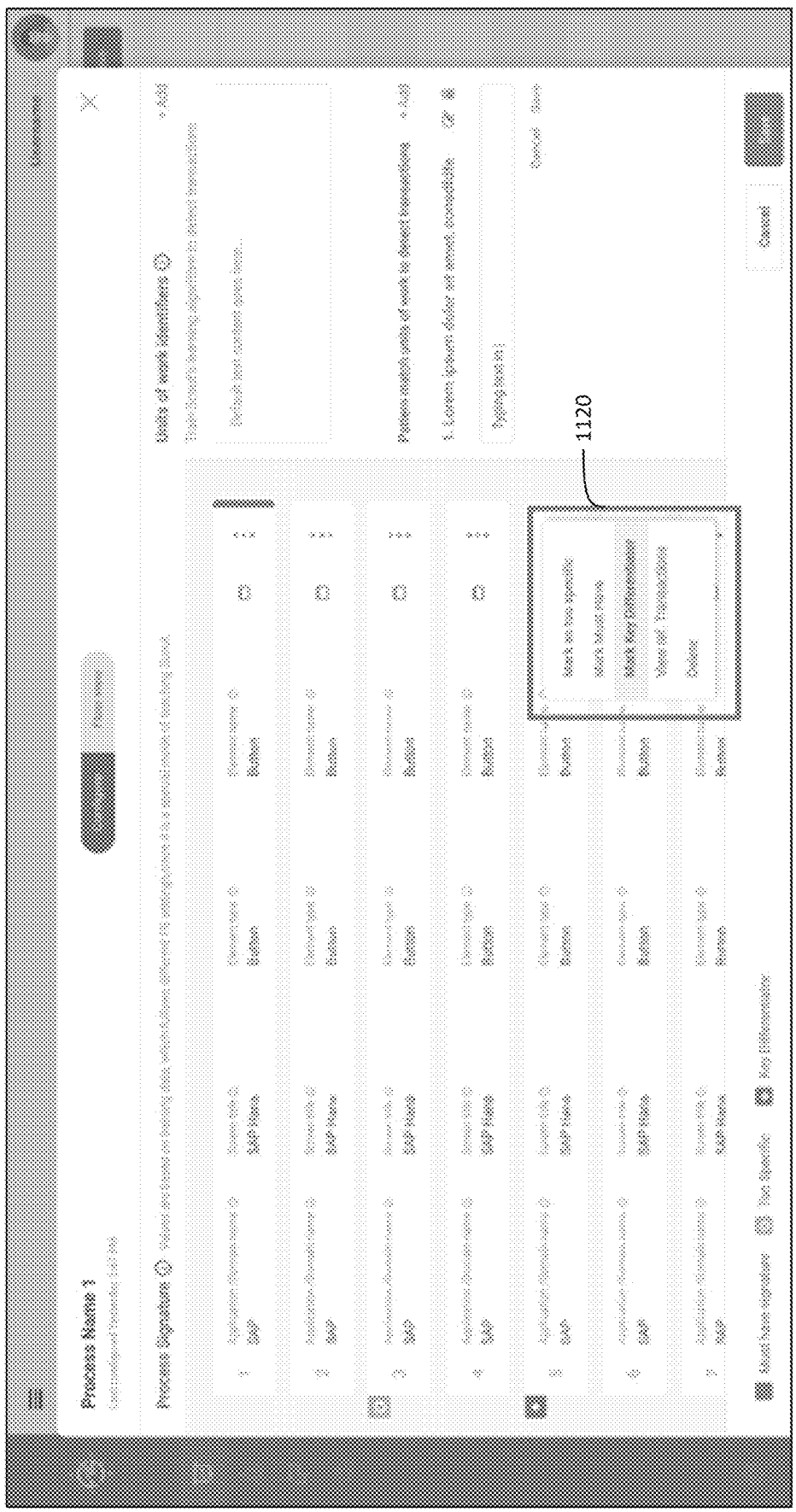

FIG. 11F is a portion of a GUI that illustrates details of actions performed during one or more teaching instances of the process that were included by the signature generation technique into the signature for the process. In the illustrative user interface shown in FIG. 11F, one or more actions included in a process signature may be associated with a label (also referred to as a "marker" herein), which describes the importance of the action to the signature. One or more of the labels may be associated by the signature generation technique and may be modified by the user to configure the signature. In some embodiments, the signature generation technique may not provide any initial labels and the user may provide all labels during configuration of a process signature by interacting with the GUI to associate a particular label with one or more of the actions displayed in the GUI. The user may interact with the GUI to associate labels with actions in any suitable way. For example, the user may select one of the actions and then select a label to associated with the selected option from a drop-down menu as shown in FIG. 11F. For example, modifications to a process signature can be made via a user element 1120 of a user interface associated with each process action, an example of which is shown in FIG. 11G. In another example, the GUI may be configured to enable the user to drag and drop a label next to an action to associate the label with the action.

Example labels that may be associated with an action for a signature include, but are not limited to:

Must Have: Actions required in the process—often used to ensure a volume metric is reported properly. For example, a Purchase Order Completion process may require a "Submit" button to be clicked to be considered a completion of the process. In such an instance the Submit button may be associated with a "must have" label.

Key Differentiator Actions that help differentiate two processes that are similar. For example, two processes such as Purchase Order Change and Purchase Order Rejection may have a substantial number of actions in common. To differentiate the two processes, the signature for the Purchase Order Change process may label an action indicative of changing the purchase order as "Must Have" and signature for the Purchase Order Rejection process may label an action indicative of rejecting the purchase order as "Must Have." Otherwise, the Purchase Order Rejection process may be confused as a variation of the Purchase Order Change process.

Too Specific: A component that the signature generation technique has determined is unique to the process, but that the user has determined is "too specific" to a single transaction from the process. For instance, perhaps the signature generation technique has determined that a component that includes a customer name is unique for a process and may include this component as "Must Have." However, by including this component as Must Have may prevent the discovery technique from identifying the same process for different customers that do not include the customer name identified in the unique component. By labeling a component as Too Specific, a signature for a process may be generated that ignores information that the user has determined is too specific to capture a wide range of instances of the process in wild data.

As described above with regard to act 1170 of method 1100 shown in FIG. 11E, after a user has associated one or more markers with one or more actions using, for example, the GUI shown in FIG. 11F, the signature for the process may be updated based, at least in part, on the associated markers. In some embodiments, each of the actions included in a signature may be associated with a different weight that signifies an importance of that action to the signature of the process. For example, an action that has a weight of 1 may be considered essential for performance of the process (e.g., may be associated with the "Must Have" label), whereas an action that has a weight closer to 0 may have less importance to the signature (perhaps because the action is performed in many other processes, so is not an action that operates as a good differentiator for the process from other processes). In some embodiments, the signature of a process may include weights associated with a combination of actions performed in sequence. In embodiments that include weights associated with actions or other components of the signature, an initial set of weights for the actions may be specified by the signature generation technique and updating the signature may comprise adjusting the initial (or current) set of weights based, at least in part, on the labels/markers associated with the actions as specified by a user via the GUI. For example, if a user associates a "Must Have" label with an action in a signature, a weight associated with the action may be increased (or possibly set to 1 or some other maximum value) to indicate that the action must be present when performing process discovery with the signature to identify the process in wild data.

When labels other than "Must Have" are associated with actions, updating the signature may be performed by adjusting the corresponding weight(s), but in a less drastic fashion. For example, if a user associates the label "Key Differentiator" with an action, the weight associated with the action in the signature may be increased to reflect the relative importance of the action in the signature, such that when the signature is used during process discovery, identification of the events associated with the action may result in a positive identification of the process in the wild data. As another example, if the user associates the label "Too Specific" with an action, the corresponding weight associated with the action in the signature may be decreased from its current value to de-emphasize the importance of the action when performing process discovery with the updated signature.

Updating the signature of a process in accordance with the techniques described herein enables the process discovery technique to more accurately discover the process going forward when the updated signature is used for process discovery. For example, when discovering the process in wild data, the process discovery technique may analyze a stream of events and identify a group of candidate processes within the stream of events. In some embodiments, actions associated with higher weights (e.g., due to associations with a "Must Have" label or a "Key Differentiator" label) may be used to narrow down the number of candidate processes in the group on which to perform a more detailed similarity matching to discover processes in the stream of events. In other embodiments, each of process signatures may be used in the process discovery technique to initially identify a group of candidate processes in a stream of events, and the weights associated with different action may be used to accept or reject candidate processes to discover processes in the stream of events.

In addition to control over the one or more properties of a process signature, some embodiments provide a user interface that enable the user to delete a particular user action if it is determined that the action does not belong to the process (e.g., through an accident during teaching the process). It may be desirable for a user to delete an action included in a signature for any of a variety of reasons including, but not limited to, the user action not being "general" enough. For instance, the action may contain specifics of a particular transaction rather than being representative of the actions generically performed in the process. The "Too Specific" label described with regard to FIGS. 11F and 11G is one example of a way in which a user may indicate that an action is not general enough and should not be included in the signature (or should have its corresponding weight reduced, as described above).

Figure 11H:
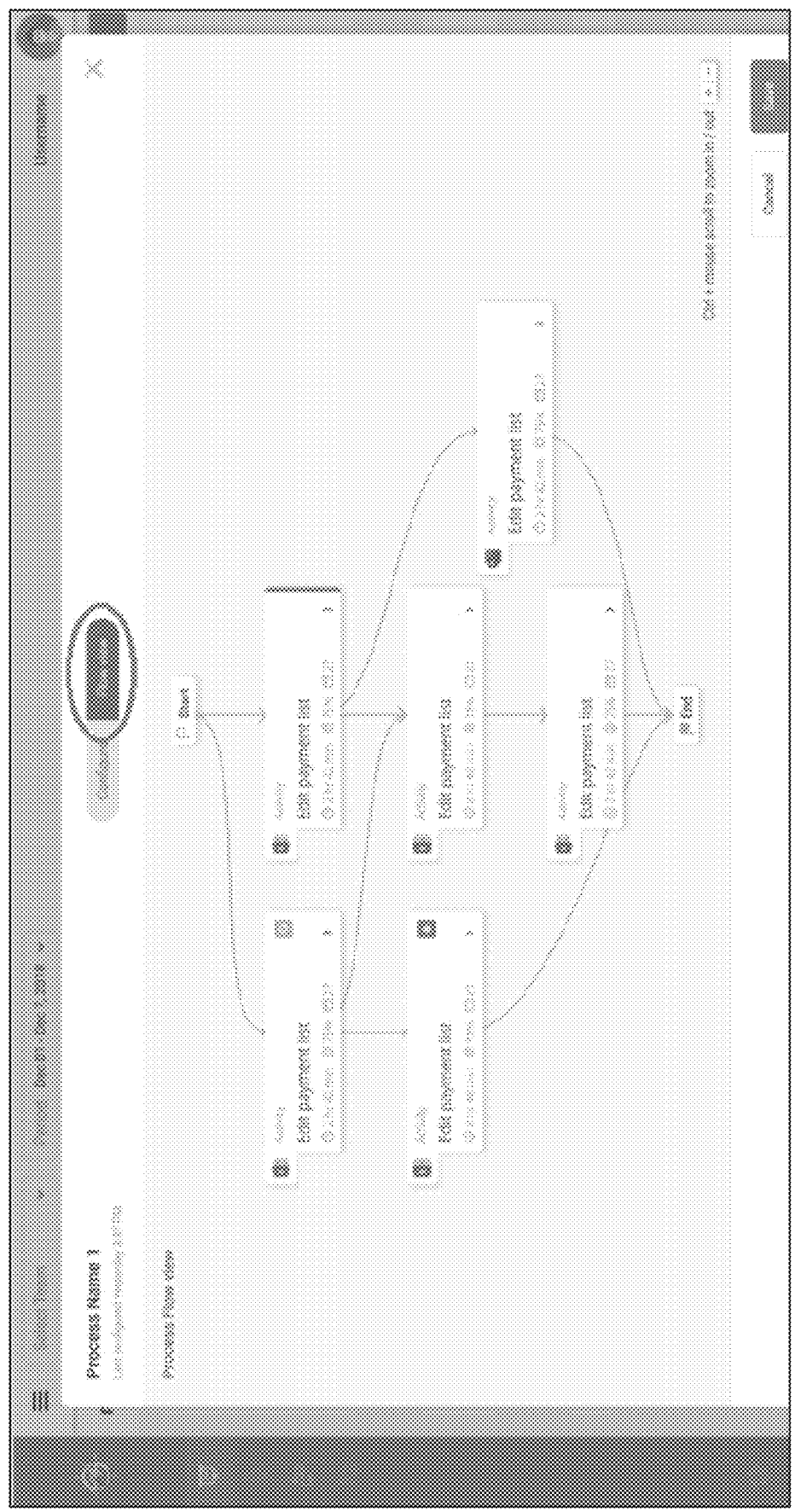

As another visualization tool, some embodiments include a user interface configured to display a flow diagram of a signature, an example of which is shown in FIG. 11H. The flow diagram may enable a user to preview an updated signature via visual inspection, which may reveal how the updated signature may be used during process discovery to identify the process in wild data. For instance, the flow diagram may identify those actions that have been determined to be important and/or unique to the process based on one or more markers associated with actions as described above.

In some embodiments, the flow diagram may be produced by applying the updated signature to a data set (e.g., a portion of the data set used for training a plurality of processes). The flow diagram may identify a common flow through the process, as discovered via the updated signature, and the expected process properties from the wild data. As with other flow diagrams described herein, the flow diagram may include a plurality of nodes associated with actions and directed edges between the nodes indicating the transitions between the actions and the actions included in the flow diagram may be determined, for example, using the techniques described in connection with FIG. 14C.

As described above in connection with FIG. 6, in some embodiments during teaching, a user can specify markers other than those described above in connection with FIGS. 11F and 11G to associate with different actions in a taught instance of a process. An example of a marker may be a Unit of Work, which is a transaction identifier. As another example, a Purchase Order process may have transaction identifiers such as "PO-12345." In some embodiments, during teaching, the signature generation technique automatically learns patterns that should match these units of work or other markers. For instance, the markers may be collected across multiple taught instances of a process, and the markers may be generalized by determining the parts of the marker that are common or "static" across instances and by replacing the non-static or "dynamic" parts with wildcards, thereby making these parts optional in the marker. For example, a first taught instance may be associated with a Unit of Work marker PO-12345 and a second taught instance may be associated with a Unit of Work marker PO-67890. Instead of learning the individual markers, some embodiments are configured to learn a pattern PO-##### as a generalized Unit of Work marker for the process.

Figure 11I:
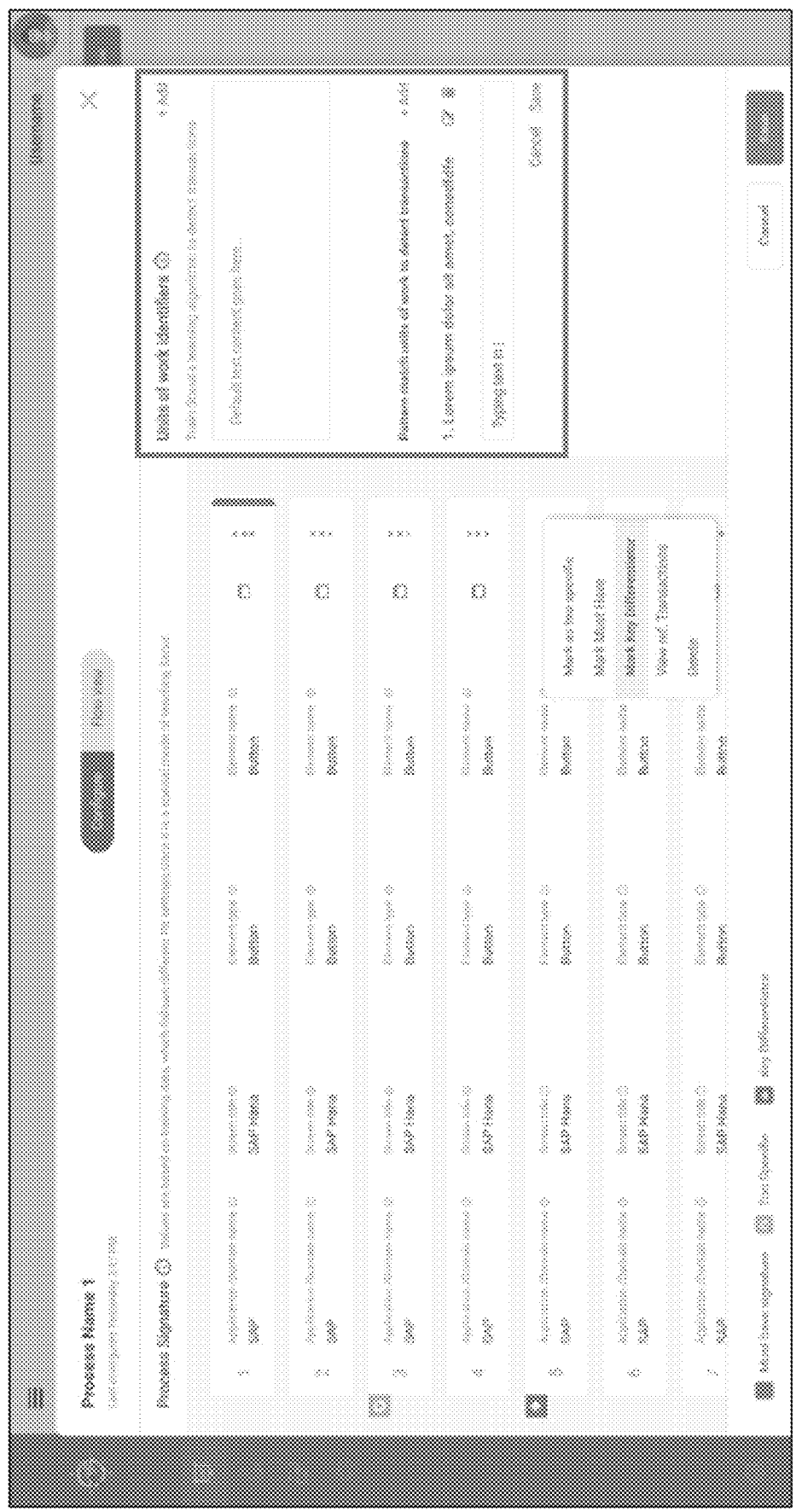

Some embodiments provide a user interface that enables a user to modify and/or add markers for a process, an example of which is shown in FIG. 11I. As described above, markers are used in some embodiments to facilitate accurate signature generation for a process by linking certain data to transactions when it detects a particular sequence of data. As an example, when a sequence of the Purchase Order process is detected, markers may facilitate tagging a particular Unit of Work identifier to the transaction, like PO-12345. In some embodiments, a marker can be taught by a user selecting a field and tagging it with a marker. Then, if multiple taught instances tag the same field, the signature generation technique may generate generalized patterns based on it (e.g., the wildcard example above) for matching new transactions and tagging them.

If a user has chosen to set expectations for a process (e.g., by configuring components of a process as described above), some embodiments enable a user to preview results based on the specified configuration and changes to the process. For instance, some embodiments provide a user interface configured to show how detected results vary from one or more user expectations to help the user focus on where to change the configuration such that the results more closely meet their expectations.

Figure 11J:
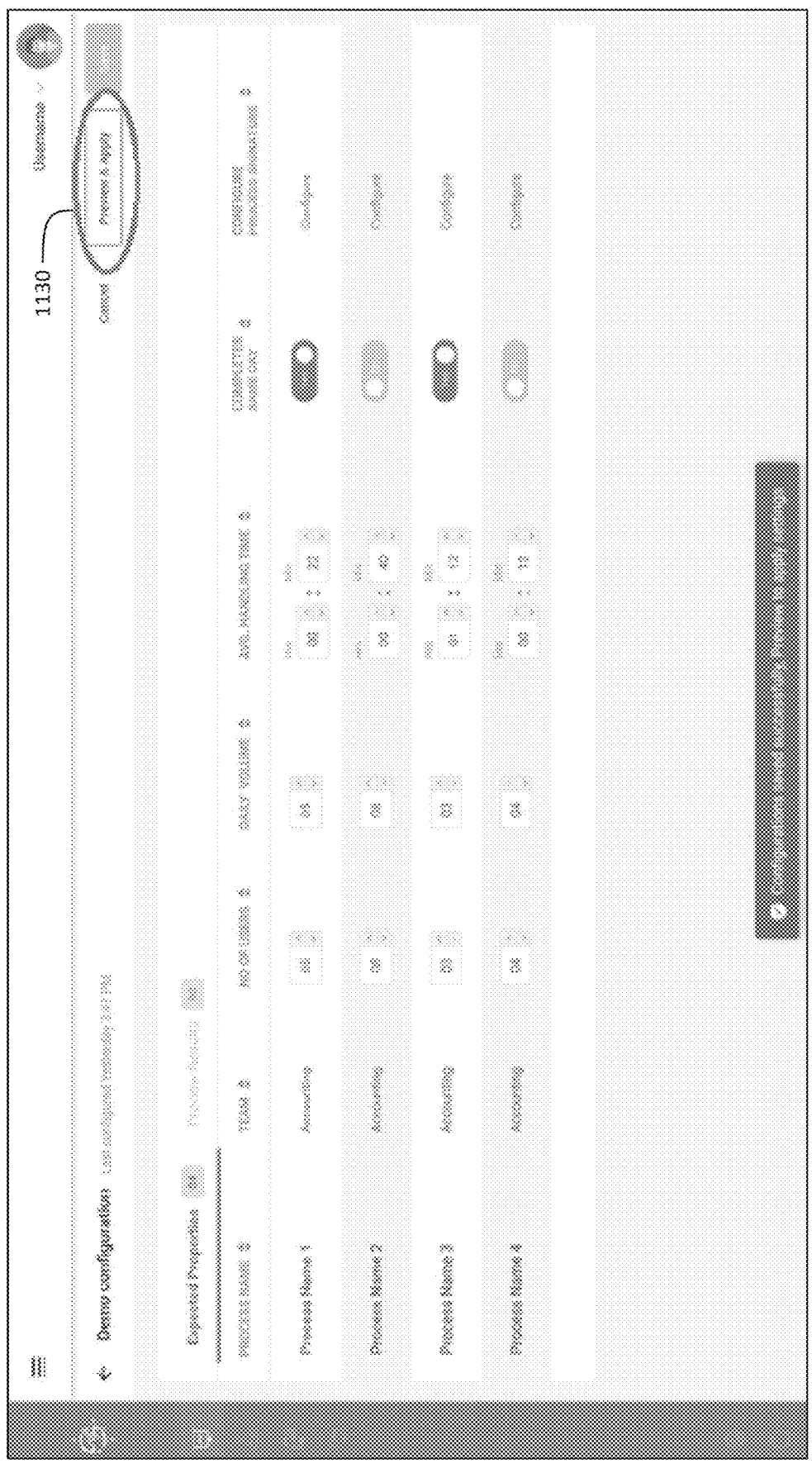
Figure 11K:
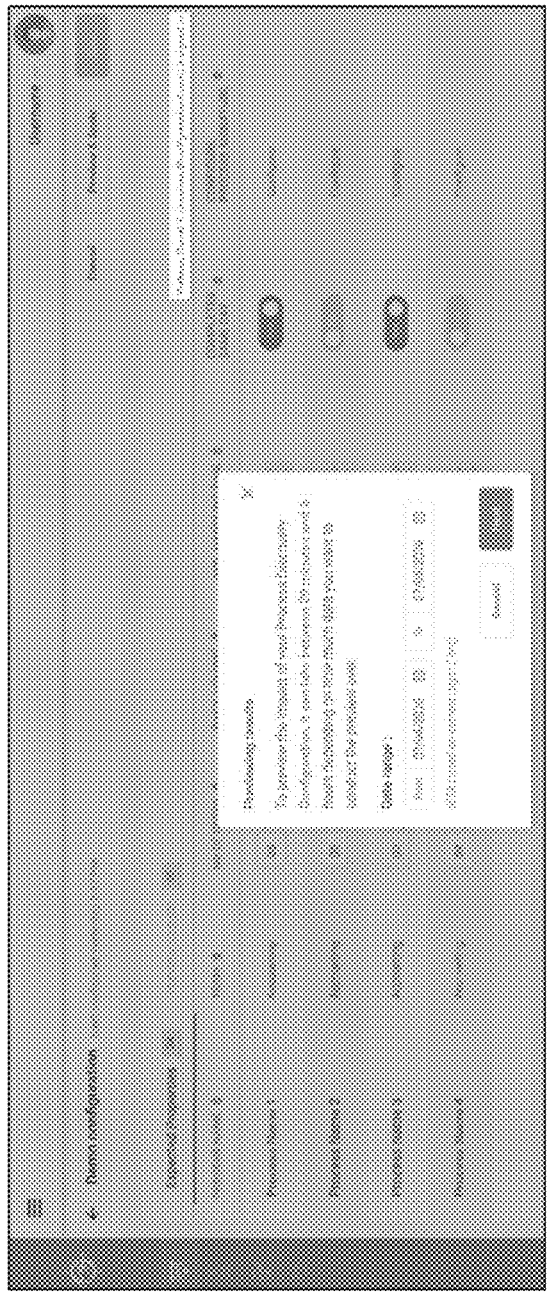
Figure 11L:
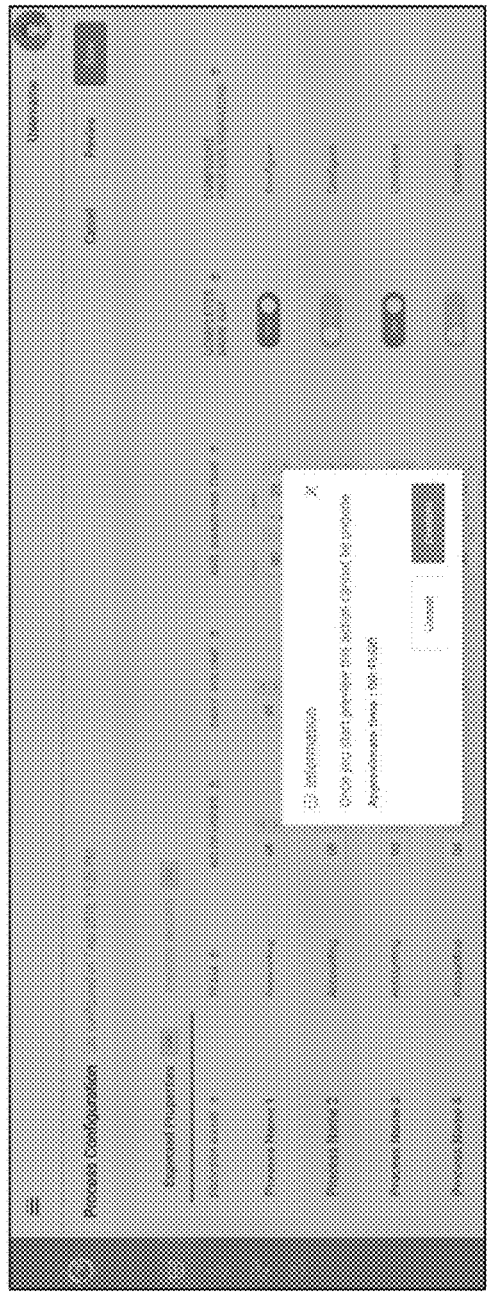

FIG. 11J shows a portion of a user interface displayed on which is a user interface element 1130 with which a user may interact to initiate a preview process. For example, in response to interacting with user interface element 1130 in the user interface of FIG. 11J, the user interface may change to the portion of the user interface shown in FIG. 11K, which includes a request for the user to specify a date range for a data set over which the preview should be run. As shown, the user interface may be configured to display an approximate amount of time that the preview may take to run as shown in the portion of the user interface of FIG. 11L. Providing the user with an approximate amount of time for the preview to run may be particularly beneficial to the user if the preview will take a substantial amount of time to complete, as it may not be possible in some instances to abort the preview after it has started.

Figure 11M:
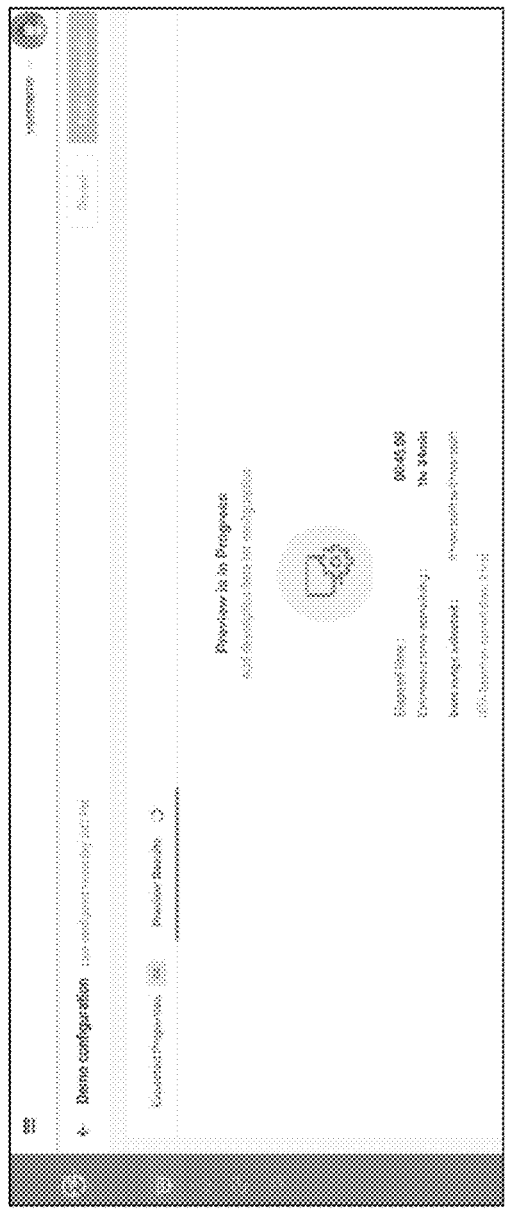
Figure 11N:
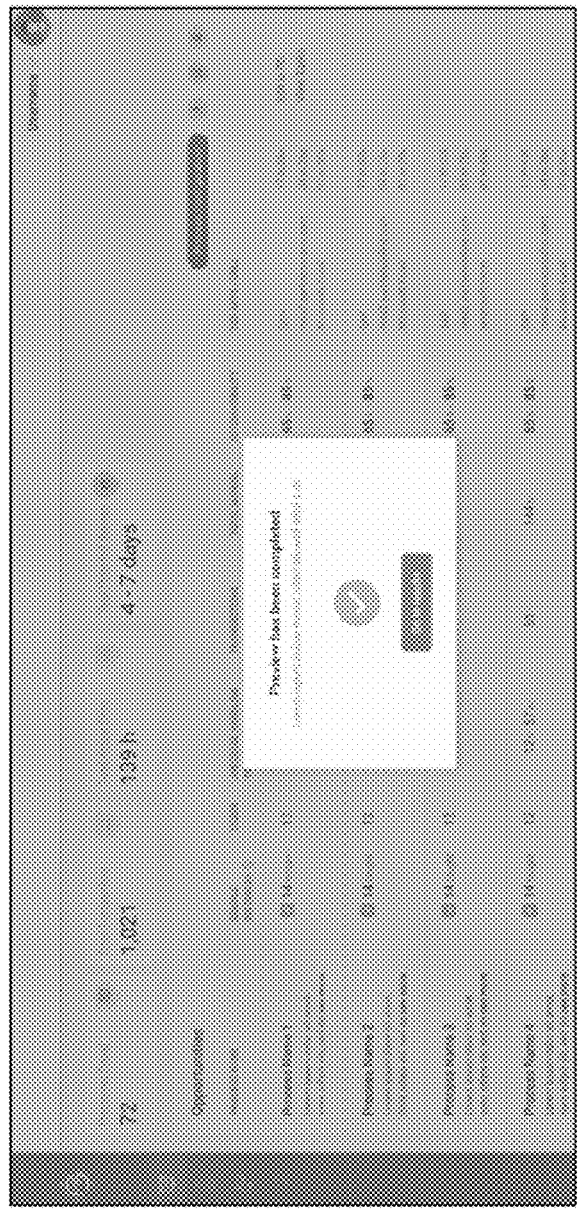

In some embodiments, as a preview is being conducted, the user interface may be configured to display a progress indicator, as shown in FIG. 11M. The progress indicator may inform the user approximately how much time has elapsed since the preview started and/or how much estimated time may be required to complete the preview. When the preview has completed, the user interface may be configured to provide a notification that the preview has been completed, as shown in FIG. 11N. In some embodiments, the notification may also include a selector that enables a user to view the results of the preview by interacting with the selector.

Figure 11O:
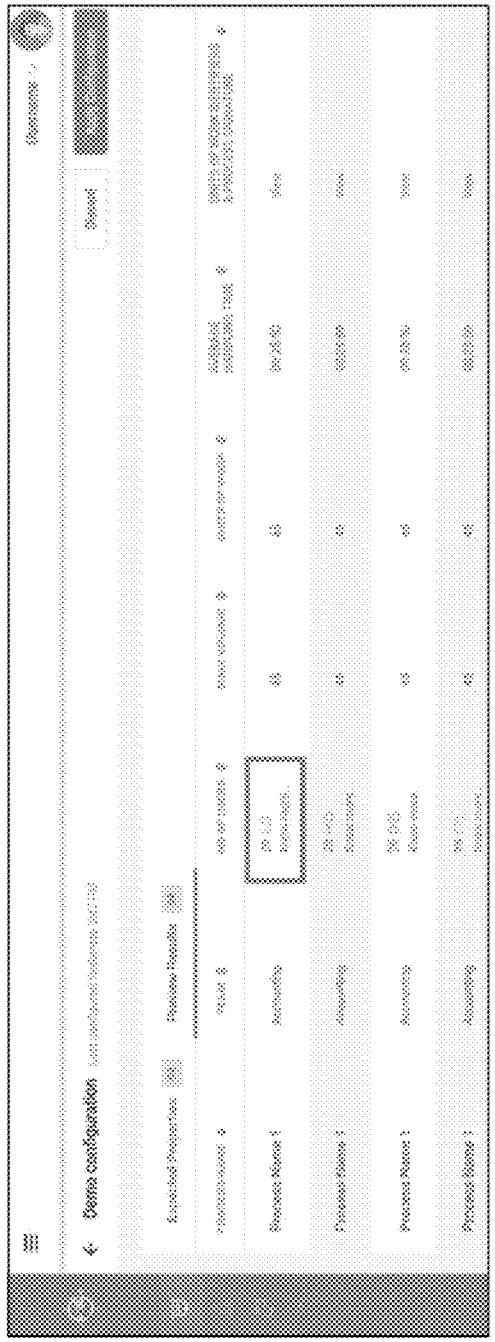

In response to selection of a selector to view results of a preview of applying a configuration to a dataset, some embodiments provide a user interface configured to show the preview results, an example of which is shown in FIG. 11O. For instance, as shown, the portion of the user interface showing the preview results may report the number of users that the system has determined performed the process, and also indicate a difference between the determined number of users and what the user may have expected. If the user were to click on "Know more . . ." more detailed information may be provided about the metric of interest. For instance, one or more visualizations may be shown that include additional details for each user performing the process to provide more insight into how it was determined during the preview that the user was performing the process. In some embodiments, after observing these visualization(s) the user may provide feedback to the system, and the configuration for the process may be changed based, at least in part, on the feedback provided by the user. For instance, the feedback may be used to avoid matching any sequence to the user or prevent matching similar sequences to those that the user has rejected.

Figure 11P:
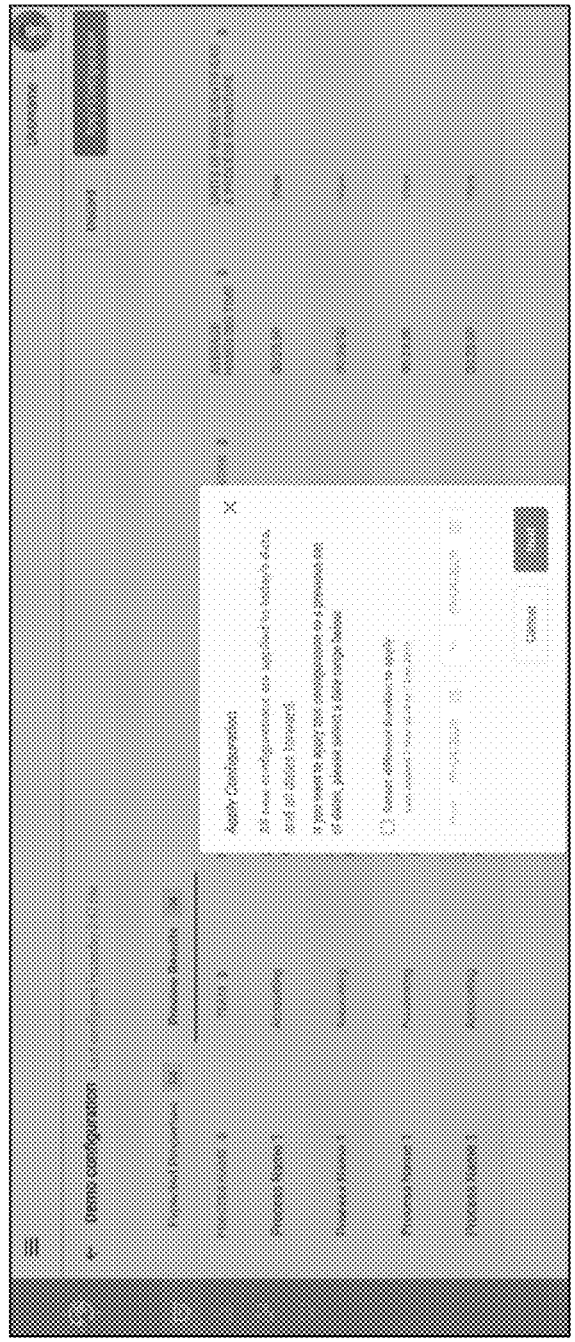

When the user is satisfied with the preview results (possibly by also indicating feedback, as described above), the user may interact with a portion of the user interface, an example of which is shown in FIG. 11P, to apply the configuration, resulting in the selected settings being applied to the configuration for use with discovering processes in wild data.

In some embodiments, current configuration settings may be applied during process discovery to all wild data for a particular user or organization to which the user belongs. In some embodiments, a user may be able to specify a particular period of time over which the configuration settings should be applied. For example, the user may learn that some users no longer perform the process, and the configuration may be updated to indicate that those particular users no longer perform the process.

Figure 11Q:
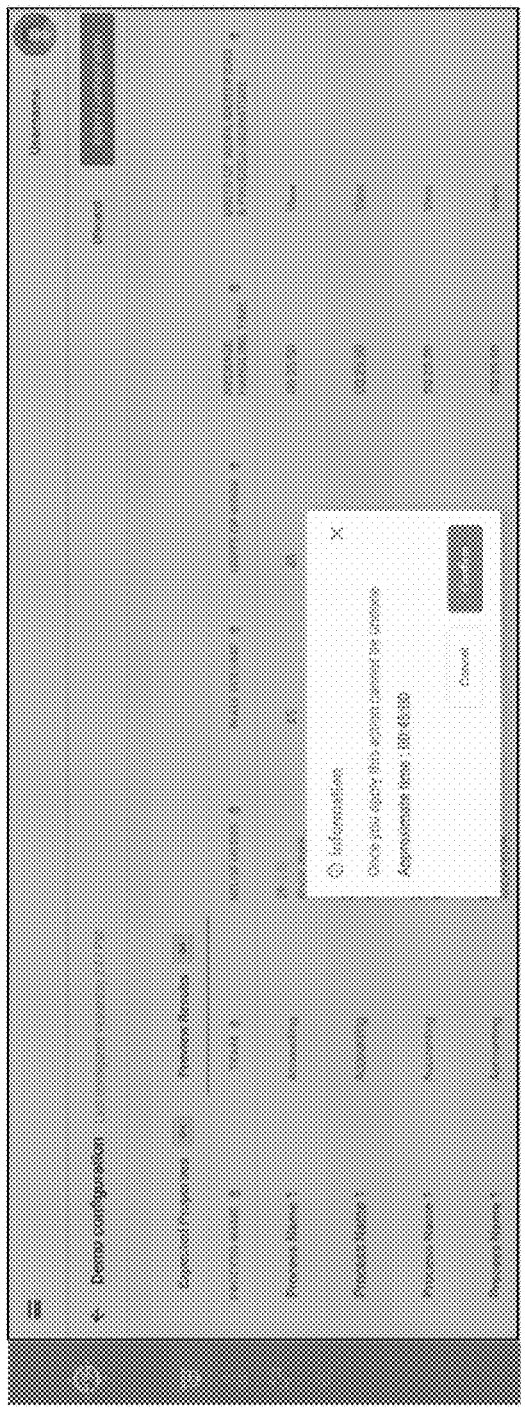
Figure 11R:
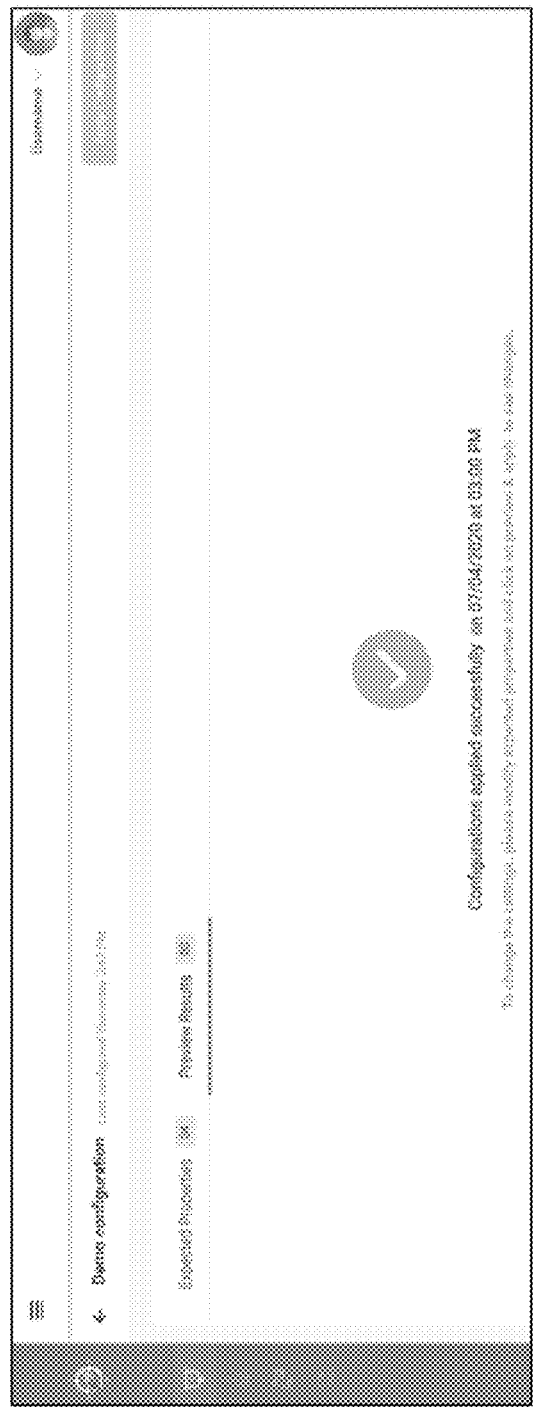

Once the user confirms application of the configuration to a particular time period, the user interface may be configured to prompt the user to confirm this selection, as shown in FIG. 11Q. In response to providing the confirmation, the user interface may be configured to provide a notification that the results of the configuration settings have been applied as shown, for example in FIG. 11R. After the configuration settings are updated, one or more metrics including, but not limited to, the detected users who do the process, the average handling time, how many matches per day, transactions per day, the variations of the process, the automatability of the process, etc. may subsequently be updated.

The inventors have recognized that throughout use of the system, many processes will continue to be taught over time, for example, as new processes are introduced, and old processes are no longer used. Some embodiments include functionality to track the taught status of the plurality of processes included for a particular user and/or organization. For instance, the "stage" of any given process stored in the system may be different. The various stages for a process may include, but are not limited to, added but not yet taught, currently undergoing teaching, teaching complete but actively discovering, and discovery complete with results produced and being displayed. The inventors have appreciated that it may be important for users to understand the current stage of each of the processes. Accordingly, some embodiments track the stage of each process to provide this information to a user.

Some embodiments are directed to functionalities useful in generating accurate results for process discovery. Such functionalities include:

Tracking: Guiding the user during training to inform the user when enough training data has been completed and to allow the user to preview the quality of the results as they continue to train by teaching more instances of a process.

Problem Alerting: Alerting a user when issues in the teaching of a process have been detected and/or when an issue has been detected in the results generated. Alerting the user in these situations may help the user complete an entire end-to-end usage of the process discovery technology while ensuring the best results. Alerts can be generated at the level of a process, task, step, taught instance of a process, or other aspects of the data quality.

Visibility & Explainability: Helping the user understand the results (e.g., providing information on why a particular number of users has been determined to have performed a particular process, the average handling time of the process, its transactions per-day, etc. Some embodiments allow a user to inspect the results by not indicating "3 users do the process" but also allow the user to view and validate who the users are and the sequences they conducted.

User Notifying of Issues & Self-Service Adjustment: Some embodiments provide users with self-service control to correct for errors in training and/or improve the accuracy of process discovery. Errors in training can adversely affect results provided during process discovery and should be corrected, if possible. Some errors can be detected (and in some cases corrected for) automatically, such as detecting that a training is likely mislabeled since it may correlate far stronger to another process than the one it was labeled to. Some processes that are too similar such that the process cannot be accurately distinguished during discovery may also be detectable. Such similar processes may be "corrected for" in some embodiments by allowing the user to merge them into a single process. Examples of how a user may provide feedback to improve accuracy of the system may include, but is not limited to, providing feedback in the user interface such as "Yes/No" as to whether a discovered sequence was accurately predicted to a process, or whether a user is conducting the process or not.

Each of these functionalities is described in more detail below.

The inventors have recognized that as users perform teaching instances for a process that are used to generate a signature of the process, it is important that the users are able to observe how many instances of each process have been taught (and as described later, to be alerted when issues are detected). Accordingly, some embodiments relate to performing tracking during the teaching process to identify and correct errors and/or inconsistencies, which may degrade the quality (e.g., accuracy) of the training data. The inventors have recognized that it is often important to allow for review and approval of taught instances of a process. For instance, knowing exactly how many taught instances need to be approved still (if approval of taught instances is required during the teaching process) is made visible to the users in some embodiments so that they know what still needs to be completed to obtain accurate results during process discovery.

Figure 12A:
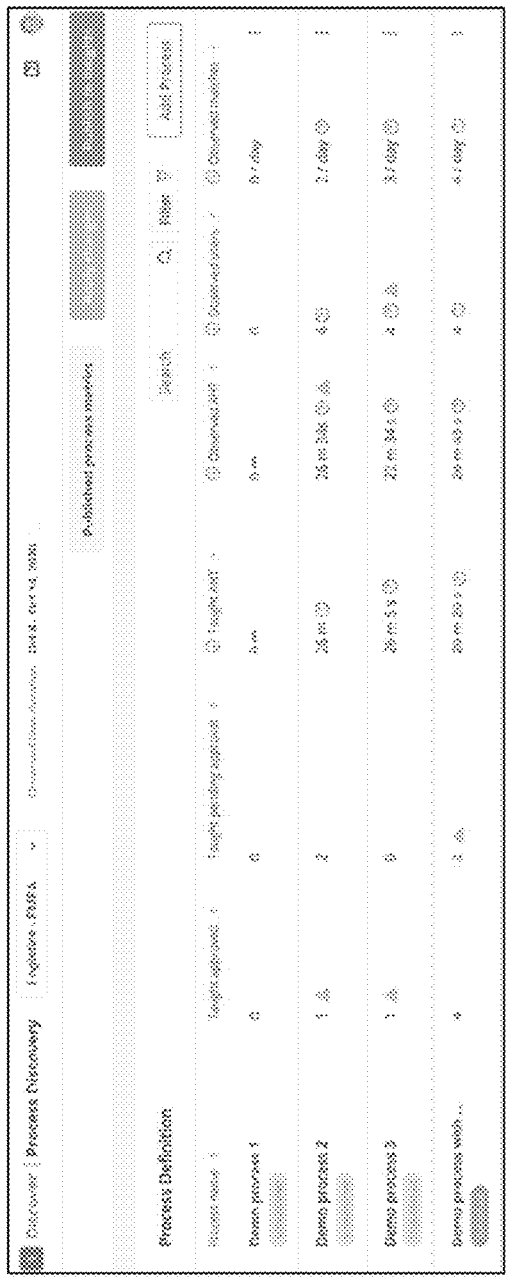
FIGS. 12A and 12B illustrate portions of a user interface that enable a user to review process discovery results in accordance with some embodiments.
Figure 12B:

FIG. 12A illustrates a portion of a user interface that provides details on the training progress for a plurality of processes. As shown, these details include, but are not limited to, how many taught instances have been approved and how many taught instances are pending approval. FIG. 12B illustrates additional details for a particular process that the user has selected. For example, the process "Teaching Progress—Demo Process 1" is shown as having been selected and details are provided on who has taught the process, how many instances each user has taught, and how many teachings instances are still in progress or are awaiting approval. Such information is particularly valuable for managers or administrators overseeing the teaching process to ensure that the training phase is completed in a timely manner. The inventors have also recognized that it is often helpful to be able to remind certain users to complete their teaching of certain processes. As such, the example user interface in FIG. 12B includes the capability to remind users to complete uncompleted teaching instances, which facilitates faster completion of the teaching process with a user-controllable level of alerting and feedback being provided to the users.

As described above, ensuring that accurate training instances are being used to create a signature of a process is important to ensuring that the signature itself is an accurate representation of the process. To this end, some embodiments are configured to alert a user when one or more issues are detected in the teaching of processes or in the results generated. The alerts can be generated at the level of a process, task, step, taught instance of a process, or other aspects of the data quality.

Figure 13A:
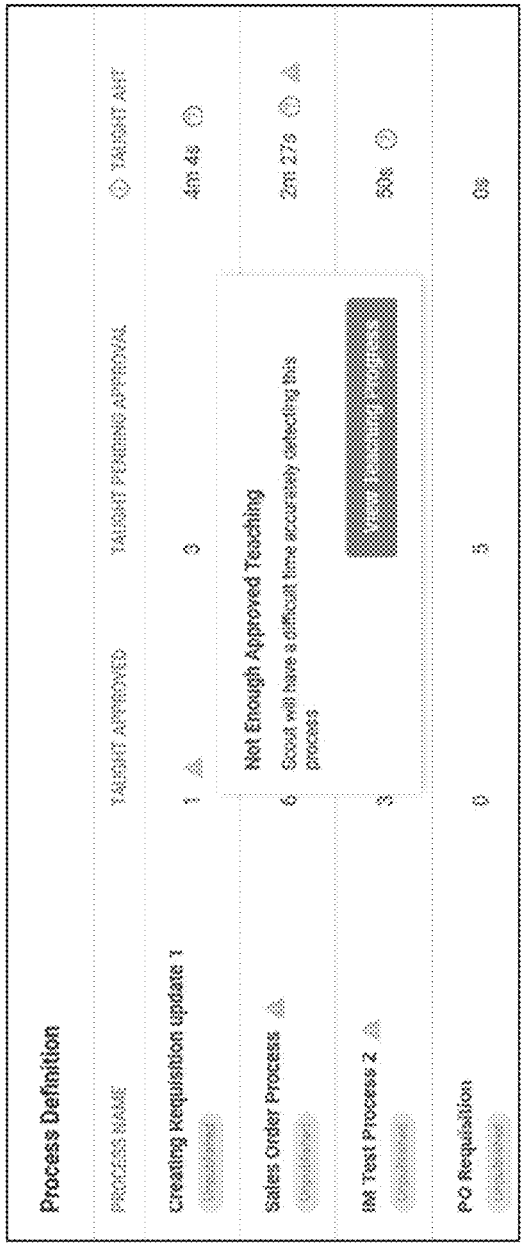
FIGS. 13A and 13B illustrate portions of a user interface configured to display alerts detected for taught instances of a process in accordance with some embodiments.
Figure 13B:
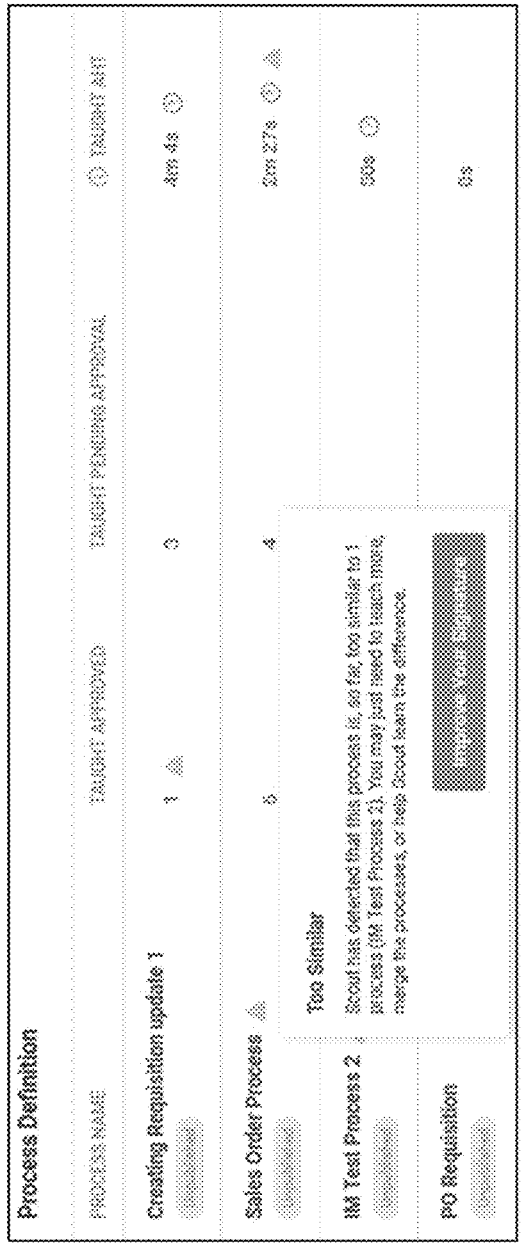

In some embodiments, multiple (e.g., all) of the alerts for detected issues are made available to the user via a user interface, examples of which are shown in FIGS. 13A and 13B. If the alert is at a process-level, it may be displayed near (e.g., next to) the process in the user interface (e.g., the alert which shows a process is "Too Similar" to another process in FIG. 13B). In some embodiments, alerts that are related to particular fields are displayed near (e.g., next to) the field (e.g., the alert for not enough approved teaching in FIG. 13A is displayed next to how many instances have been taught for the process).

Some examples of alerts provided in accordance with some embodiments include, but are not limited to the following alerts:

Not Enough Approved Teaching: Using a threshold (which may be configurable), this alert informs the user when there is not enough approved, taught, or total instances of a taught process, which are used by the signature generation process as training data.

Missing Marker: When adding and configuring a process to be taught, the user adding the process can specify markers indicating that certain metadata must be provided about a taught instance during teaching of the instance. For example, a marker may indicate that "Transaction ID" metadata must be provided with each teaching sample. If required metadata is missing from a teaching instance that was requested based on marker, this alert may be provided to a user.

Processes Too Similar: When a process is taught, the taught instance is a sequence of events that may contain many fields that represent the user interaction with an application (e.g., a click on an application, screen, button, with the type of button or the keystroke entered) or between systems (e.g., information in the log of an application about an event in the process), as described above. If it is determined that a taught process is too similar to one or more other taught processes, this alert may be provided to a user. Any suitable technique may be used to determine if two processes are too similar such that the discovery process may fail to provide consistent and accurate results (e.g., one sequence could be confused between these two defined processes), examples of which are provided below.

Vectorization: all of the events for each process are considered together and form a vector (e.g., the events are represented as numbers, where the same events are assigned the same number). The vectors are put into two lists, one for each process, and the similarity of the lists is computed using methods for assessing similarity, such as cosine similarity or Euclidean distance. If the measure of similarity exceeds a threshold (which may be configurable) this alert may be provided to the user. It should be appreciated that the computation of similarity can be between any two numbers (e.g., 0 and 1) with a threshold configured to raise the alert.

Synthetic data: Synthetic data may be generated for the processes (e.g., based on the teaching data) to construct a data set in which the sequences existing in the data set and corresponding to each process are known as the ground truth. Process discovery can then be used with this synthetic data set, and when finding that the sequences from two processes are often being mislabeled to one another (e.g., such as done in a "confusion matrix"), then this alert may be provided to the user with regard to the two confusable processes.

Taught Instances Too Different: When taught instances for a single process are too different, this alert can be provided to the user. The same (or similar) techniques described above for assessing similarity (e.g., vectorization, synthetic data) across different processes can be used to detect differences between taught instance sequences for a single process. For example, if a process has five taught instances, the similarity of these five taught instances to each other (pairwise comparison or via clustering) may be computed, and if there is low similarity, then an alert may be provided to the user. As an example, if a taught instance has a similarity less than a threshold amount (e.g., 0.25 on a scale between 0 and 1) compared to other taught instances of a process, this alert may be provided to the user indicating that there is at least one taught instance that is too different from the others. Including the different taught instance as training data may lead to inaccurate results if the user does not investigate and confirm whether the instance should be removed or relabeled. In some embodiments, differences between taught instances of a process are assessed by computing their pairwise similarity and grouping the taught instances by similarity, resulting in clusters of taught instances. If there is more than one cluster (or another configurable amount), then this alert may be provided to the user due to the lack of consistency between the taught instances.

Inaccurate Discovery: This alert is a warning to the user that process discovery (e.g., using signatures of the processes generated during teaching) may not be providing accurate results. The synthetic data technique described above may be used to construct a data set (e.g., from a portion of the training data) where the ground truth is known. Process discovery can be applied to this data set where ground truth is known, and if process discovery is unable to accurately assign sequences to a given process (e.g., via false negatives or false positives as computed by knowing the true sequences that belong to each process in the synthetic data set), then this alert may be provided to the user for a given process.

Taught Instance Likely Mislabeled: Using one or more of the techniques described above for assessing similarity/difference of taught instances for a single process, some embodiments relate to finding small numbers (e.g., one or more) of taught instances that do not correlate well with other taught instances in the process to which they are associated, but correlate well with (e.g., are similar to) one or more taught instances of another process. The similarity with taught instance(s) in another process suggests that the user mislabeled the taught instance during teaching and indicates that the taught instance should be relabeled as belonging to the other process for which it is determined to be similar.

Taught Times Too Different from Observed Times: Each taught instance of a process may be associated with a length, e.g., the difference in time from when the teaching session started for a taught instance to when the teaching session ended. Since, during teaching, the user is performing the process being taught, it can be expected that instances of the process found during process discovery should have lengths similar (e.g., within a threshold amount) to the length of the process when taught. For example, one might expect that the process lengths observed during process discovery should be no more than 5× the process lengths determined when the process was taught or no less than 10% of the length (e.g., the average length) of a taught instance. When these thresholds (or other suitable thresholds, which may be configurable) are exceeded, this alert may be provided to the user. The alert may be generated on an individual taught instance basis or by comparing aggregate times (e.g., the average time across multiple taught instances vs. the average observed time during process discovery).

Process discovery as described herein is a technique for discovering sequences for a process after that process has been taught during training and generation of a process signature. The inventors have recognized that showing the process discovery results to the user, generating alerts, and making the results highly visible, inspectable, and "explainable" to the user may be important to facilitate the user's understanding of signature generation and process discovery.

Figures 14A, 14B:
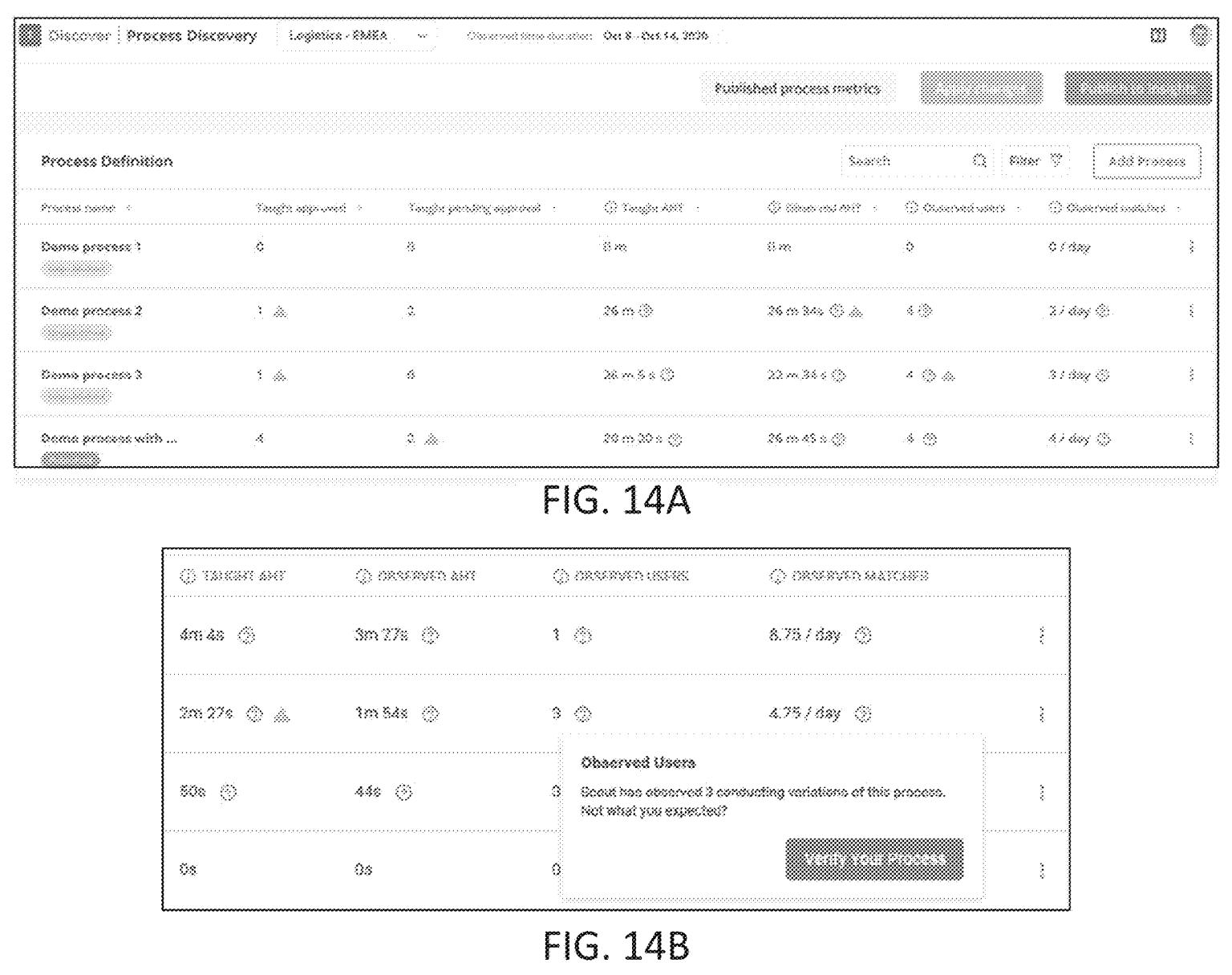

FIG. 14A illustrates a portion of a user interface that facilitates a user's understanding of process discovery results in accordance with some embodiments. The summary page shown in FIG. 14A includes columns such as "Observed Average Handling Time (AHT)," "Observed Users," and "Observed Matches," which provide users with a summary of process discovery results and metrics while they are still teaching. Metrics other than those shown in FIG. 14A may additionally or alternatively be used, and embodiments are not limited in this respect. As shown, the displayed metrics for process discovery may be displayed next to metrics determined during teaching, such as how many taught instances exist and the average handling time (AHT) of the taught instances of the process. By presenting process discovery metrics next to teaching metrics, users may be able to gain more confidence in the results and compare them to identify any possible issues in teaching and/or process discovery.

Providing process discovery results and metrics to the user may also enable the user to gain insight into some of the high-level statistics that the user might want to ensure are correct (and potentially have them explained). Understanding the high-level metrics and ensuring they are correct may enable the user to gain trust in other more detailed metrics (e.g., automatability or "savings" to be had from automating the process), which are based on the high-level metrics. For example, if the user is unsure of whether the system correctly captured the number of users metric, the user may not trust/believe a "savings" metric that depends on the number of users metric being correct. In some embodiments, the summary of process discovery results is configurable. Once a user (e.g., a manager) is comfortable the results are correct, the user may "Publish the Process" for the rest of the organization (e.g., other users in the company) to view.

Some embodiments enable a user to inspect one or more process discovery results using a user interface, an example of which is shown in FIG. 14B. For the user to trust a process discovery result (or to determine that a result is likely incorrect), the user can interact with a user interface such as that shown in FIG. 14B to verify a process discovery result.

Figure 14C:
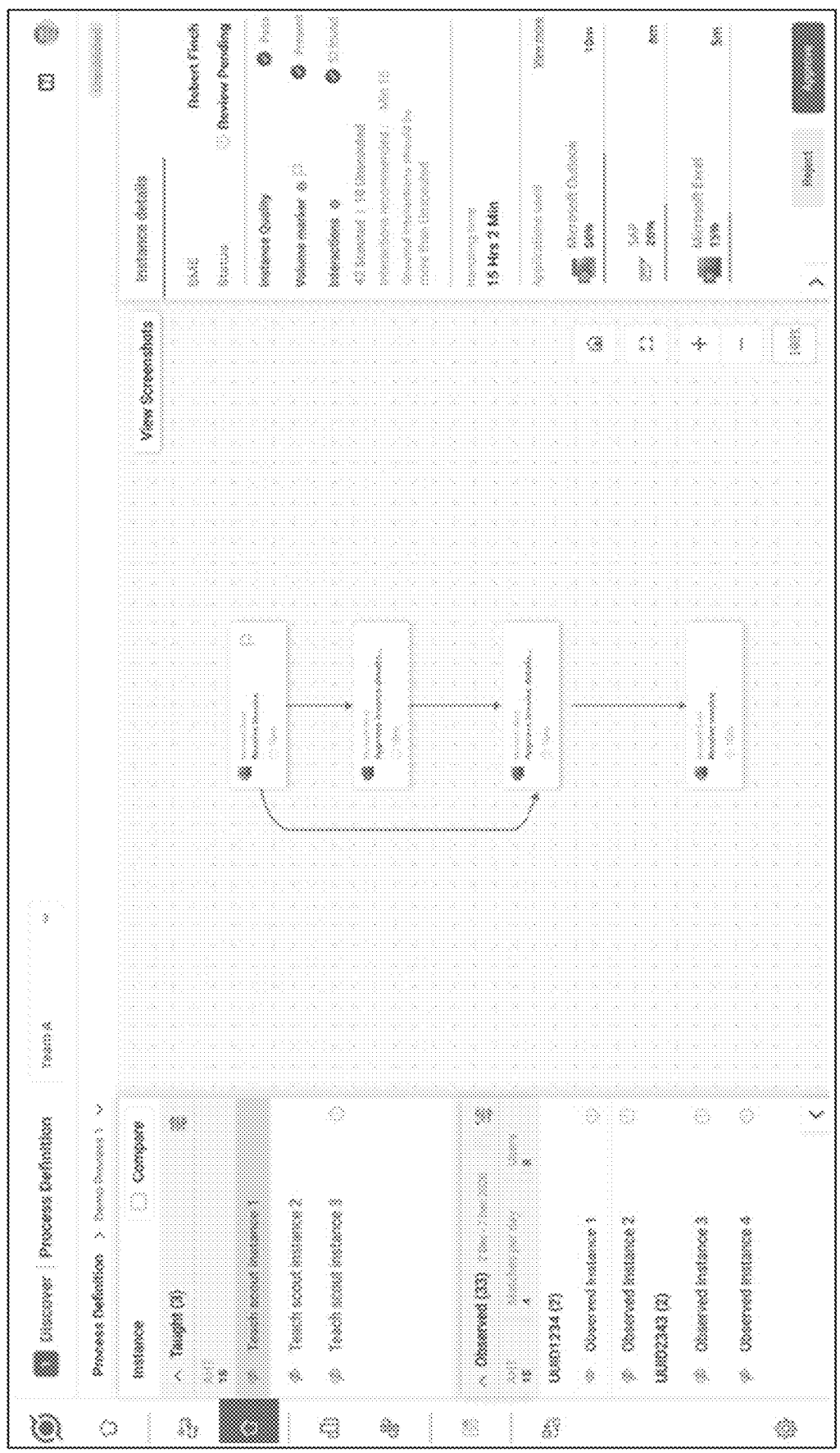

During verification, the user may be shown a summarized flow chart, an example of which is shown in FIG. 14C. The flow chart may show how the process was performed for one or more taught instances of the process (shown in the top left portion of FIG. 14C) and one or more observed instances of the process during process discovery (shown in the bottom left portion of FIG. 14C). Details about a currently inspected instance of the process may also be provided as shown, for example, on the right portion of FIG. 14C. Each node in the flow chart that is inspectable may be an event in the process or a step in the process with associated metadata. As shown in the bottom left portion of FIG. 14C, in some embodiments the observed instances of the process may be filtered and grouped. For example, the observed instances may be grouped by user identifier as shown in FIG. 14C. Grouping observed instances by user identifier may help a user verify that the number of users observed metric described in connection with FIG. 14B is accurate. For example, if during discovery two users were identified as performing a particular process but the user believed there to be only one person performing the process, the user can inspect the process discovery results to better understand why two users were identified rather than one.

In some embodiments, results from process discovery and/or teaching may be grouped in ways that enable users to gain confidence in the process discovery results or to identify errors that may be corrected. The results may be grouped in any suitable way examples of which include, but are not limited to, grouping by user identifier (as described above), by transaction time, by similarity (e.g., group all observed sequences or transactions together by similarity—using, for example, techniques described above for computing similarity), by markers, by geographical location of users, by team, by similarity to a taught instance, etc.

As described herein, the inventors have recognized that process discovery techniques can be improved by presenting process discovery results to users through intuitive graphical visualizations. Such visualizations not only allow users to understand process discovery results, but also enable them to adapt the process discovery techniques based on feedback provided by the users. Such feedback allows for the correction of errors in already discovered process results as well as for updating the way in which process discovery is performed going forward (e.g., by changing one or more parameters, thresholds, and/or rules to be used by the process discovery technique).

Accordingly, the inventors have developed tools that facilitate the detection of potential issues in teaching and/or process discovery by allowing users to inspect the results and compare process instances with other process instances (e.g., using flow diagrams, metrics, etc.). Should discrepancies be detected (e.g., via automated discrepancy detection and/or through user inspection/validation of the results), some embodiments relate to techniques for enabling users to provide feedback to improve process signature generation and/or process discovery.

One tool developed by the inventors enables a user to visually compare two process instances, in some embodiments. For example, the user may wish to compare a taught process instance with a discovered process instance to determine whether or not the taught process instance and the discovered process instance are instances of the same underlying process. When the user determines that the discovered and taught instances are not instances of the same underlying process, the user may provide that information as feedback to adapt process discovery. For example, the information may be used to update one or more parameters thresholds and/or rules using to perform process discovery going forward.

As another example, the user may wish to compare one taught instance of a process with another taught instance of the same process to determine whether there are any discrepancies between the taught process instances, as the presence of such discrepancies may indicate that the teaching was performed improperly (e.g., because a user teaching one of the instances started to perform a different activity part of the way into teaching the process instance). As described herein, multiple taught process instances may be used to generate a process signature for performing discovery. Thus, in some embodiments, identifying a discrepancy between two taught instances of the same underlying process may allow a user to indicate, for example, that one (or both) of the taught instances are not to be used for generating a process signature. This, in turn, would improve subsequent discovery of instances of this process in data to be generated by other users (e.g., data captured when the other users interact with their computing devices to perform various processes and other activities) since the process signature would more faithfully represent the process performed by these users.

Figure 14D:
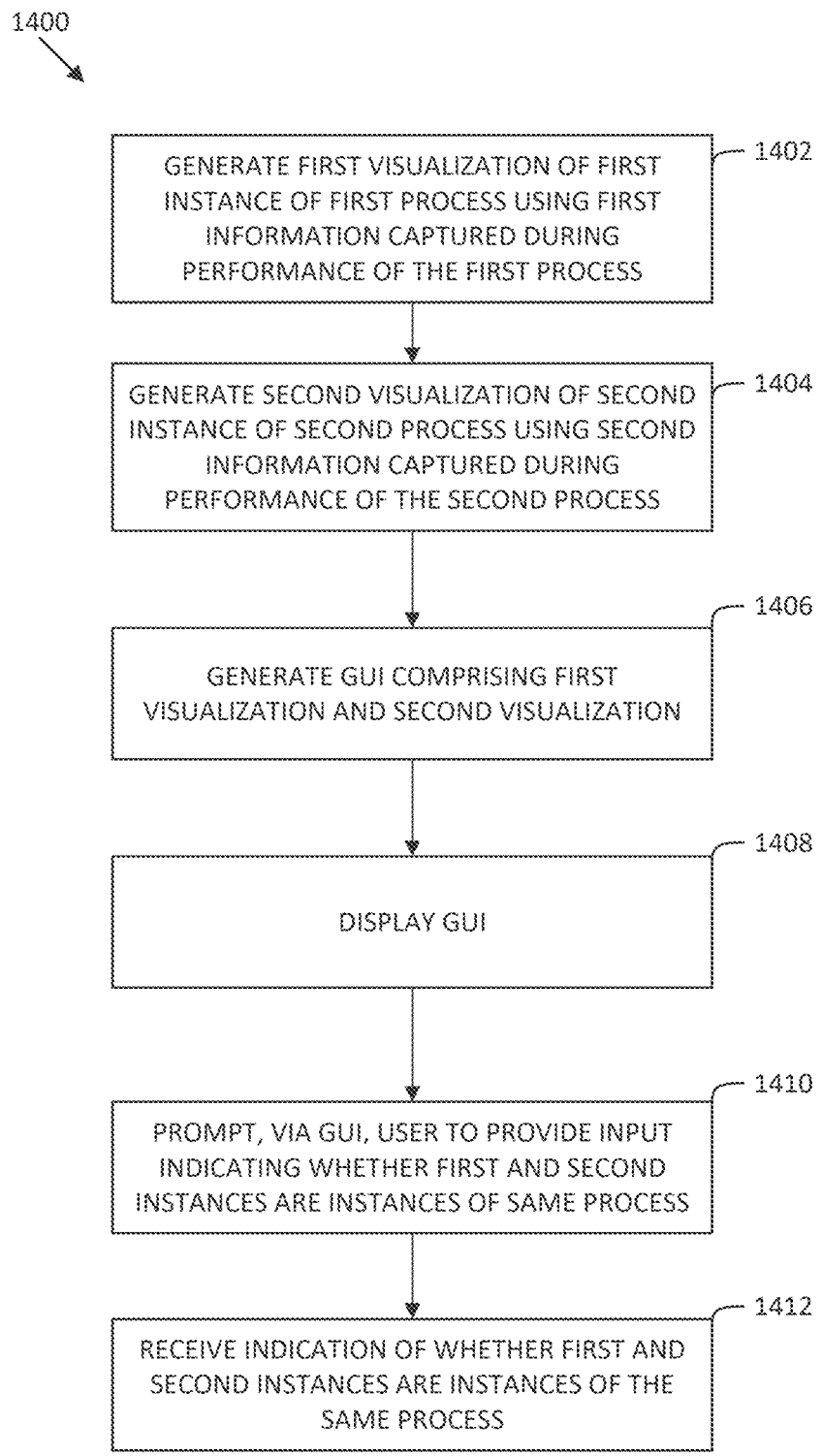
FIG. 14D illustrates a flowchart of acts for enabling a user to visualize and compare multiple process instances in accordance with some embodiments.

FIG. 14D is a flowchart of method 1400 for enabling a user to visualize and compare multiple process instances. At least some of the acts of method 1400 may be performed by any suitable computing device(s) and, for example, may be performed by one or more of the computing devices 102 shown in process tracking system 100 of FIG. 1A.

Method 1400 begins at act 1402, which includes generating a first visualization of a first instance of a first process using first information captured during performance of the first process by a first user. In some embodiments, the first information may include information corresponding to a first stream of events captured during performance of first actions by the first user. In some embodiments, the first information may be captured by a computing device (which may be the same or a different computing device from the computing device performing at least some of the acts of method 1400) operating in teaching mode, whereby the user is teaching the first instance of the first process for subsequent use in generating a signature for the first process. In this case, the first instance may be referred to as a "taught" instance of the first process. In some embodiments, the first information may represent an instance of a discovered process, which may have been discovered using process discovery techniques described herein. In such a case, the instance may be referred to as an "observed" or "discovered" instance of the first process.

Figure 14E:
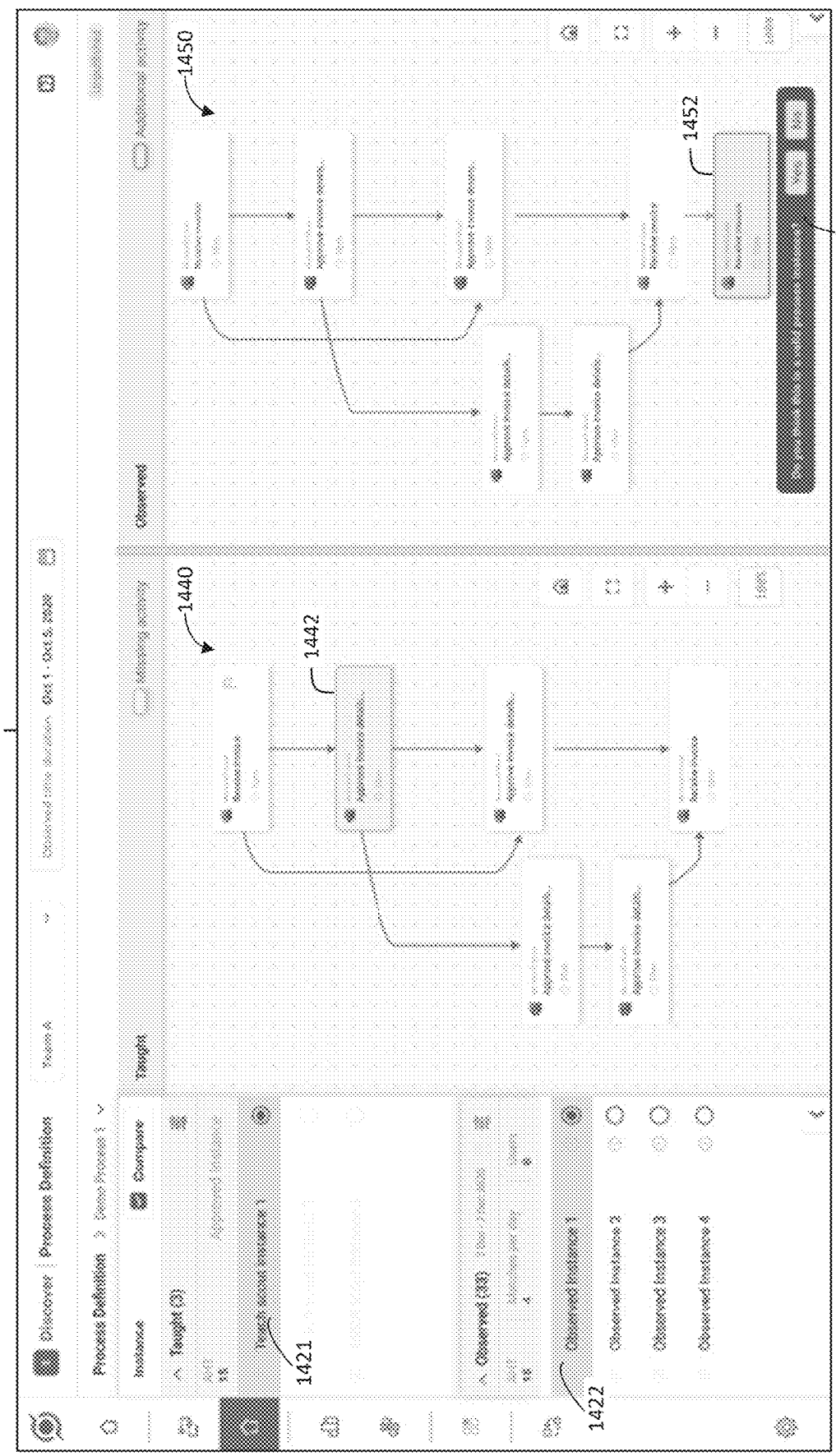
FIG. 14E illustrates a portion of a user interface configured to display multiple process instances in accordance with some embodiments.

By way of example, the graphical user interface of FIG. 14E shows a visualization 1440 of a taught instance 1421 of a first process. The visualization 1440 identifies at least some of the first actions performed by the first user in furtherance of the first process. In this example, the visualization 1440 includes a flow diagram having nodes corresponding to actions performed by the first user and directed edges corresponding to transitions among the nodes representing the actions. In this example, each node may represent an action performed by the user using a particular type of application program (e.g., MICROSOFT WORD, MICROSOFT EXCEL, etc.) and may displayed together with a visual marker identifying the application program.

As described herein, the flow diagram part of the visualization 1440 may represent only a part of the first instance of the first process (e.g., some but not all of the actions performed by the user and/or some but not all of the transitions between the actions). To this end, in some embodiments, the flow diagram generated as part of visualization 1440 may be pruned to remove one or more nodes and/or edges to arrive at a simpler-to-understand flow diagram. Alternatively, the information used to generate the diagram may be filtered to remove at least some of the information so that when the filtered information is used to generate the visualization, the generated visualization does not include one or more nodes and/or edges. For example, in some embodiments, nodes corresponding to "uninformative" actions that occur as part of most process instances (e.g., opening an application such as WORD or SAP) may be removed because such nodes are not likely to help the user visualize differences between process instances (as most process instances would include such an action). As another example, in some embodiments, nodes associated with actions having small weights (e.g., weights lower than a threshold) may be filtered. As yet another example, the nodes may be in an ordered (e.g., time-ordered) sequence and the pruning and/or filtering may comprise removing one or more edges from nodes to other nodes appearing at least a threshold number (e.g., at least one, at least two, at least three, at least four, at least five, at least six, at least seven, at least eight, at least 9, at least 10, etc.) of nodes earlier in the ordered sequence so as to remove backward arrows which may be confusing to a viewer.

Next, method 1400 proceeds to act 1404, which includes generating a second visualization of a second instance of a second process using second information captured during performance of the second process. In some embodiments, the second information may include information corresponding to a second stream of events captured during performance of second actions by a second user. The second instance of the second process may be a taught instance or a discovered instance, as aspects of the technology described herein are not limited in this respect.

In some embodiments, the second user may be the same user as the first user. In this case, the acts of method 1400 may be used, for example, to compare multiple instances of a process performed by the same user (e.g., a visual comparison of two process instances taught by the same user, a visual comparison of two discovered process instances that were performed by the same user, or a comparison of a process instance taught by a user and a discovered instance of the process performed by the same user). In some embodiments, the first and second users may be different. In this case, the acts of method 1400 may be used, for example, to compare multiple instances of the same process performed by different users or to compare an instance of one process (taught by or discovered based on activity of one user) with an instance of a second process (taught by or discovered based on activity of another user). By way of example, the graphical user interface of FIG. 14E shows a visualization 1450 of a discovered instance 1422 of a first process.

Next, method 1400 proceeds to act 1406, which includes generating a GUI comprising the first visualization generated at act 1402 and the second visualization generated at act 1404. FIG. 14E shows an example of such a GUI. The GUI generated at act 1406 may be displayed at act 1408.

As can be seen from FIG. 14E, in some embodiments, the first and second visualizations are shown simultaneously in the GUI. In some embodiments, the first and second visualizations are shown side-by-side (as in FIG. 14E), though other arrangements may be possible (e.g., showing one visualization on top and another on the bottom, or in any other suitable way such that the differences between the first and second visualizations may be appreciated by the viewer).

In some embodiments, the GUI generated at act 1406 may include enhancements that facilitate the user's comparison of the two process instances being compared. For example, a similarity score (e.g., using one or more of the similarity assessment techniques described above) between the two process instances may be calculated and displayed. As another example, the GUI may visually highlight differences between the first visualization and the second visualization. For example, one or more differences between the first and second instances may be automatically detected during process discovery (e.g., detecting an action present in one process instance, but not in another process instance) and the visualizations may be generated to highlight the automatically detected difference. For example, in some embodiments, the GUI may visually indicate on the first visualization and/or the second visualization at least one difference between the first visualization and the second visualization. This may be done, for example, by highlighting at least one node of the first visualization representing an action not represented by any node in the second visualization (or vice versa). The highlighting may be performed using color, shading, size, a different icon, a background effect, a symbol, a font, and/or in any other suitable way, as aspects of the technology described herein are not limited in this respect. For example, as shown in FIG. 14E, node 1442 in the taught instance may be highlighted in a first color, indicating that the node existed in the taught instance of the process but not in the observed (discovered) instance of the process. As another example, node 1452 may be highlighted in the same or a different color to indicate that the node was included in the observed instance that was not included in the taught instance of the process.

It should be appreciated that other properties can additionally or alternatively be shown in a user interface to help a user understand the differences between the taught process instances and the observed process instances, examples of which include, but are not limited to, differences in length in time to perform the two process instances, differences in events between the two process instances, differences in paths taken between the two process instances, and time between events in the two process instances.

Next, method 1400 proceeds to act 1410, where a prompt is generated, via the GUI displayed at act 1408, to prompt the user to provide input indicating whether the first and second instances are instances of the same process. In response to being so prompted at act 1410, the user may provide input and the system performing method 1400 may receive, at act 1412, an indication of whether the first and second instances are instances of the same process.

It should be appreciated that method 1400 is illustrative and that there are variations. For example, one or more acts of method 1400 may be omitted in some embodiments. For example, in some embodiments, the acts 1410 and 1412 may be omitted. As another example, in some embodiments, the GUI may be used to show a simultaneous visual comparison of more than two (e.g., 3 or 4) process instances. As yet another example, in some embodiments, the GUI may show a single visualization of a process instance rather than two visualizations of process instances as shown in FIG. 14E. For example, in some embodiments, a visualization of a single process instance may be shown with differences relative to other process instances (not themselves visualized) highlighted (e.g., by highlighting an extra node present in the visualized process instance, but not present in other non-visualized process instance(s)).

As described above, some embodiments provide a set of tools to enable users to detect potential issues in teaching and/or process discovery by allowing users to inspect the results and compare instances with other instances (e.g., using flow charts, metrics, etc.). Should discrepancies be detected (e.g., via alerts and/or through user inspections/validations of the results), some embodiments relate to techniques for enabling users to provide feedback to improve process signature generation and/or process discovery.

Figure 15A:
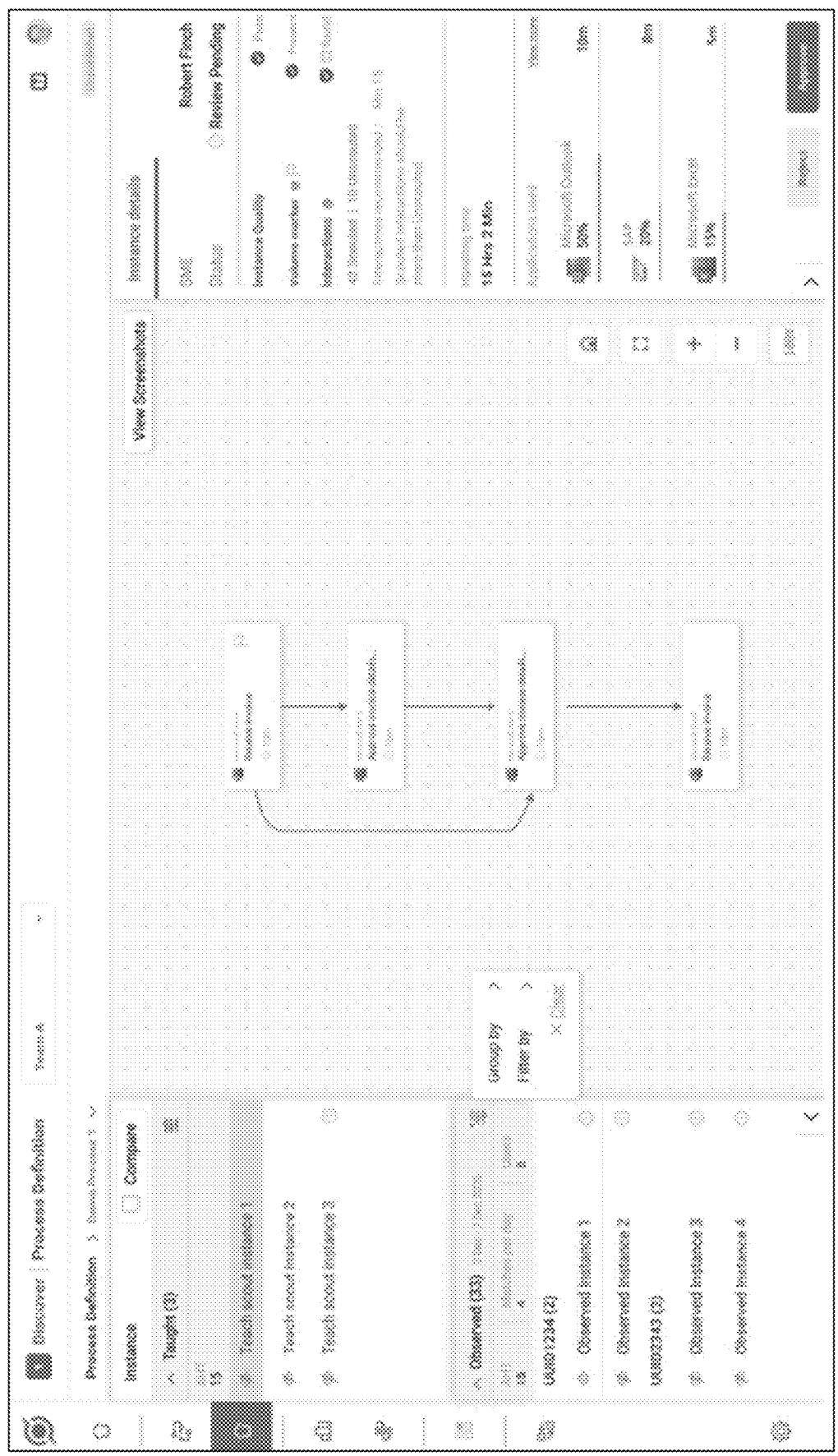
FIG. 15A illustrates a portion of a user interface configured to enable a user to provide feedback on a taught instance of a process in accordance with some embodiments.

FIG. 15A illustrates a portion of a user interface that enables a user to provide feedback on a taught instance of a process in accordance with some embodiments. As shown on the lower right-hand portion of FIG. 15A, the user interface may include user interface elements that enable the user to approve or reject a taught instance as being valid. When a user rejects a taught instance, the user may be solicited for feedback on why the taught instance is being rejected. Such feedback may be useful to adapt the signature generation process. Examples of reasons for rejection of taught instances and actions that may be taken include, but are not limited to the following:

- Mislabeled: The user determines the taught instance is valid but is assigned to the incorrect process. In some embodiments, the user may interact with the user interface to relabel the taught instance to associate it with the correct process.
- Incomplete: The user determines that the taught instance is assigned to the correct process but is an incomplete representation of the process. Depending on properties of the taught instance (e.g., its length or number of actions) some embodiments may decide not to discard the incomplete taught instance and learn from it, but no longer show it to the user.
- Missing Markers: The user determines that the taught instance is assigned to the correct process but is missing markers that were important to be associated with the taught instance (e.g., the user did not mark the transaction ID when recording it). Depending on properties of the taught instance (e.g., its length or number of actions) some embodiments may decide not to discard the incomplete taught instance and learn from it, but no longer show it to the user. For example, since the taught instance was still a valid instance it may still be helpful to train the process discovery algorithm.
- Incorrect: The user determines that the taught instance is assigned to the correct process but it something appears wrong with the data. This reason may be different than the taught instance merely being incomplete. For example, the taught instance may not appear similar to other taught instances associated with the process or any other taught processes known to the user. In some embodiments taught instances identified as "Incorrect" may be discarded and not used for training. In other embodiments, "Incorrect" taught instances may be retained and used as negative training exemplars during training.

Figure 15B:
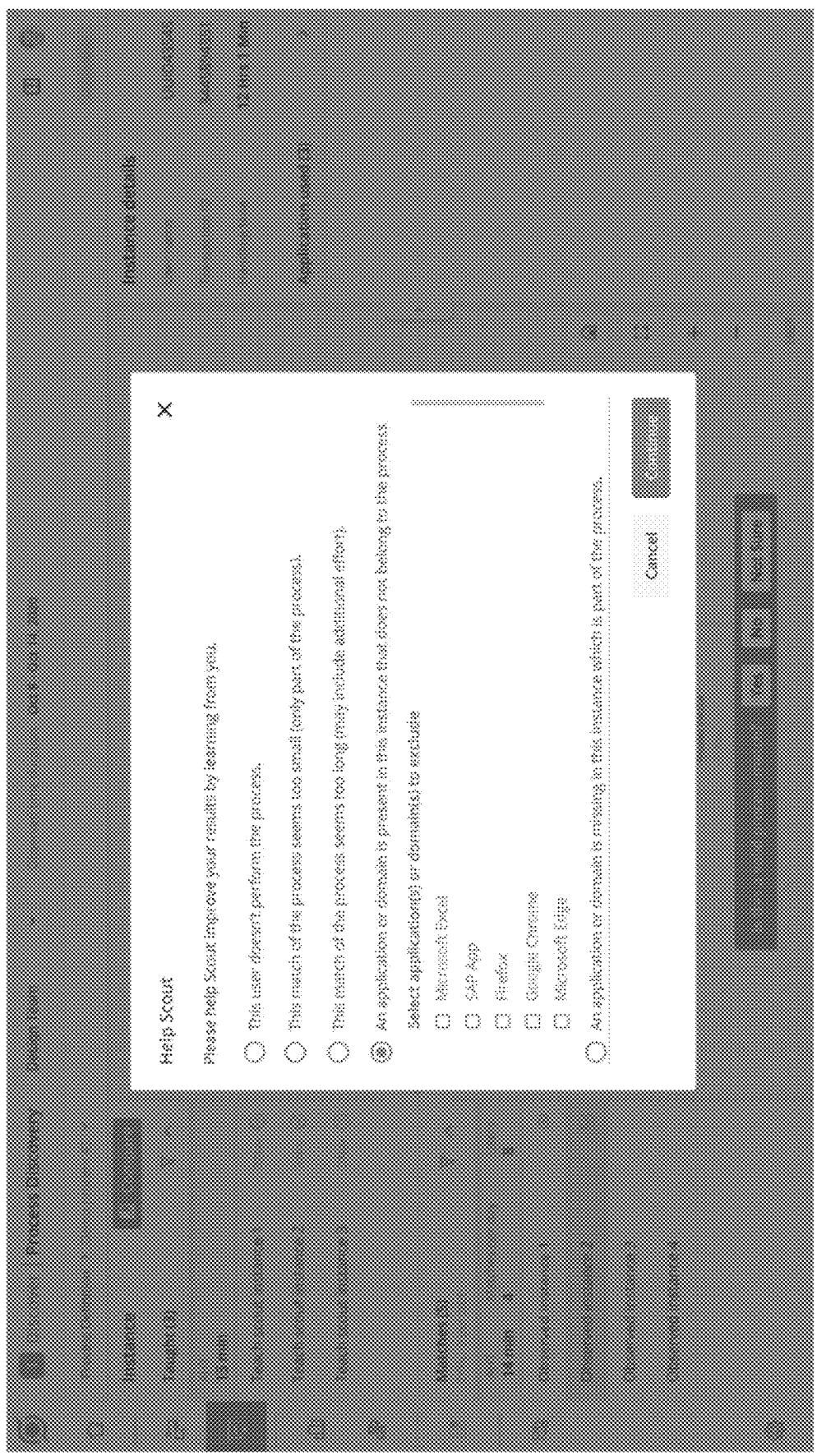
FIG. 15B illustrates a portion of a user interface showing example reasons that a user may reject a process instance in accordance with some embodiments.

Additional examples of reasons that a user may reject an instance of a process are shown in the illustrative user interface in FIG. 15B. As shown in this example, a user can provide a reason for rejection through a GUI by providing an indication that: (1) the user who performance the rejected instance of a process does not perform the process (e.g., as part of the user's job); (2) the match of the process appears to be only a small part of the process; (3) the match of the process sems to along and appears to include additional steps not part of the process; (4) an application or domain is present in the process instance that is known to not be part of the process; and (5) an application or domain is missing in the process instance and the application or domain is known to be part of the process. These are non-limiting examples as, in other embodiments, the GUI may include additional or alternative reasons for rejecting a process instance.

In some embodiments, the reason for rejecting an instance of a process may be used by the process discovery software to update its results. For example, the process discovery software may automatically reject other process instances that should be rejected for the same reasons. For instance, the user may reject a process instance as a purported instance of process "A" because the instance doesn't not include actions performed using an application program (e.g., SAP) known to be used in the process "A." In turn, the process discovery software may automatically disassociate from process "A" other already discovered instances that don't include actions performed using the application program indicated as being required by the user. Additionally or alternatively, the process discovery software may use the feedback to update the signature for the process "A" so that the signature includes information indicating that the application program is a required part of process "A."

As another example, the user may indicate that the process "A" includes actions performed by an application program (e.g., SAP) that is known to not be used as part of the process "A." In turn, the process discovery software may automatically disassociate from process "A" other already-discovered instances that include actions performed using the application program. Additionally or alternatively, the process discovery software may use the feedback to update the signature for the process "A" so that the signature includes information indication that the application program is not part of the process "A" and, for example, may be a "key differentiator" of the process "A."

Figure 15C:
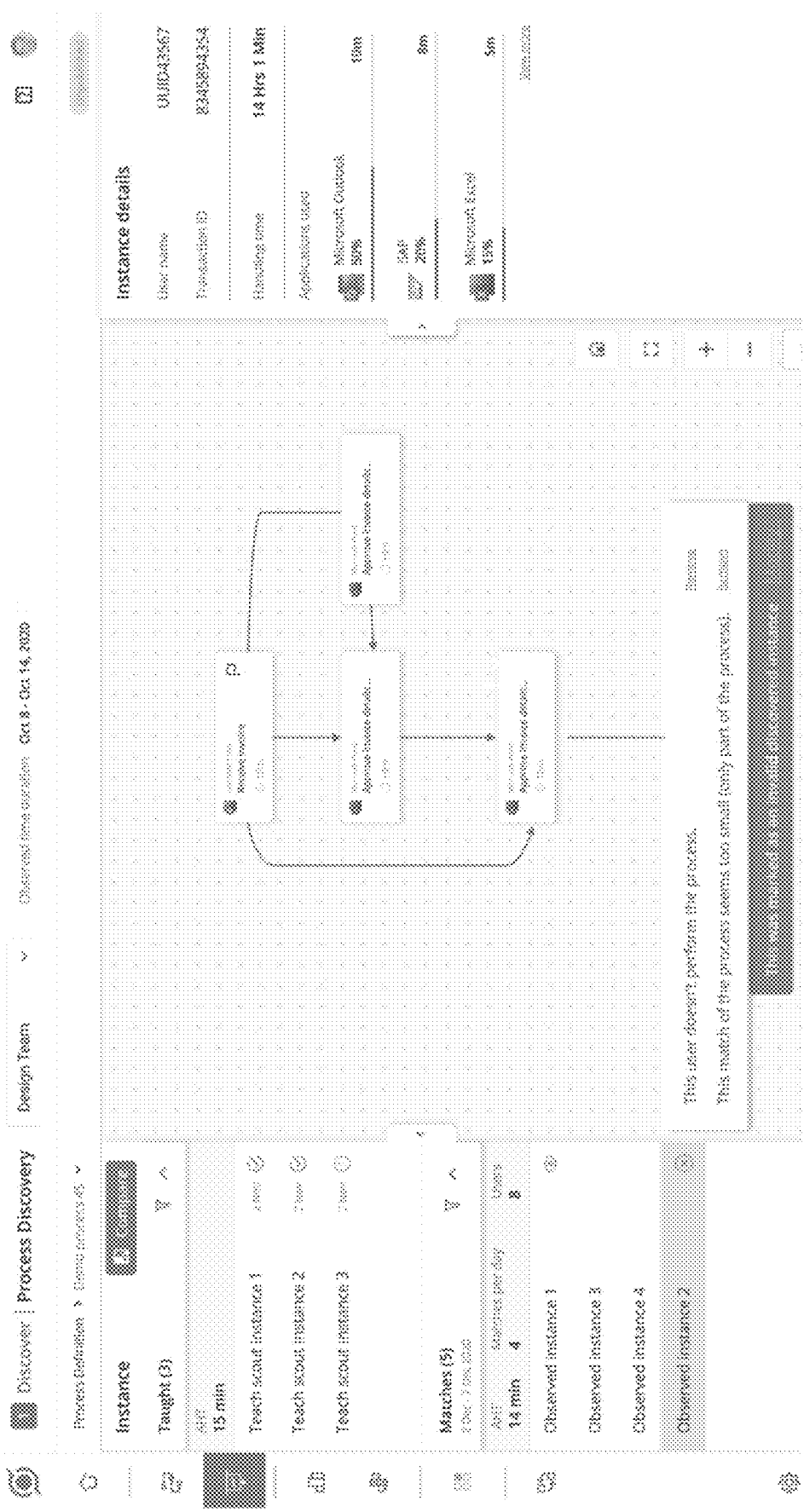
FIG. 15C illustrates a portion of a user interface that enables a user to compare, modify, or reject provided reasons for rejecting a process instance in accordance with some embodiments.

In some embodiments, a user may provide multiple reasons for rejecting a process instance. In some embodiments, as shown in FIG. 15C, the process discovery system may generate GUI that enables the user to confirm, modify, or reject the provided reasons for rejecting a process instance.

Figure 15D:
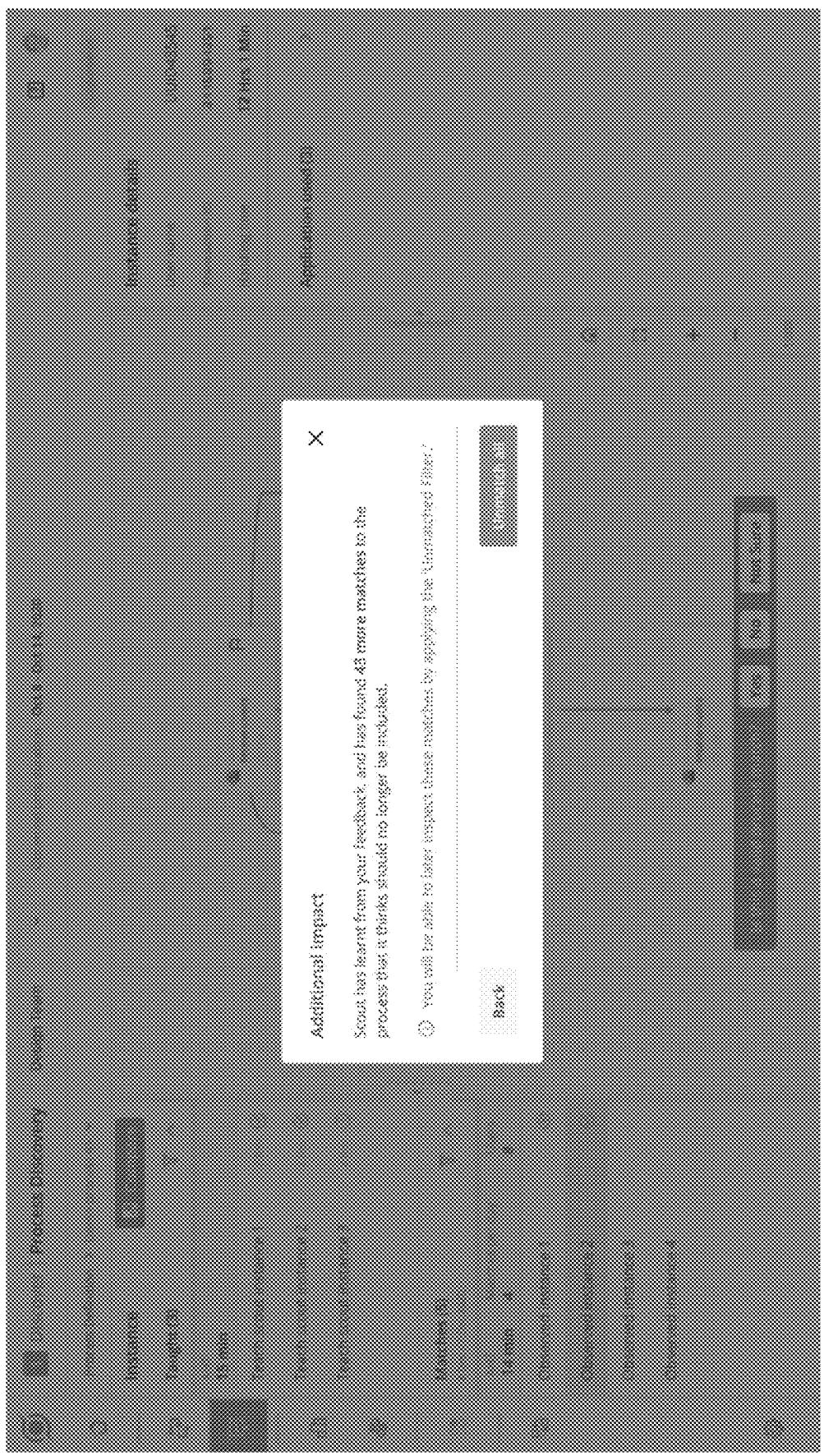
FIG. 15D illustrates a portion of a user interface that enables a user to reject a batch of process instances in accordance with some embodiments.

As described above, user feedback may be used by the process discovery software to automatically update its results. For example, as shown in FIG. 15D, a user's rejection of one or more process instances and/or the reasons for the rejection of the process instance(s) can be used to automatically reject other process instances from being associated with a particular process. Forty three such instances are removed in the example of FIG. 15D.

Figure 15E:
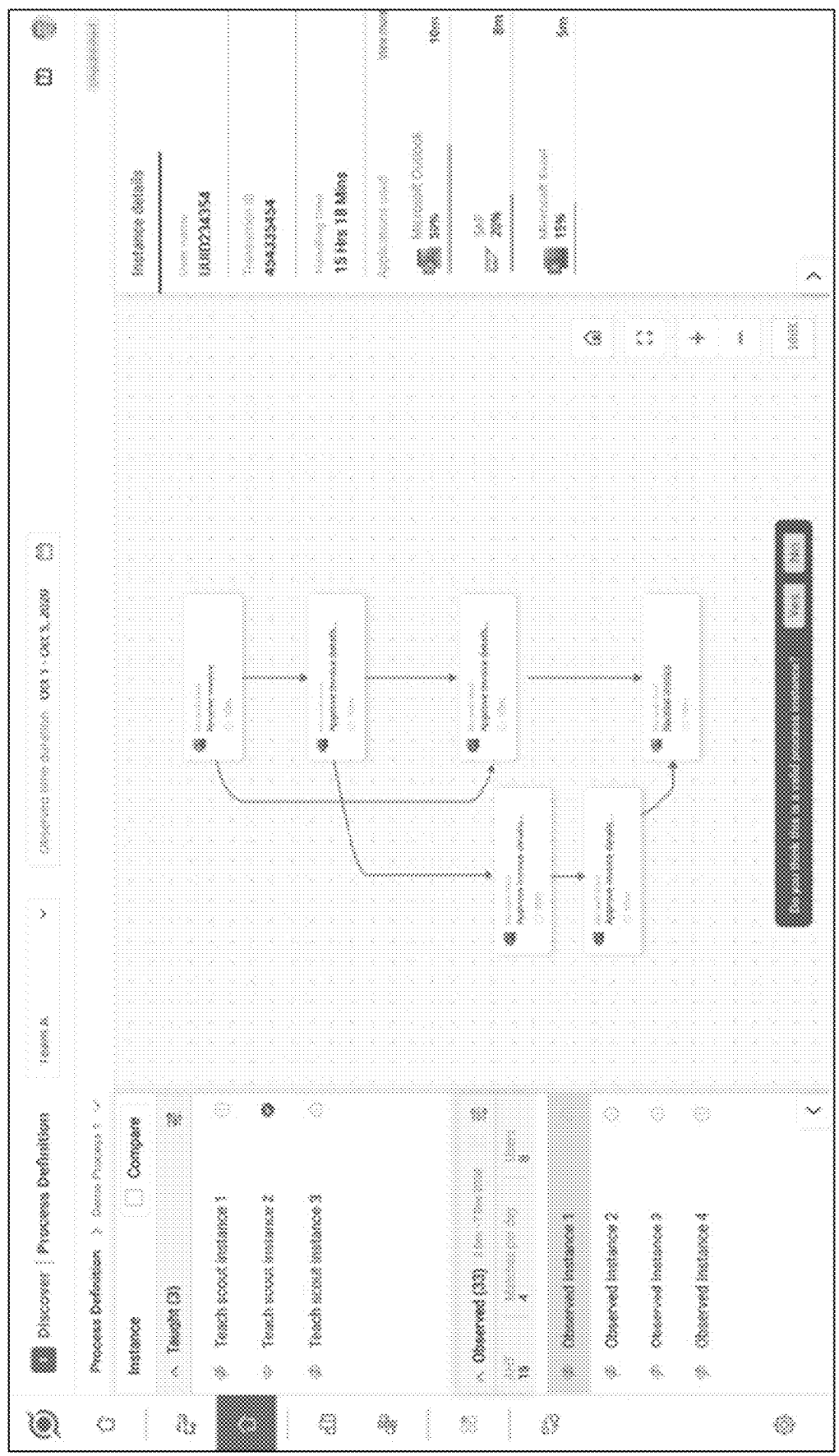
FIG. 15E illustrates a portion of a user interface that enables a user to provide feedback on a single observed instance of a process identified during process discovery in accordance with some embodiments.

As described above, some embodiments enable users to approve or reject (either individually or in bulk) observed instances of a process identified during process discovery. Approving or rejecting observed instances, may help the process discovery technique adjust its results. FIG. 15E illustrates a portion of a user interface that enables a user to provide feedback on a single observed instance of a process identified during process discovery in accordance with some embodiments. Providing feedback may be performed in any suitable way, an example of which includes, but is not limited to, the user selecting "Yes" or "No" to indicate whether the observed instance is valid as shown in FIG. 15E.

Some embodiments enable simple control over users providing feedback based on observed instance results, allowing for self-service adjustment. For example, if the observed instances are filtered or grouped by particular fields (e.g., groups observed instances by user), then the user may be given the option to bulk reject or accept all of the observed instances in the group. For example, a user may believe that only two users perform a particular process, but the process discovery results show observed instances for the process being performed for three users. Some embodiments enable selection of the user that is not believed to have performed the process and bulk rejection of all of the observed instances associated with the selected user to provide feedback on the process discovery results. It should be appreciated that bulk approving or rejecting can be performed on process discovery results to which any group or filter has been applied, examples of which are described above.

Figure 15F:
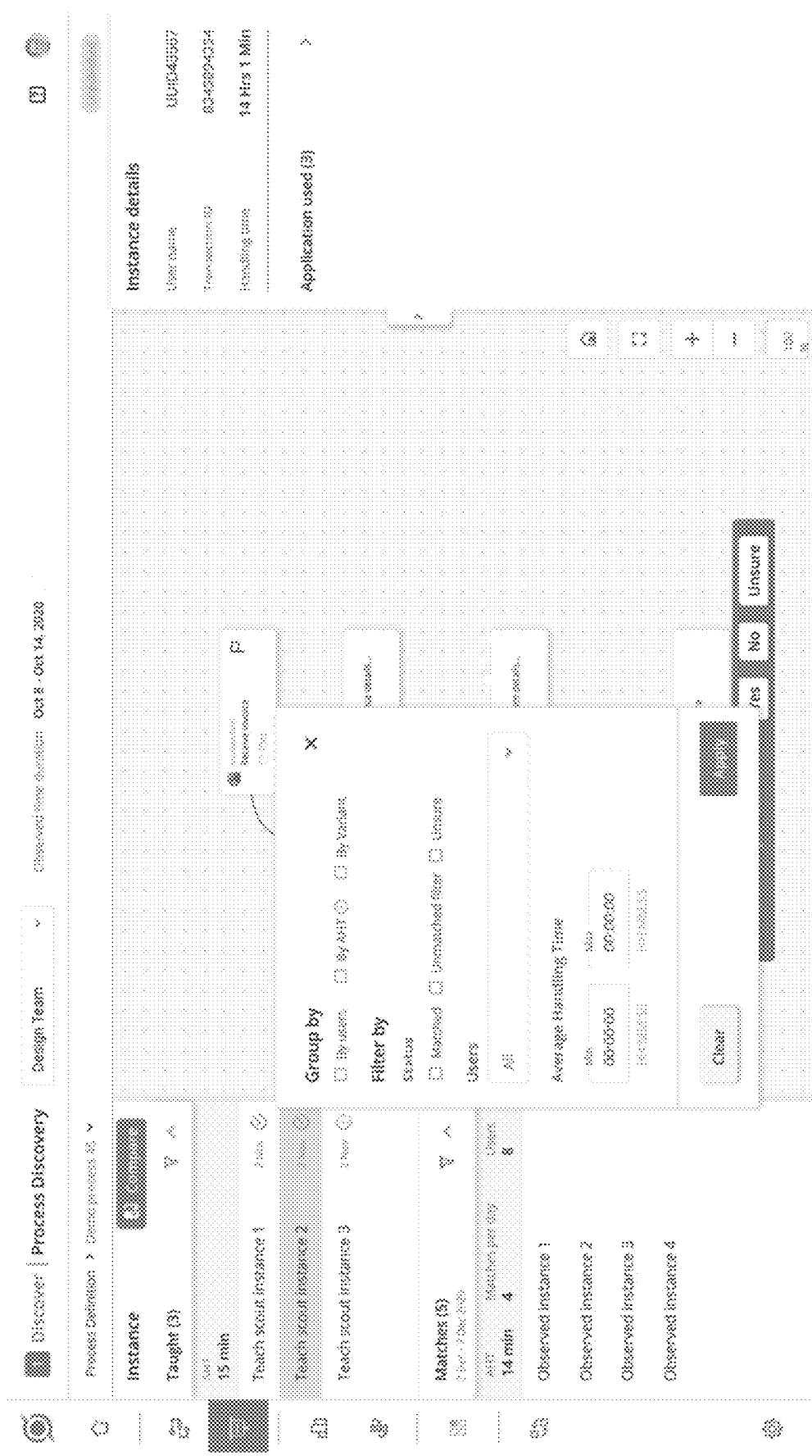
FIG. 15F illustrates a portion of a user interface that allows the user to perform grouping and/or filtering of process instances in accordance with some embodiments.
Figure 15G:
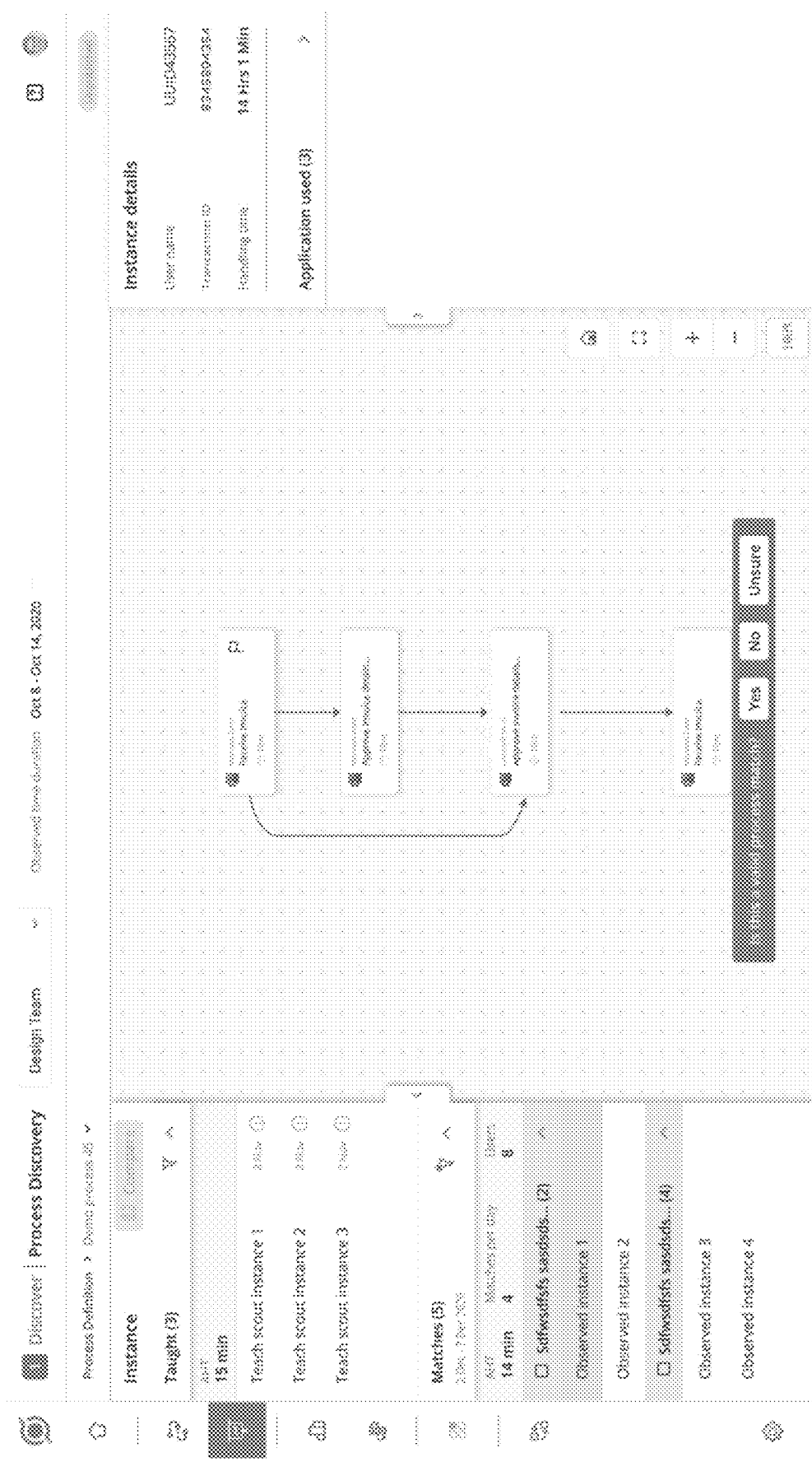
FIG. 15G illustrates a portion of a user interface displaying results of filtering observed process instances by different users in accordance with some embodiments.

For example, in some embodiments, the user may group and/or filter process instances by a parameter such as by users, average handling time, a variant (e.g., group all processes by a particular action or actions that are shared among those processes). As another example, a user may filter processes by those that match a given process, don't match a given process, are performed by a particular user, or using any other suitable filtering criteria. In turn, the user may bulk accept or reject the process instances in the group. An example a user interface that allows the user to perform such grouping and/or filtering is shown in FIG. 15F. Illustrative results of such grouping and/or filtering are shown in FIG. 15G, where the observed process instances are grouped by different users. In this way, a user reviewing discovered process instances can, for example, bulk reject process instances from being associated with a particular process because the process instances were identified from data captured from a user who is known to not perform the particular process. As another example, a user reviewing discovered process instances can bulk reject process instances from being associated with a particular process because all the process instances took less than a threshold of time to be performed, whereas the particular process is known to take a greater amount of time to be performed. As yet another example, a user reviewing discovered process instances can bulk reject process instances from being associated with a particular process because none of the process instances use application program "A," whereas the particular process is known to involve the use of application program "A."

Figure 15H:
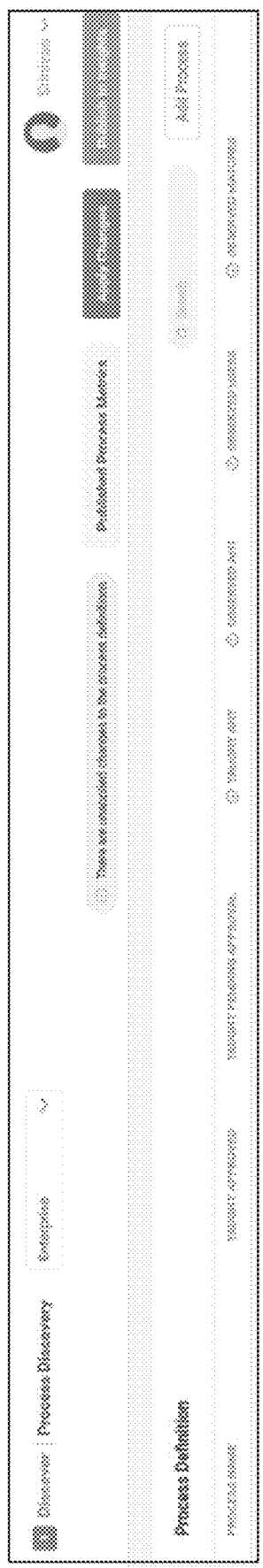
FIG. 15H illustrates a portion of a user interface that enables a user to confirm that the system should apply user feedback in accordance with some embodiments.
Figure 15I:
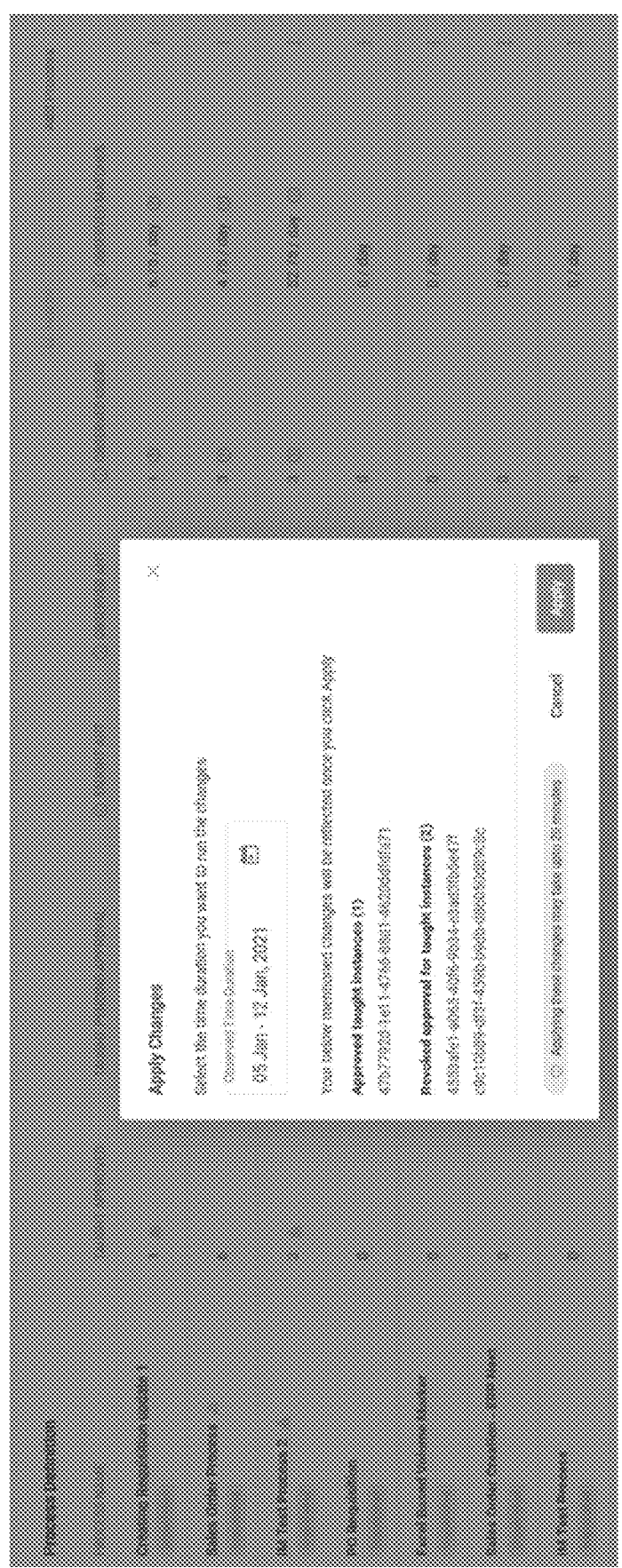
FIG. 15I illustrates a portion of a user interface that shows results of changes to a process discovery technique over a particular time window of event data in accordance with some embodiments.

To help ensure that feedback is not accidentally taken into account, some embodiments provide the ability to confirm that the system should apply the changes by allowing the user to interact with a user interface, an example of which is shown in FIG. 15H. When applied, the user may also be able to view the results of the changes over a particular time window by interacting with a user interface, an example of which is shown in FIG. 15I.

The inventors have recognized that in some organizations, a manager or other authorized user may not want to provide all users of the organization with full visibility into the alerts or other aspects of the user interface shown and described above. Accordingly, some embodiments, enable a user (e.g., a manager or other authorized user) with the ability to control when the process discovery results are shared or "published" to other users. For example, the manager or other authorized user may want to generate a previous of the results, clear alerts by fixing issues, and provide feedback on discrepancies (examples of which are described above) prior to publishing the results. To this end, some embodiments, provide two steps where the results are previewable and explainable as shown in the previous sections. Then when the results are to be made available to other parts of the product and other users, the user (e.g., the manager or other authorized user) can "publish" the results. All processes may be shown as published or not. In some embodiments, a user (e.g., a manager or other authorized user) may want to unpublish or hide a process that was previously published, if for example the process is no longer performed by members of a team.

FIG. 16A illustrates a portion of a user interface that enables a user with the ability to decide when to publish results of process discovery in accordance with some embodiments. As shown in FIG. 16B, in some embodiments, the processes for publishing/unpublishing may be selected on an individual process basis. Prior to publishing results, the user can also see any alerts that remain on the process, which notifies the user that issues still exist that the user may want to fix before publishing. In some embodiments, a user is prevented from publishing a process that has outstanding issues/alerts.

In some embodiments, any changes made to processes (e.g., via feedback provided to the process discovery process) may not be applied until the changes and results are published, which allows a user to make changes, preview the changes, then decide when to publish the changes even if the process has already been published in the past. For example, if the process was published and new unexpected results are received, a user (e.g., a manager or other authorized user) may make adjustments and preview whether the adjustments address the concerns before publishing the results over any period of time.

In some embodiments, users may be provided with one or more additional controls to inspect, filter, and/or otherwise review results generated (e.g., process matches returned) by the process discovery techniques described herein. These controls may be used in combination with any of the process discovery techniques described herein. The controls are independent of the particular process discovery technique or techniques used to generate the process matches, and are instead applied to the identified process matches in order to refine them based on user input. Any of the controls may be used on a per-team configuration, per-process configuration, or in a global configuration.

Figure 17A:
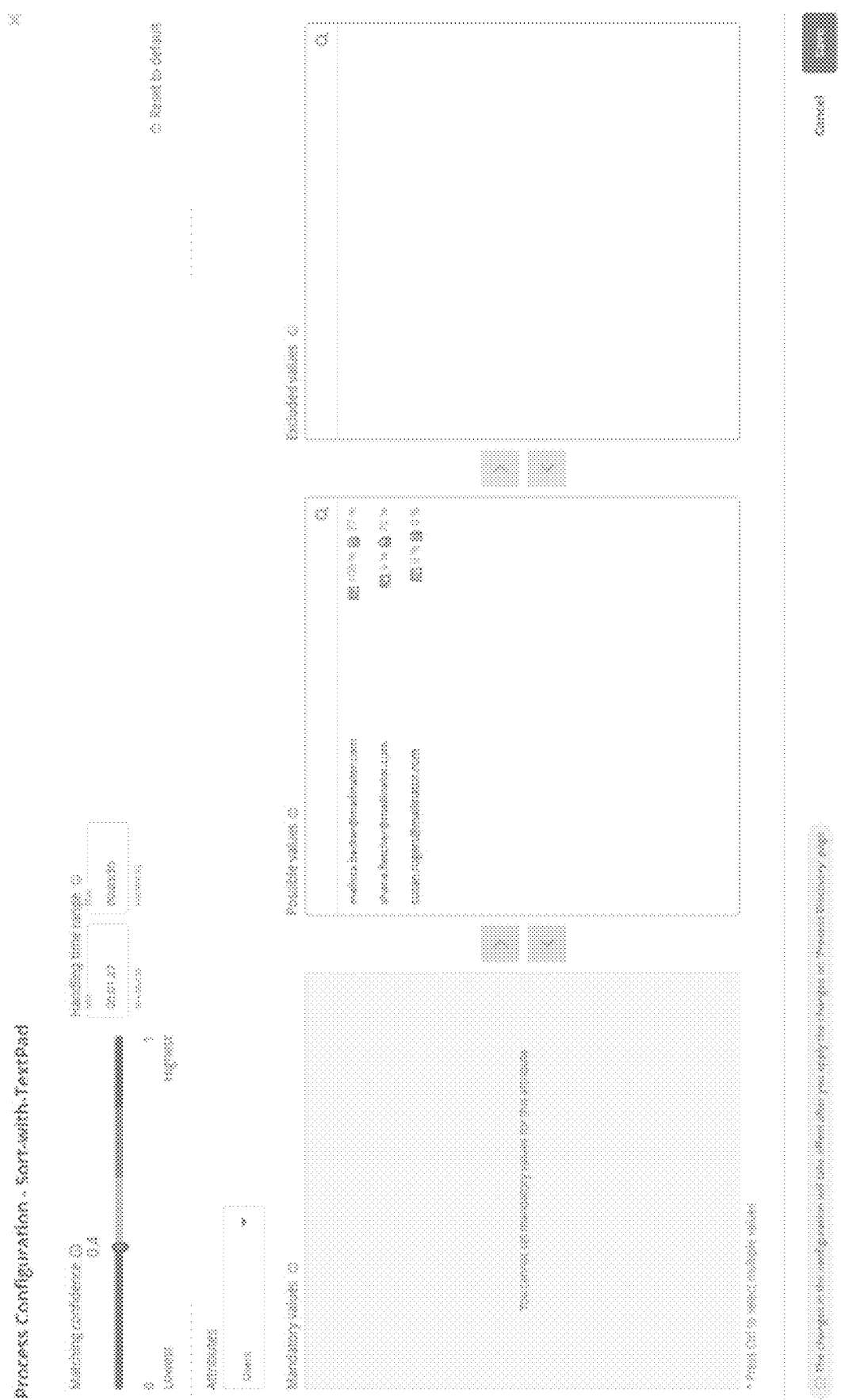
FIGS. 17A-17C illustrate controls for filtering out process discovery results, in accordance with some embodiments.
Figure 17B:
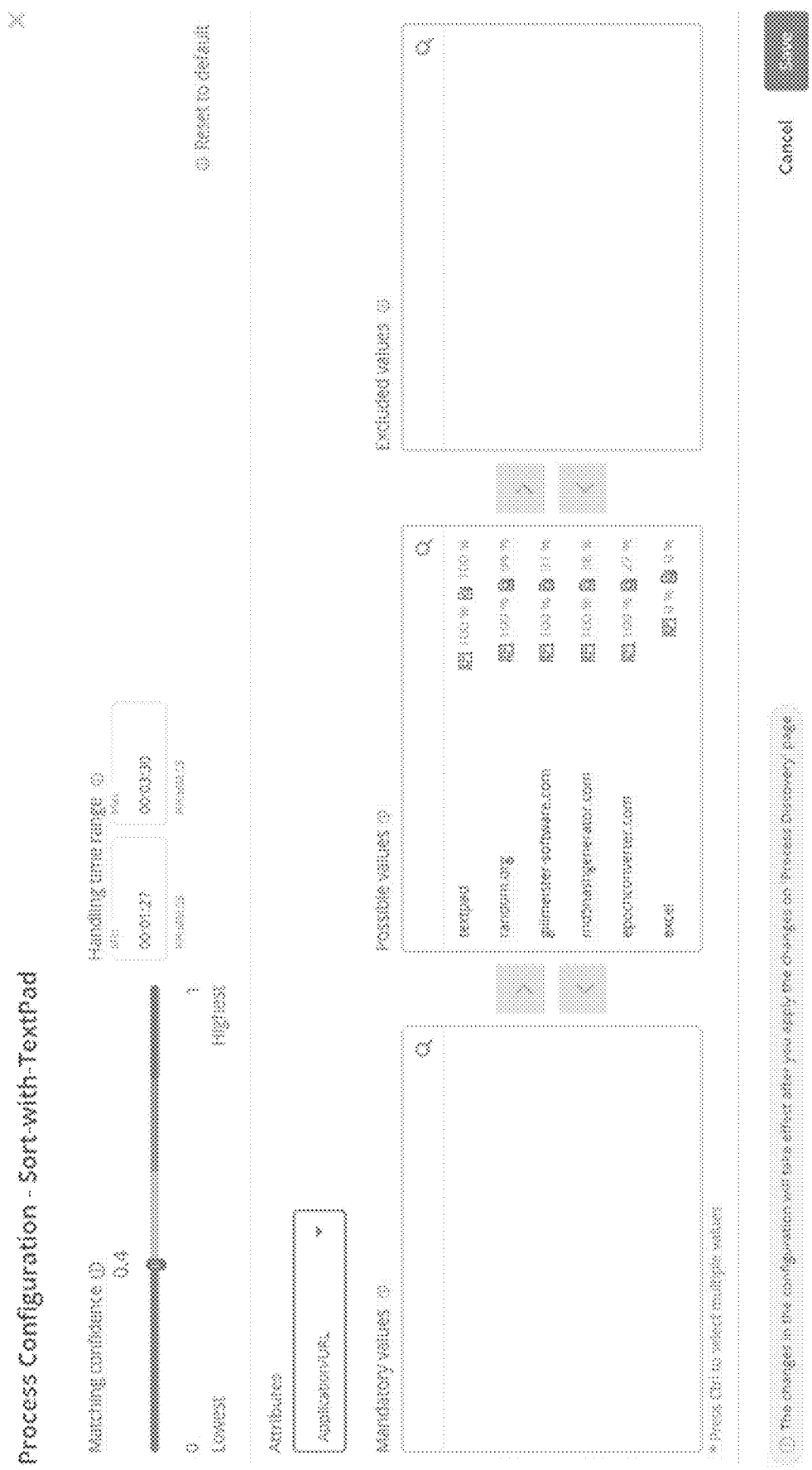
Figure 17C:
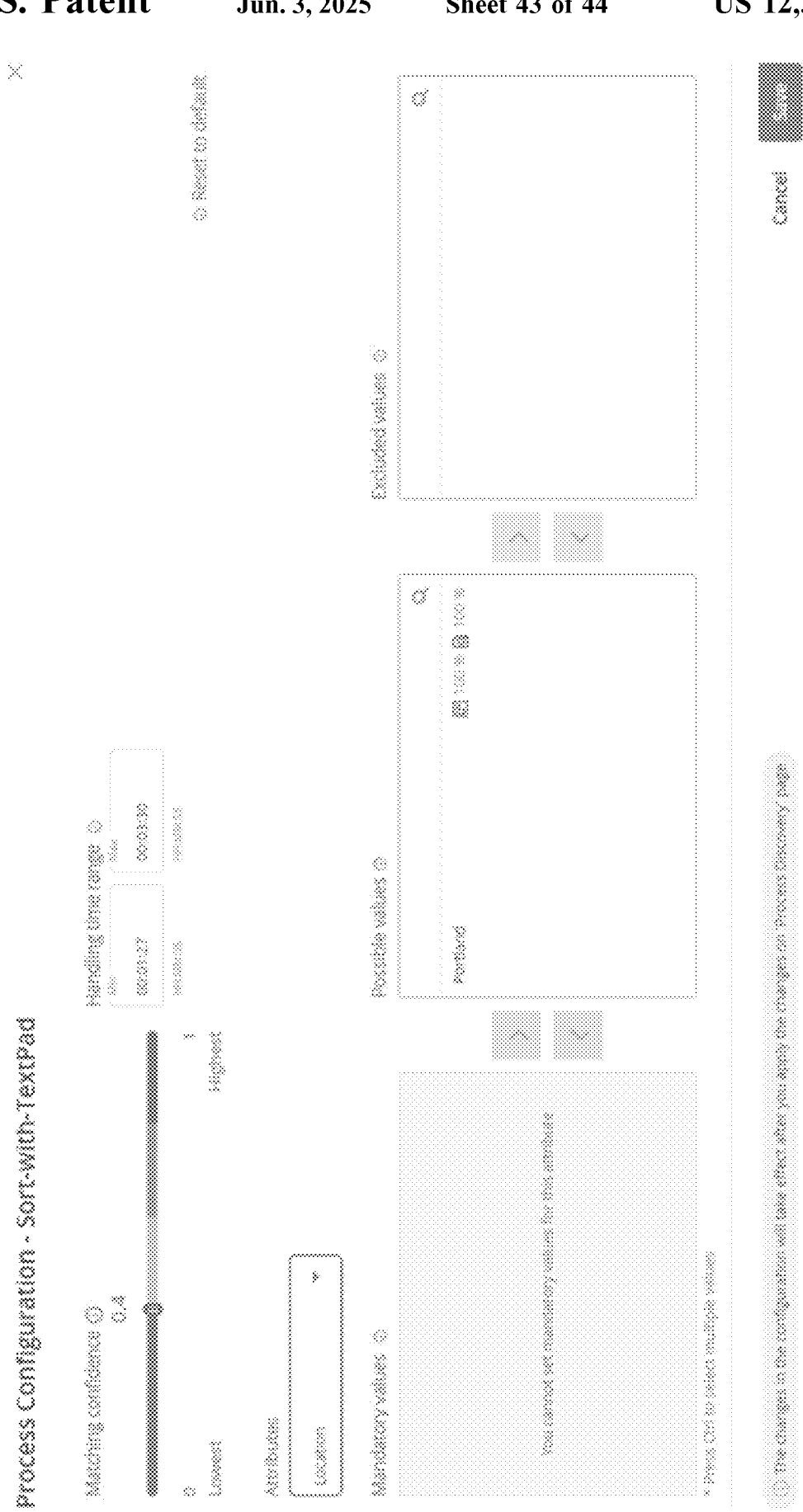

One example of such a control is a control for filtering process matches based on a measure of confidence. Processes have variations when implemented by different teams or organizations. As such, the quality of the results may depend on how similar the observed processes are to the taught process instances. Setting a matching confidence threshold high through a control will filter out any matches whose measure of confidence is lower than the threshold. This may be useful in cases where too many results are being returned. Conversely, setting a matching confidence threshold lower through a control will facilitate generating more results (e.g., in cases where too few results are being returned when the threshold is set high). An example of the matching confidence threshold setting control is shown in FIGS. 17A-C, where the matching confidence is set via a sliding bar (it may be set using any other suitable GUI element) to the value of 0.4 (it may be set to any value in the range of 0-1, in some embodiments).

As an example, in some cases, a user may wish to review only those process matches that have a confidence when the processes being Scouted are very uniform without a lot of variation in how users do them. However, if the processes are highly variable then the user may want to reduce the matching confidence. That is because how the processes when they are done by the users may be significantly different in how they were taught, and so a lower threshold or confidence match may be needed to allow the algorithm to pass in those less confident or more variable sequences. This control is often used if the users are finding not enough matches are being returned they might lower the value. If too many sequences are being provided that do not match the processes, they might increase the value.

As another example, process discovery results may be filtered based on their duration. For example, if the user knows that a particular process or some part thereof cannot be performed in under a threshold amount of time (e.g., 2 minutes), then by setting a lower bound to that threshold amount of time will filter out all results whose duration is below the threshold. Similarly, if the user knows that a particular process or some part thereof does not exceed a threshold amount of time (e.g., 1 hour) then an appropriate upper bound may be set and discovered processes whose duration exceeds the upper bound may be filtered out. An example of length filtering is shown in FIGS. 17A-C which show a "Handling time range" GUI element where a lower and upper bounds may be entered. They are set to one minute and 27 seconds and three minutes and 30 seconds respectively, in the illustrated example.

As another example, process discovery results may be filtered by values of their attributes. Discovery results may be included or excluded based on the values of one or more selected attributes. Results may be kept for those only values of an attribute that are "Mandatory values" and "Possible Values". Additionally or alternatively, results may be discarded for those values that are "Excluded values".

One example of such an attribute is "Users", whose value(s) may specify one or more users. For example, results for a given process may be valid if they come from the users listed in "Possible values" (e.g., because it is only those users that are known to perform such a process). If it is determined that one user does not do the process but results are accidentally getting generated for them (e.g., maybe they do a really similar process but not the one of interest), then that user can be moved over to "Excluded values." If done, it will ensure that no process discovery matches come back for that user. For example, as shown in FIGS. 17A, results may be returned for only those processes that are discovered from data generated by one of three users (Melissa Becker, Shane Fletcher, and Susan Rogers, in this example). Users may be added to and/or removed from this list of "Possible values".

Another example of such an attribute is "Applications/URL". An example is shown in FIG. 17B. There are three options for values in this case: Mandatory values, Possible values, and Excluded values (as shown in the left, middle, and right panes of FIG. 17B, respectively). Mandatory values list those application/URL values that must be included in every sequence discovered. Thus, if a discovered sequence does not include that application or URL, it will be filtered out. Possible values would mean that the application could be involved when doing the process and thereby in a discovered sequence. Finally, if the application or URL is put in Excluded values it means that if the application is seen in the discovered sequence then the sequence will be dropped. This is like saying, the process never contains the user using a particular application (e.g., SAP), so that if the particular application (e.g., SAP) were found in a result then the result would be excluded. In the example of FIG. 17B, there are no mandatory or excluded values, but there are five possible values including four URLs and one application program (MICROSOFT EXCEL).

Another example of such an attribute is "Location". An example is shown in FIG. 17*c*. This attributes allows a user to specify a location (e.g., a region) where the process may be performed (e.g., a country, a state, a region, a jurisdiction, a city, an office, etc.). For example, this may be used to specify that processes cannot be performed in Europe, but may be performed in the United States. This provides further controls to refine the results in case processes across geographies look similar (but are in fact considered different), as well as to remove potential false positives. For example, a particular location never does this process so any result would be a false positive so they should be filtered out.

Figure 18:
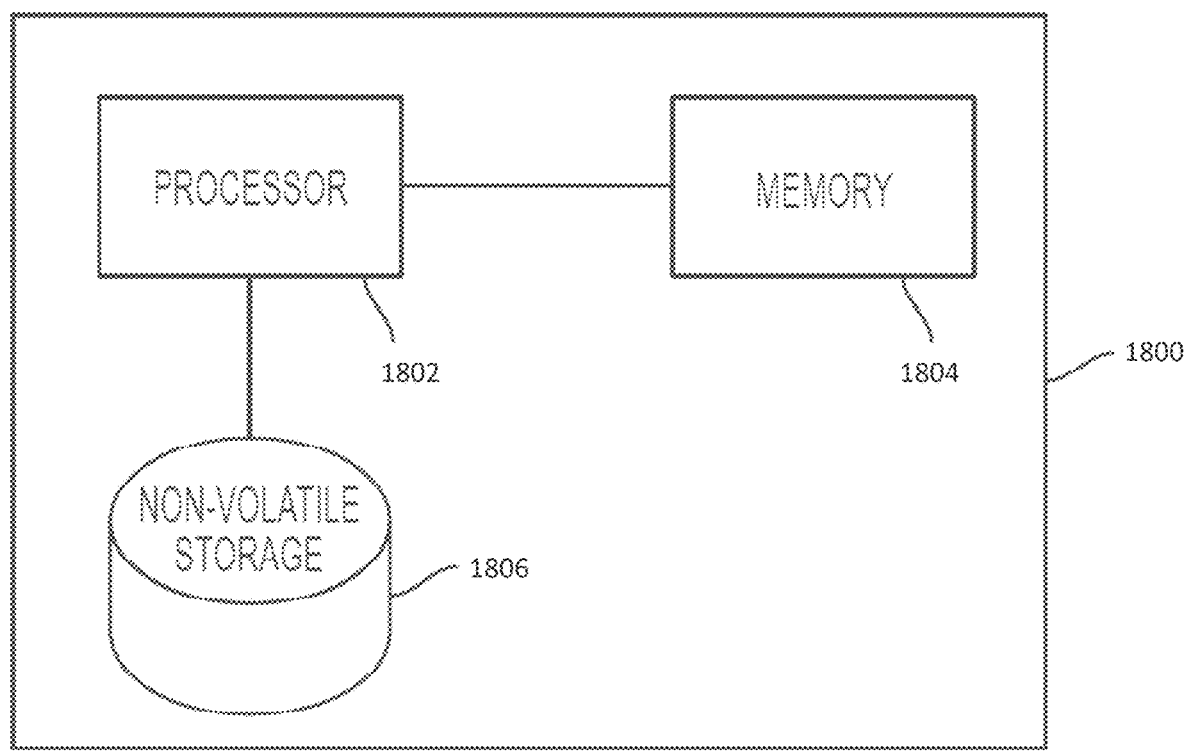
FIG. 18 schematically illustrates components of a computer that may be used to implement some embodiments.

An illustrative implementation of a computer system 1800 that may be used in connection with any of the embodiments of the disclosure provided herein is shown in FIG. 18. For example, any of the computing devices described above may be implemented as computing system 1800. The computer system 1800 may include one or more computer hardware processors 1802 and one or more articles of manufacture that comprise non-transitory computer-readable storage media (e.g., memory 1804 and one or more non-volatile storage devices 1806). The processor 1802(*s*) may control writing data to and reading data from the memory 1804 and the non-volatile storage device(s) 1806 in any suitable manner. To perform any of the functionality described herein, the processor(s) 1802 may execute one or more processor-executable instructions stored in one or more non-transitory computer-readable storage media (e.g., the memory 1804), which may serve as non-transitory computer-readable storage media storing processor-executable instructions for execution by the processor(s) 1802.

The terms "program" or "software" are used herein in a generic sense to refer to any type of computer code or set of processor-executable instructions that may be employed to program a computer or other processor to implement various aspects of embodiments as described above. Additionally, according to one aspect, one or more computer programs that when executed perform methods of the disclosure provided herein need not reside on a single computer or processor but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method of generating and displaying visualizations of actions that were performed by a user of a computing device, the computing device having one or more software applications and separate monitoring software installed thereon, the method comprising:
   receiving, by the computing device, a user indication to start recording an instance of a process;
   configuring the computing device to start recording the instance of the process in response to receiving the user indication;
   capturing, by the monitoring software when recording, first information corresponding to a first stream of events captured by the computing device during performance of a first plurality of actions by the user when interacting with the one or more software applications to perform the process, the first information indicating clicks and keystrokes performed by the user in the first plurality of actions and, for each indicated click or keystroke, indicating a software application in which the click or the keystroke was performed;
   generating, using the first information, a first visualization of at least some of the first plurality of actions, the first visualization including a flow diagram having nodes representing the at least some of the first plurality of actions and directed edges representing transitions between the at least some of the first plurality of actions; and
   displaying the first visualization on a graphical user interface (GUI).

2. The method of claim 1, wherein the first visualization includes a plurality of screenshots indicating a sequence of the at least some of the first plurality of actions.

3. The method of claim 1, wherein the first visualization includes an amount of time that it took the user to complete performance of the process.

4. The method of claim 1, wherein the first plurality of actions performed by the user include a first set of actions performed at a first time and a second set of actions performed at a second time after the first time.

5. The method of claim 4, further comprising:
   for each instance of a plurality of instances of the process:
      capturing, by the monitoring software when recording, respective first information during performance of a respective first plurality of actions by the user when interacting with the one or more software applications to perform the process.

6. A system comprising:
   a computing device; and
   at least one non-transitory computer-readable storage medium having stored thereon instructions which, when executed by the computing device, cause the computing device to perform a method of generating and displaying visualizations of actions that were performed by a user of the computing device, the computing device having one or more software applications and separate monitoring software installed thereon, the method comprising:
      receiving, by the computing device, a user indication to start recording an instance of a process;
      configuring the computing device to start recording the instance of the process in response to receiving the user indication;
      capturing, by the monitoring software when recording, first information corresponding to a first stream of events captured by the computing device during performance of a first plurality of actions by the user when interacting with the one or more software applications to perform the process, the first information indicating clicks and keystrokes performed by the user in the first plurality of actions and, for each indicated click or keystroke, indicating a software application in which the click or the keystroke was performed;
      generating, using the first information, a first visualization of at least some of the first plurality of actions, the first visualization including a flow diagram having nodes representing the at least some of the first plurality of actions and directed edges representing transitions between the at least some of the first plurality of actions; and
      displaying the first visualization on a graphical user interface (GUI).

7. The system of claim 6, wherein the first visualization includes a plurality of screenshots indicating a sequence of the at least some of the first plurality of actions.

8. The system of claim 6, wherein the first visualization includes an amount of time that it took the user to complete performance of the process.

9. The system of claim 6, wherein the first plurality of actions performed by the user include a first set of actions performed at a first time and a second set of actions performed at a second time after the first time.

10. The system of claim 6, wherein the method further comprises:
   for each instance of a plurality of instances of the process:
      capturing, by the monitoring software when recording, respective first information during performance of a respective first plurality of actions by the user when interacting with the one or more software applications to perform the process.

11. At least one non-transitory computer-readable storage medium having stored thereon instructions which, when executed by a computing device, cause the computing device to perform a method of generating and displaying visualizations of actions that were performed by a user of the computing device, the computing device having one or more software applications and separate monitoring software installed thereon, the method comprising:

receiving, by the computing device, a user indication to start recording an instance of a process;

configuring the computing device to start recording the instance of the process in response to receiving the user indication;

capturing, by the monitoring software when recording, first information corresponding to a first stream of events captured by the computing device during performance of a first plurality of actions by the user when interacting with the one or more software applications to perform the process, the first information indicating clicks and keystrokes performed by the user in the first plurality of actions and, for each indicated click or keystroke, indicating a software application in which the click or the keystroke was performed;

generating, using the first information, a first visualization of at least some of the first plurality of actions, the first visualization including a flow diagram having nodes representing the at least some of the first plurality of actions and directed edges representing transitions between the at least some of the first plurality of actions; and displaying the first visualization on a graphical user interface (GUI).

12. The at least one non-transitory computer-readable storage medium of claim 11, wherein the first visualization includes a plurality of screenshots indicating a sequence of the at least some of the first plurality of actions.

13. The at least one non-transitory computer-readable storage medium of claim 11, wherein the first visualization includes an amount of time that it took the user to complete performance of the process.

14. The at least one non-transitory computer-readable storage medium of claim 11, wherein the first plurality of actions performed by the user include a first set of actions performed at a first time and a second set of actions performed at a second time after the first time.

15. The at least one non-transitory computer-readable storage medium of claim 11, wherein the method further comprises:

for each instance of a plurality of instances of the process:

capturing, by the monitoring software when recording, respective first information during performance of a respective first plurality of actions by the user when interacting with the one or more software applications to perform the process.

\* \* \* \* \*

UNITED STATES PATENT AND TRADEMARK OFFICE
CERTIFICATE OF CORRECTION

| | | |
|---|---|---|
| PATENT NO. | : 12,321,764 B1 | Page 1 of 1 |
| APPLICATION NO. | : 19/080333 | |
| DATED | : June 3, 2025 | |
| INVENTOR(S) | : George Peter Nychis et al. | |

It is certified that error appears in the above-identified patent and that said Letters Patent is hereby corrected as shown below:

In the Claims

In Claim 5, Column 46, Line 5:
The method of claim 4, further comprising:
Should read:
The method of claim 1, further comprising:

Signed and Sealed this
Fifth Day of August, 2025

Coke Morgan Stewart
*Acting Director of the United States Patent and Trademark Office*